(12) United States Patent
Matsuo et al.

(10) Patent No.: US 11,429,863 B2
(45) Date of Patent: Aug. 30, 2022

(54) COMPUTER-READABLE RECORDING MEDIUM HAVING STORED THEREIN LEARNING PROGRAM, LEARNING METHOD, AND LEARNING APPARATUS

(71) Applicant: FUJITSU LIMITED, Kawasaki (JP)

(72) Inventors: Tatsuru Matsuo, Kawasaki (JP); Koji Maruhashi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 491 days.

(21) Appl. No.: 16/670,322

(22) Filed: Oct. 31, 2019

(65) Prior Publication Data

US 2020/0151574 A1    May 14, 2020

(30) Foreign Application Priority Data

Nov. 12, 2018    (JP) .............................. JP2018-212571

(51) Int. Cl.
*G06N 3/08* (2006.01)
*G06K 9/62* (2022.01)

(52) U.S. Cl.
CPC ........... *G06N 3/084* (2013.01); *G06K 9/6256* (2013.01)

(58) Field of Classification Search
CPC .............................. G06N 3/084; G06K 9/6256
USPC .......................................................... 706/15
See application file for complete search history.

(56) References Cited

U.S. PATENT DOCUMENTS

| 10,397,272 B1* | 8/2019 | Bruss .................... G06F 21/568 |
| 2016/0357846 A1* | 12/2016 | Maruhashi ............ G06F 16/285 |
| 2017/0154445 A1* | 6/2017 | Maruhashi ............. G06N 7/005 |
| 2018/0096247 A1 | 4/2018 | Maruhashi |

FOREIGN PATENT DOCUMENTS

JP    2018-55580 A    4/2018

* cited by examiner

*Primary Examiner* — Neil R McLean
(74) *Attorney, Agent, or Firm* — Fujitsu Patent Center

(57) ABSTRACT

A learning method includes: acquiring input data and correct answer information, the input data including a set of multiple pieces of relationship data in which relationships between variables are recorded respectively; determining conversion rule corresponding to each of the multiple pieces of relationship data such that relationships before and after a conversion of a common variable commonly in the multiple pieces of relationship data are the same, when converting a variable value in each of the multiple pieces of relationship data into converted data rearranging the variable values in an order of input; converting each of the multiple pieces of relationship data into a multiple pieces of the converted data according to each corresponding conversion rule; and inputting a set of the multiple pieces of converted data to the neural network and causing the neural network to learn a learning model based on the correct answer information.

8 Claims, 58 Drawing Sheets

FIG. 7

| ACQUISITION TIME | DATA | LABEL |
|---|---|---|
| 10:00-10:10 | COMMUNICATION LOG 1<br><br>| HOST | CLIENT | AMOUNT |<br>\|---\|---\|---\|<br>\| S1 \| R1 \| 3 \|<br>\| S2 \| R1 \| 1 \|<br>\| S1 \| R2 \| 2 \|<br>\| ... \| ... \| ... \|<br><br>COMMAND HISTORY 2<br><br>| HOST | COMMAND | AMOUNT |<br>\|---\|---\|---\|<br>\| S1 \| C1 \| 2 \|<br>\| S2 \| C1 \| 1 \|<br>\| S1 \| C2 \| 0 \|<br>\| S2 \| C2 \| 3 \| | 1.0 |
| 10:10-10:20 | COMMUNICATION LOG 3<br><br>| HOST | CLIENT | AMOUNT |<br>\|---\|---\|---\|<br>\| S2 \| R1 \| 5 \|<br>\| S1 \| R1 \| 3 \|<br>\| S1 \| R2 \| 2 \|<br>\| ... \| ... \| ... \|<br><br>COMMAND HISTORY 4<br><br>| HOST | COMMAND | AMOUNT |<br>\|---\|---\|---\|<br>\| S2 \| C2 \| 6 \|<br>\| S1 \| C1 \| 1 \|<br>\| S1 \| C1 \| 0 \|<br>\| S2 \| C2 \| 3 \| | 0 |
| ... | ... | ... |

FIG. 8

| COMMUNICATION LOG | COLLATION PATTERN 1 | | |
|---|---|---|---|
| | HOST | CLIENT | AMOUNT |
| | S'1 | R'1 | 0.2 |
| | S'2 | R'1 | 0.1 |
| | S'1 | R'2 | -0.3 |
| | S'2 | R'2 | 0.4 |
| COMMAND HISTORY | COLLATION PATTERN 2 | | |
| | HOST | COMMAND | AMOUNT |
| | S''1 | C'1 | -0.4 |
| | S''2 | C'1 | 0.2 |
| | S''1 | C'2 | 0.3 |
| | S''2 | C'2 | 0.1 |

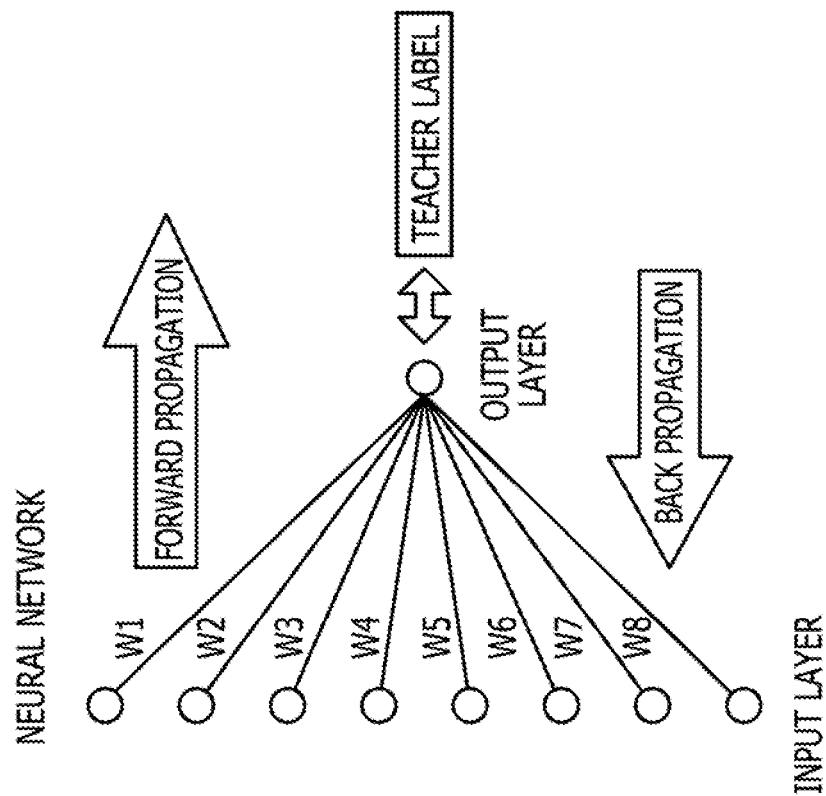

FIG. 12A

COLLATION PATTERN  ⟋XA1

| TERM S | TERM R | AMOUNT |
|---|---|---|
| S'1 | R'1 | 0.2 |
| S'2 | R'1 | 0.1 |
| S'1 | R'2 | -0.3 |
| S'2 | R'2 | 0.4 |

⟋YA1

| TERM S | TERM C | AMOUNT |
|---|---|---|
| S"1 | C'1 | -0.4 |
| S"2 | C'1 | 0.2 |
| S"1 | C'2 | 0.3 |
| S"2 | C'2 | 0.1 |

FIG. 12B

PARAMETER

| W1 | 1.2 |
|---|---|
| W2 | -0.1 |
| W3 | -0.9 |
| W4 | 0.6 |
| W5 | 0.4 |
| W6 | 0.8 |
| W7 | -1.3 |
| W8 | 0.2 |

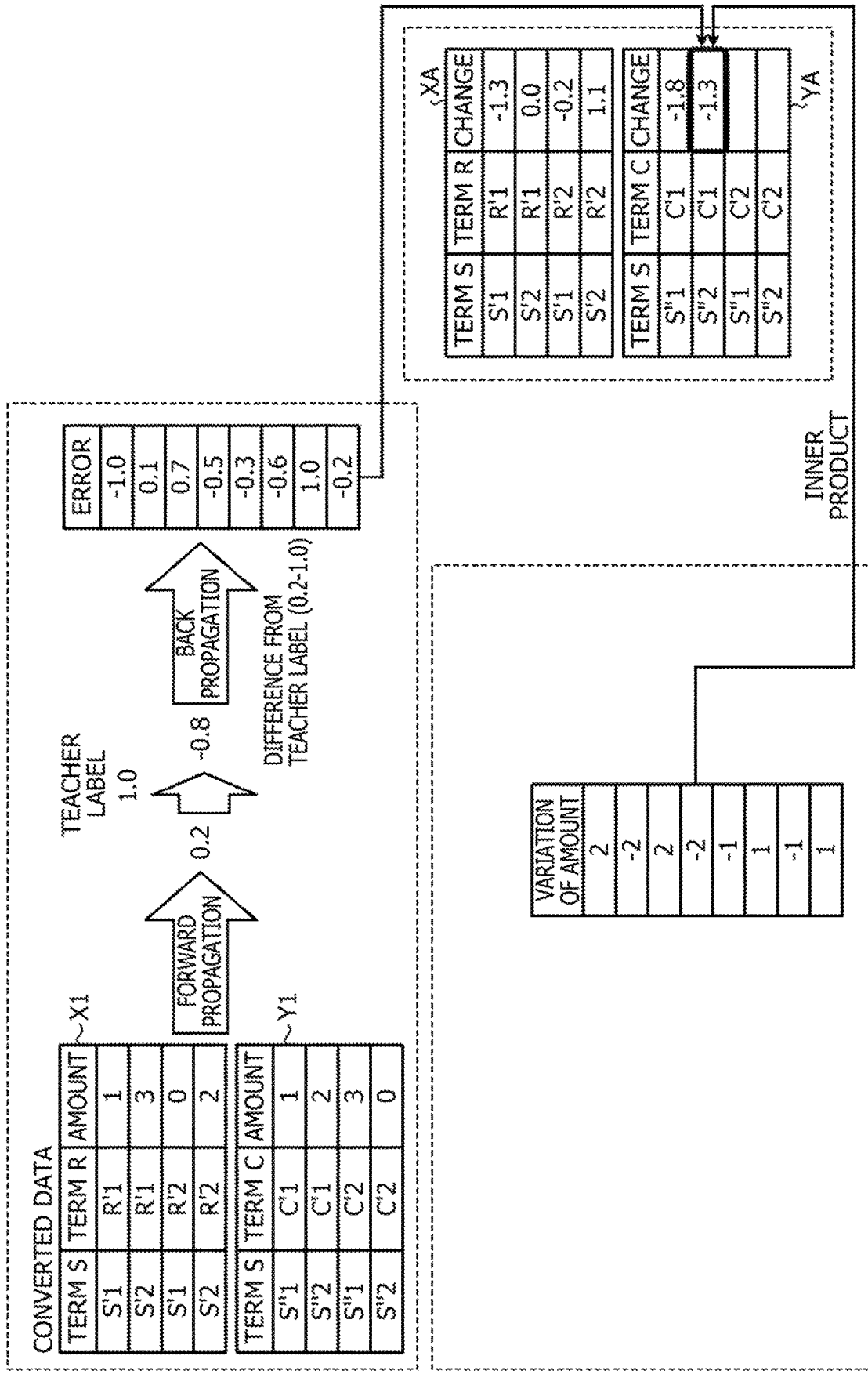

FIG. 22A

PARAMETER

| | PARAMETER |
|---|---|
| W1 | 2.0 |
| W2 | 2.3 |
| W3 | -0.9 |
| W4 | 2.2 |
| W5 | 1.2 |
| W6 | 2.4 |
| W7 | 1.1 |
| W8 | 0.2 |

=

{ DIFFERENCE FROM TEACHER LABEL -0.8

CONVERTED DATA ~X1

| TERM S | TERM R | AMOUNT |
|---|---|---|
| S'1 | R'1 | 1 |
| S'2 | R'1 | 3 |
| S'1 | R'2 | 0 |
| S'2 | R'2 | 2 |

*

~Y1

| TERM S | TERM C | AMOUNT |
|---|---|---|
| S''1 | C'1 | 1 |
| S''2 | C'1 | 2 |
| S''1 | C'2 | 3 |
| S''2 | C'2 | 0 |

}

-α

PARAMETER

| | PARAMETER |
|---|---|
| W1 | 1.2 |
| W2 | -0.1 |
| W3 | -0.9 |
| W4 | 0.6 |
| W5 | 0.4 |
| W6 | 0.8 |
| W7 | -1.3 |
| W8 | 0.2 |

FIG. 22B

COLLATION PATTERN ~XA'

| TERM S | TERM R | AMOUNT |
|---|---|---|
| S'1 | R'1 | 1.5 |
| S'2 | R'1 | 0.1 |
| S'1 | R'2 | -0.1 |
| S'2 | R'2 | -0.7 |

~YA'

| TERM S | TERM C | AMOUNT |
|---|---|---|
| S''1 | C'1 | 1.4 |
| S''2 | C'1 | 1.5 |
| S''1 | C'2 | 0.3 |
| S''2 | C'2 | 3.2 |

=

CALCULATED CHANGE ~XA

| TERM S | TERM R | CHANGE |
|---|---|---|
| S'1 | R'1 | -1.3 |
| S'2 | R'1 | 0.0 |
| S'1 | R'2 | -0.2 |
| S'2 | R'2 | 1.1 |

~YA

| TERM S | TERM C | CHANGE |
|---|---|---|
| S''1 | C'1 | -1.8 |
| S''2 | C'1 | -1.3 |
| S''1 | C'2 | 0.0 |
| S''2 | C'2 | -3.1 |

-α

COLLATION PATTERN ~XA1

| TERM S | TERM R | AMOUNT |
|---|---|---|
| S'1 | R'1 | 0.2 |
| S'2 | R'1 | 0.1 |
| S'1 | R'2 | -0.3 |
| S'2 | R'2 | 0.4 |

~YA1

| TERM S | TERM C | AMOUNT |
|---|---|---|
| S''1 | C'1 | -0.4 |
| S''2 | C'1 | 0.2 |
| S''1 | C'2 | 0.3 |
| S''2 | C'2 | 0.1 |

FIG. 25A

COLLATION PATTERN — XA1

| TERM S | TERM R | AMOUNT |
|---|---|---|
| S'1 | R'1 | 0.2 |
| S'2 | R'1 | 0.1 |
| S'1 | R'2 | -0.3 |
| S'2 | R'2 | 0.4 |

— YA1

| TERM S | TERM C | AMOUNT |
|---|---|---|
| S"1 | C'1 | -0.4 |
| S"2 | C'1 | 0.2 |
| S"1 | C'2 | 0.3 |
| S"2 | C'2 | 0.1 |

FIG. 25B

PARAMETER

| W1 | 1.2 |
|---|---|
| W2 | -0.1 |
| W3 | -0.9 |
| W4 | 0.6 |
| W5 | 0.4 |
| W6 | 0.8 |
| W7 | -1.3 |
| W8 | 0.2 |

FIG. 25C

IMPORTANCE

| K1 | 0.2 |
|---|---|
| K2 | 0.8 |

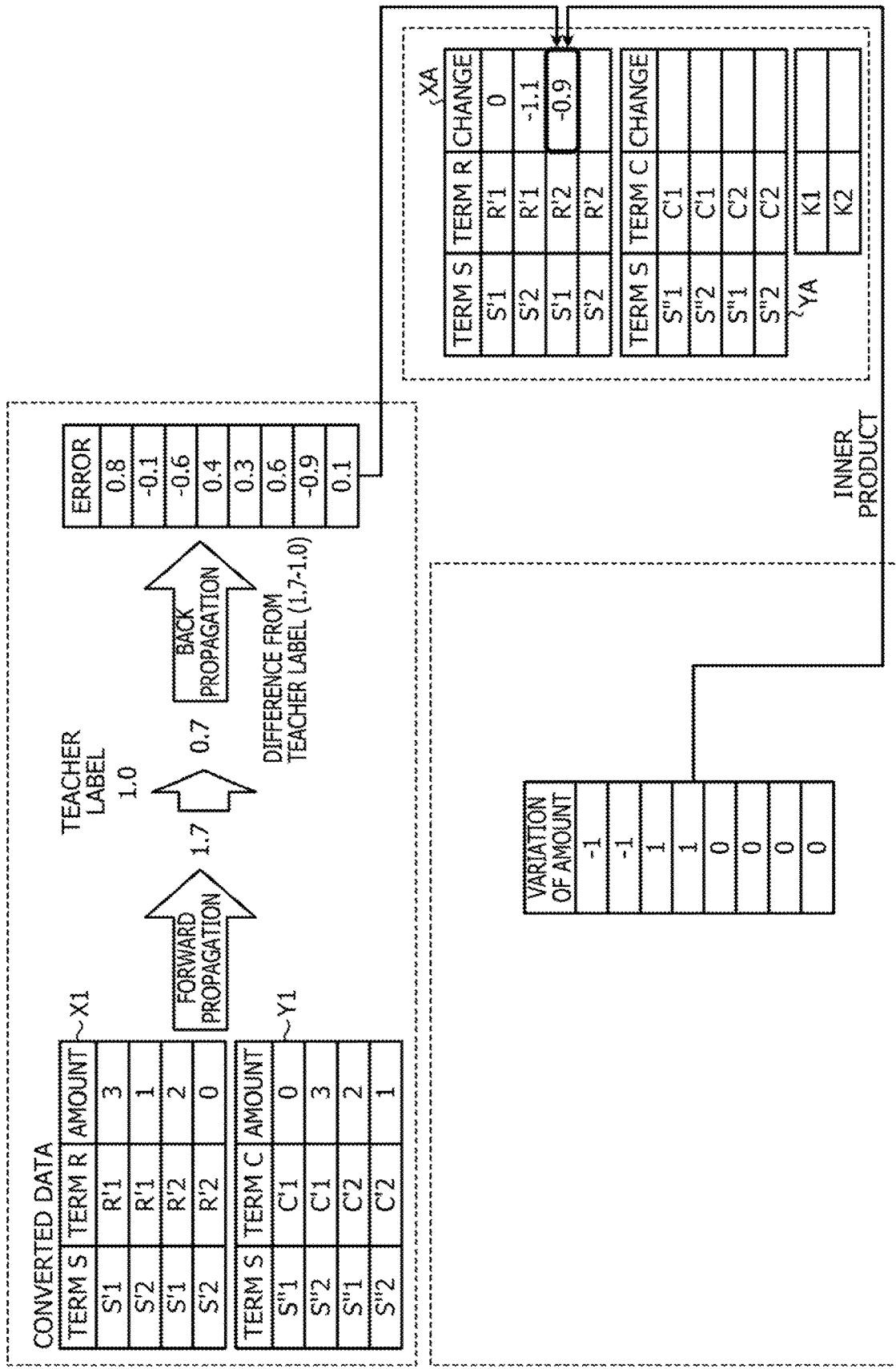

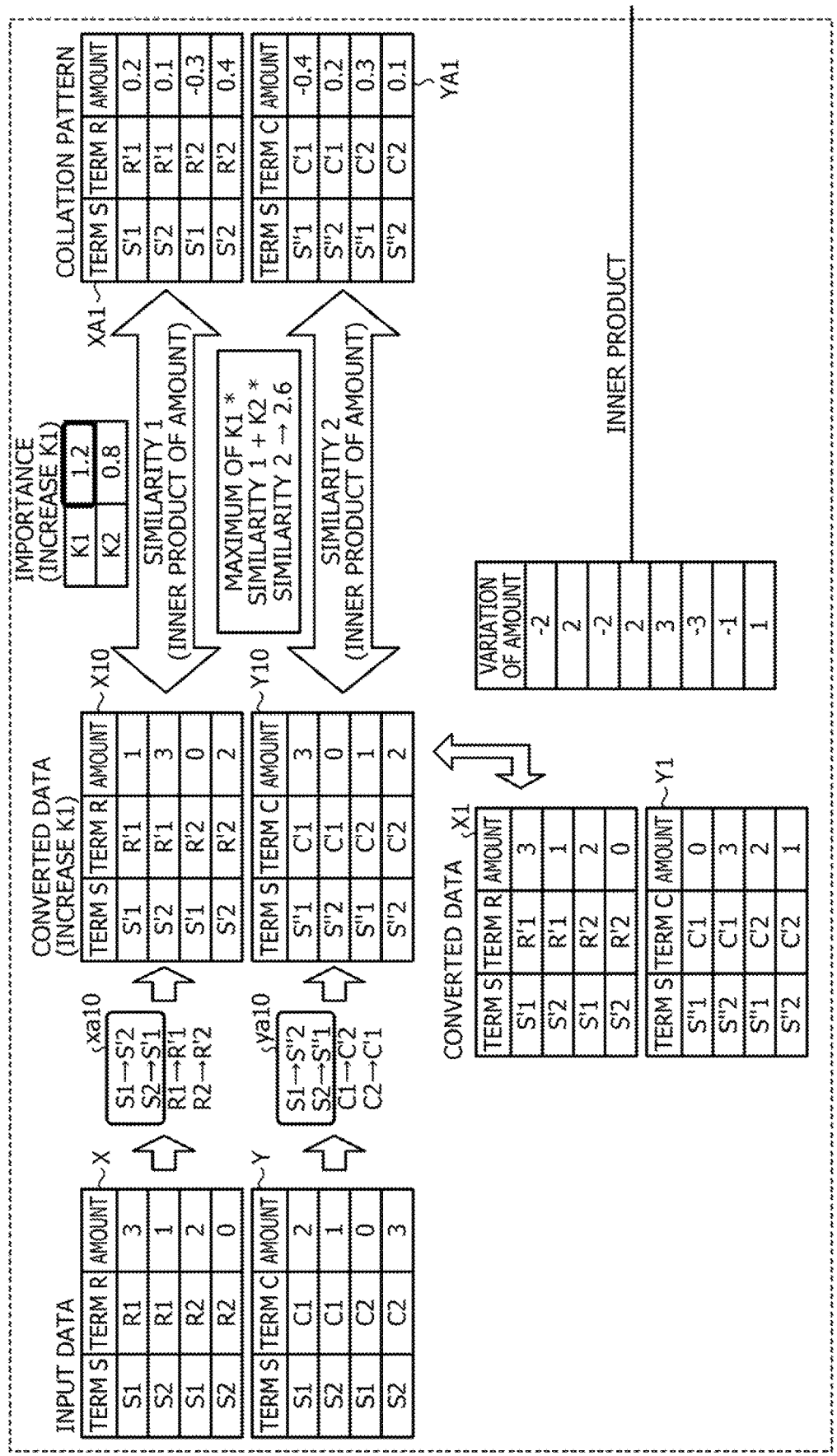

FIG. 37A

PARAMETER

| | PARAMETER |
|---|---|
| W1 | -0.9 |
| W2 | -0.8 |
| W3 | -2.3 |
| W4 | 0.6 |
| W5 | 0.4 |
| W6 | -1.3 |
| W7 | -2.7 |
| W8 | -0.5 |

=

CONVERTED DATA — X1

| TERM S | TERM R | AMOUNT |
|---|---|---|
| S'1 | R'1 | 3 |
| S'2 | R'1 | 1 |
| S'1 | R'2 | 2 |
| S'2 | R'2 | 0 |

\* Y1

| TERM S | TERM C | AMOUNT |
|---|---|---|
| S''1 | C'1 | 0 |
| S''2 | C'1 | 3 |
| S''1 | C'2 | 2 |
| S''2 | C'2 | 1 |

DIFFERENCE FROM TEACHER LABEL
0.7

−α

PARAMETER

| | PARAMETER |
|---|---|
| W1 | 1.2 |
| W2 | -0.1 |
| W3 | -0.9 |
| W4 | 0.6 |
| W5 | 0.4 |
| W6 | 0.8 |
| W7 | -1.3 |
| W8 | 0.2 |

FIG. 37B

COLLATION PATTERN — XA'

| TERM S | TERM R | AMOUNT |
|---|---|---|
| S'1 | R'1 | 0.2 |
| S'2 | R'1 | 1.2 |
| S'1 | R'2 | 0.6 |
| S'2 | R'2 | 2.4 |

YA'

| TERM S | TERM C | AMOUNT |
|---|---|---|
| S''1 | C'1 | -0.7 |
| S''2 | C'1 | 0.2 |
| S''1 | C'2 | 1.4 |
| S''2 | C'2 | -1.3 |

=

CALCULATED CHANGE — XA

| TERM S | TERM R | CHANGE |
|---|---|---|
| S'1 | R'1 | 0 |
| S'2 | R'1 | -1.1 |
| S'1 | R'2 | -0.9 |
| S'2 | R'2 | -2 |

YA

| TERM S | TERM C | CHANGE |
|---|---|---|
| S''1 | C'1 | 0.3 |
| S''2 | C'1 | 0 |
| S''1 | C'2 | -1.1 |
| S''2 | C'2 | 1.4 |

−α

COLLATION PATTERN — XA1

| TERM S | TERM R | AMOUNT |
|---|---|---|
| S'1 | R'1 | 0.2 |
| S'2 | R'1 | 0.1 |
| S'1 | R'2 | -0.3 |
| S'2 | R'2 | 0.4 |

YA1

| TERM S | TERM C | AMOUNT |
|---|---|---|
| S''1 | C'1 | -0.4 |
| S''2 | C'1 | 0.2 |
| S''1 | C'2 | 0.3 |
| S''2 | C'2 | 0.1 |

FIG. 37C

| IMPORTANCE | |
|---|---|
| K1 | 0.2 |
| K2 | 0.8 |

− α

| CALCULATED CHANGE | |
|---|---|
| K1 | 0.3 |
| K2 | 1.4 |

=

| IMPORTANCE | |
|---|---|
| K1 | −0.1 |
| K2 | −0.6 |

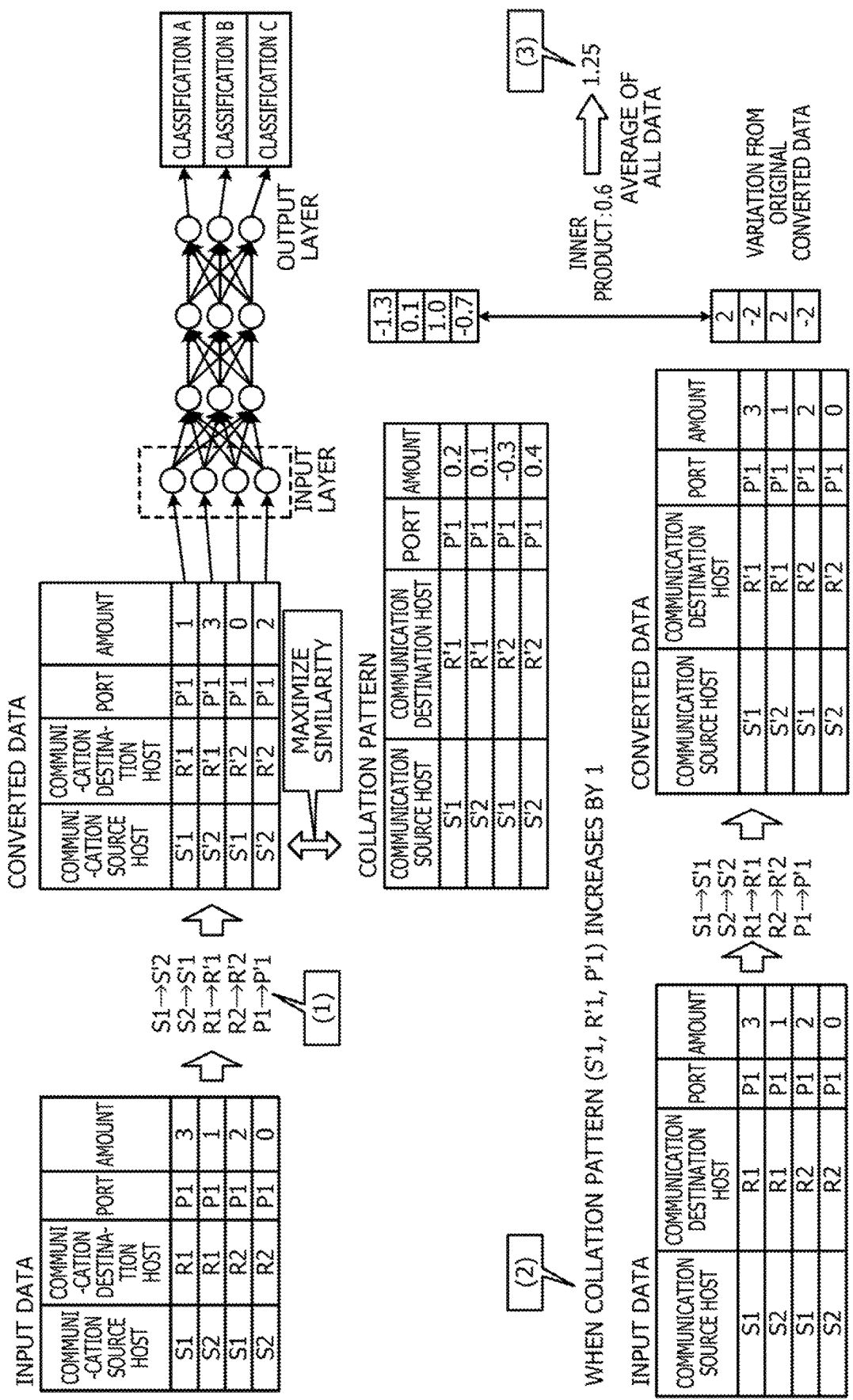

COMPUTER-READABLE RECORDING MEDIUM HAVING STORED THEREIN LEARNING PROGRAM, LEARNING METHOD, AND LEARNING APPARATUS

CROSS-REFERENCE TO RELATED APPLICATION

This application is based upon and claims the benefit of priority of the prior Japanese Patent Application No. 2018-212571, filed on Nov. 12, 2018, the entire contents of which are incorporated herein by reference.

FIELD

The embodiments discussed herein are related to a computer-readable recording medium having stored therein a learning program, a learning method, and a learning apparatus.

BACKGROUND

As a technique for classifying relationships between people and things using data (hereinafter, may be described as relationship data) defined as a set of relationships between people and things (variable values), such as communication logs and bank transaction histories, as an input, machine learning such as deep learning (DL) using a neural network is used. In classification by the neural network, each element of an input vector is input corresponding to each neuron of an input layer, an activity of the neuron is calculated according to a weighted sum of values of a neuron in a lower layer, and classification of the input vector is estimated by an activity of an output layer.

In the neural network, input data is input to the input layer after performing normalization or prescribed conversion to determine an order or the like, but in a case where it is desired to classify relationships between people and things, it is not clear that which relationship is input to which neuron in many cases. Therefore, a technique using a collation pattern is used as a method for ordering relationships at the time of input to a neural network.

FIG. 39 is a diagram for explaining a learning example of the neural network using the collation pattern. In the method illustrated in FIG. 39, by defining a rule for ordering input data by the collation pattern, the ordering rule is updated using error back propagation of the neural network. Specifically, first, as illustrated in (1) of FIG. 39, the input data is ordered such that a similarity with the collation pattern is maximized. Next, as illustrated in (2) of FIG. 39, variation of an amount of converted data with respect to change of the collation pattern is calculated.

As illustrated in (3) of FIG. 39, an update direction of the collation pattern is determined by an inner product of an error of the input layer obtained by error back propagation and the variation of the calculated amount of the converted data. For example, a direction of the change of the collation pattern which increases a classification error is calculated by multiplying the variation of the amount of the converted data with respect to the change of the collation pattern by the direction (error of the input layer) of the variation of the amount of the converted data which increases the classification error. In this manner, the order of inputting to the neural network is appropriately determined to improve a classification accuracy.

Example of the related art includes Japanese Laid-open Patent Publication No. 2018-55580.

SUMMARY

According to an aspect of the embodiments, a learning method executed by a computer, the method includes: acquiring input data and correct answer information added to the input data, the input data including a set of a plurality of pieces of relationship data in which relationships between variables are recorded respectively; determining each conversion rule corresponding to each of the plurality of pieces of relationship data such that correspondence relationships before and after a conversion of a common variable commonly included in the plurality of pieces of relationship data are the same, when converting a variable value included in each of the plurality of pieces of relationship data into converted data rearranging the variable values in an order of input, according to each collation pattern in which a reference for ordering the variable value which is input to a neural network and which corresponds to each of the plurality of pieces of relationship data, is defined by an array of a plurality of reference values; converting each of the plurality of pieces of relationship data into a plurality of pieces of the converted data according to each corresponding conversion rule; and inputting a set of the plurality of pieces of converted data to the neural network as the input data, thereby causing the neural network to learn a learning model based on the correct answer information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of information stored in a learning data DB;

FIG. 8 is a diagram illustrating an example of information stored in a collation pattern DB;

FIGS. 11A and 11B are diagrams for explaining input data and a neural network of a specific example;

FIGS. 12A and 12B are diagrams for explaining an initialization;

FIGS. 19A and 19B illustrate a diagram for explaining a variation calculation (part 6) of an amount of converted data;

FIGS. 22A and 22B are diagrams for explaining an update of parameters and an update of collation patterns;

FIGS. 25A to 25C are diagrams for explaining an initialization according to Example 2;

FIGS. 29A and 29B illustrate a diagram for explaining a variation calculation (part 3) of an amount of converted data according to Example 2;

FIGS. 35A and 35B illustrate a diagram for explaining a variation inner product of an importance K1 according to Example 2;

FIGS. 37A to 37C are diagrams for explaining an update of a parameter, an update of a collation pattern, and an update of an importance according to Example 2;

FIG. 39 is a diagram for explaining a learning example of a neural network using a collation pattern.

DESCRIPTION OF EMBODIMENTS

In the above technique, in a case where a plurality of pieces of relationship data are given as an input, learning accuracy may be deteriorated. For example, in a case where a variable (common variable) representing the same object is c included in each relationship data and it is important to associate the relationship data based on the common variable, in the above technique, an input order of each relationship data is determined according to the collation pattern for each relationship data. Thus, a correspondence relationship of the common variable after the conversion of each relationship data may not coincide between input data, learning considering the association between the relationship data is not secured, and learning accuracy is deteriorated and the classification accuracy is also deteriorated as a result.

According to an aspect, there is provided a learning program capable of suppressing deterioration of learning accuracy, a learning method, and a learning apparatus.

Hereinafter, Examples of the learning program, the learning method, and the learning apparatus disclosed herein are described in detail based on the drawings. The embodiments disclosed herein are not limited by the Examples. Each Example may be appropriately combined within a consistent range.

Example 1

Overall Configuration

Figure 1:
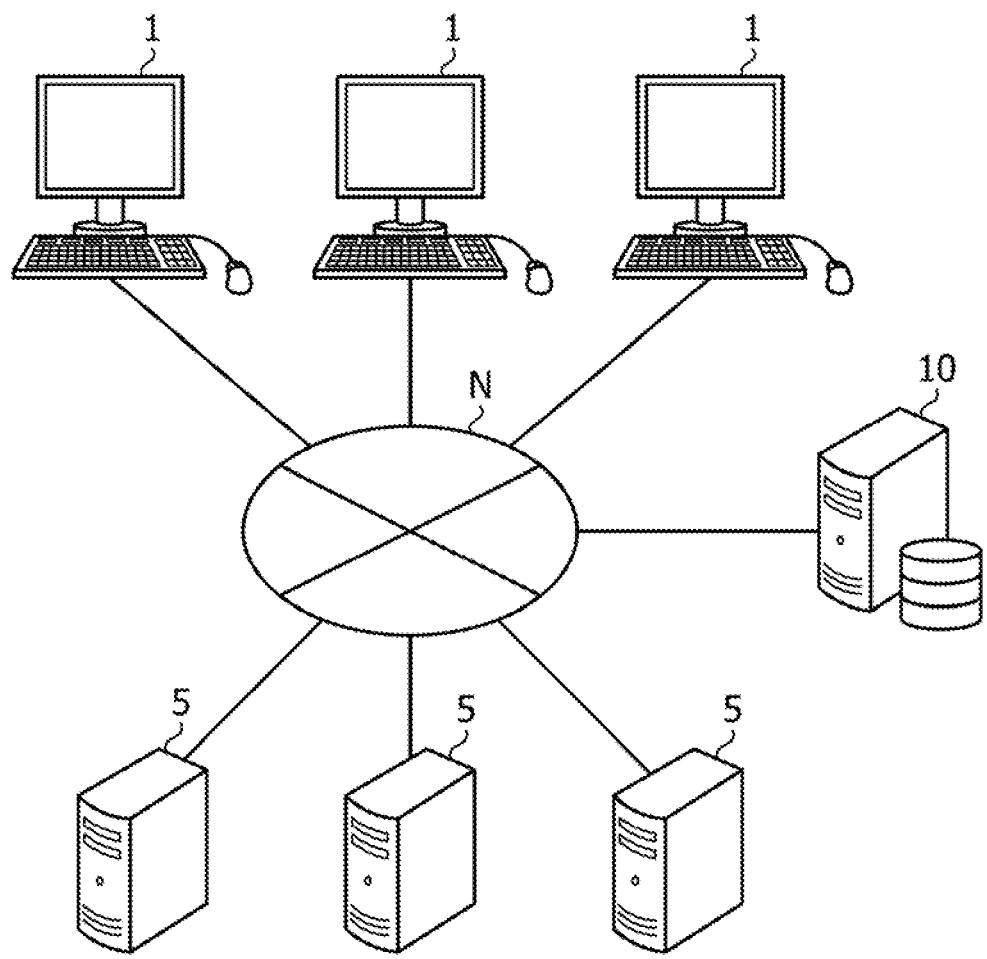
FIG. 1 is a diagram for explaining an example of an overall configuration of a system according to Example 1.

FIG. 1 is a diagram for explaining an example of an overall configuration of a system according to Example 1. As illustrated in FIG. 1, in the system, a plurality of terminal apparatuses 1, a plurality of servers 5, and a monitoring server 10 are coupled to each other so as to communicate with each other via a network N. Various communication networks such as the Internet or dedicated lines may be adopted for the network N regardless of wired or wireless.

Each of the plurality of terminal apparatuses 1 is an example of a computer device using a service provided by each of the plurality of servers 5, such as a personal computer, a tablet terminal, and a smart phone. For example, each of the plurality of terminal apparatuses 1 issues various commands to the server 5 to receive service.

Each of the plurality of servers 5 is an example of a computer for providing various services such as Web retrieval and cloud service to the terminal apparatus 1, and is, for example, a server. For example, each of the plurality of servers 5 receives and executes a command from the terminal apparatus 1 and transmits an execution result or the like to the terminal apparatus 1.

The monitoring server 10 is an example of the computer device which monitors communication executed via the network N, executes deep learning using a neural network by using a communication log and a command history, and constructs a learning model for determining the presence or absence of unauthorized communication. The monitoring server 10 inputs the communication log and the command history acquired from the network N to the learned learning model, and predicts (classifies) an occurrence of unauthorized communication in real time.

Figure 2:
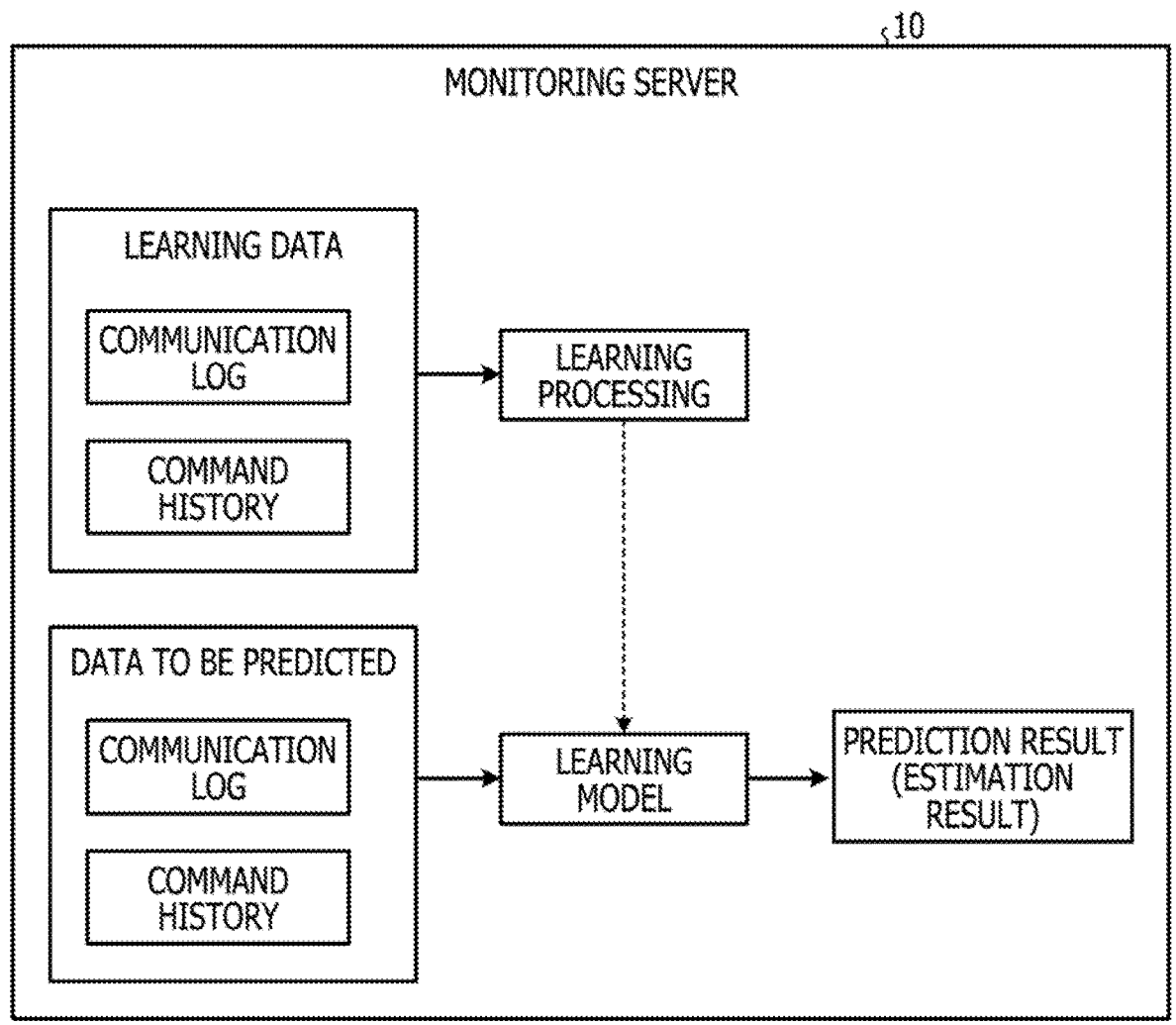
FIG. 2 is a diagram for explaining an overall flow from learning to prediction.

Learning and prediction of the monitoring server 10 are explained. FIG. 2 is a diagram for explaining an overall flow from learning to prediction. As illustrated in FIG. 2, the monitoring server 10 holds, as learning data, the communication log that is relationship data in which a relationship between a client internet protocol (IP) address and a host IP address is recorded, and the command history that is relationship data in which a relationship between the command and the host IP address is recorded, in order to learn the neural network detecting an internal fraud.

For example, the monitoring server 10 executes supervised learning by using the communication log with a label and the command history as supervised learning data. After the learning is completed, the monitoring server 10 inputs the communication log to be predicted and the command history into the learned learning model, and acquires prediction results. When the prediction result represents unauthorized communication, the monitoring server 10 notifies the manager or informs an alarm.

Figure 3:
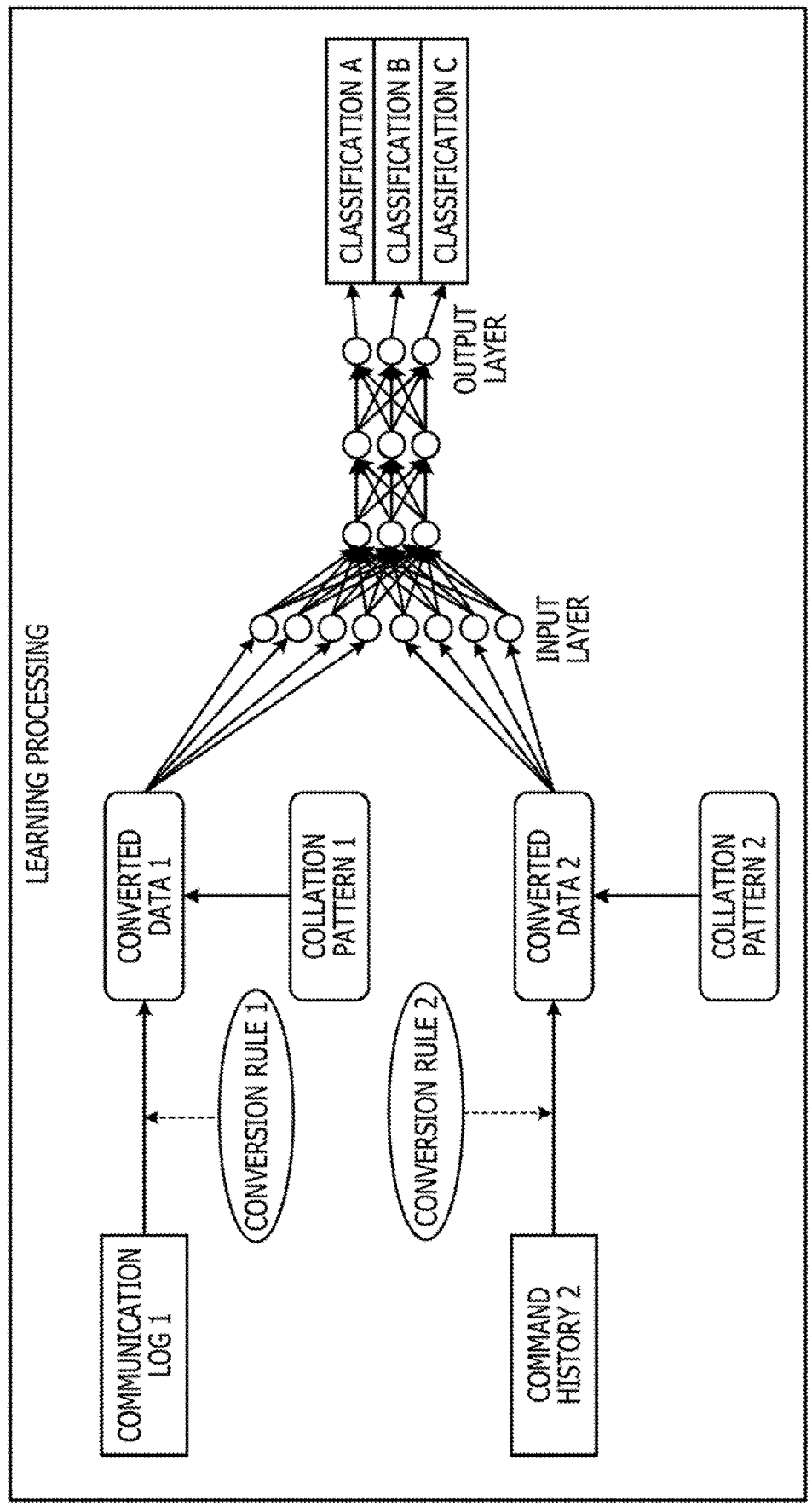
FIG. 3 is a diagram for explaining learning processing of a monitoring server according to Example 1.

Learning processing will be described in detail. FIG. 3 is a diagram for explaining learning processing of a monitoring server 10 according to Example 1. For example, in learning processing illustrated in FIG. 3, the monitoring server 10 holds learning data in which a label (1.0) is set in the communication log and the command history acquired during normal communication, and a label (0) is set in the communication log and the command history acquired during unauthorized communication.

The monitoring server 10 generates a conversion rule 1 such that an inner product of a vector having each value of a converted data 1 as each component and a vector having each value of a collation pattern 1 as each component is maximized. Then, the monitoring server 10 converts the communication log 1 into the converted data 1 by using the conversion rule 1 to input to the input layer.

Similarly, the monitoring server 10 generates a conversion rule 2 such that an inner product of a vector having each value of a converted data 2 as each component and a vector having each value of a collation pattern 2 as each component is maximized. Thereafter, the monitoring server 10 converts a command history 2 into the converted data 2 by using the conversion rule 2 to input to the input layer.

As described above, the monitoring server 10 inputs a plurality of pieces of relationship data of two of the communication log including a variable (common variable) representing the same object and the command history to the neural network to construct the learning model. That is, the monitoring server 10 associates the relationship data with each other based on the common variable and then learns features representing unauthorized communication through the neural network.

Figure 4:
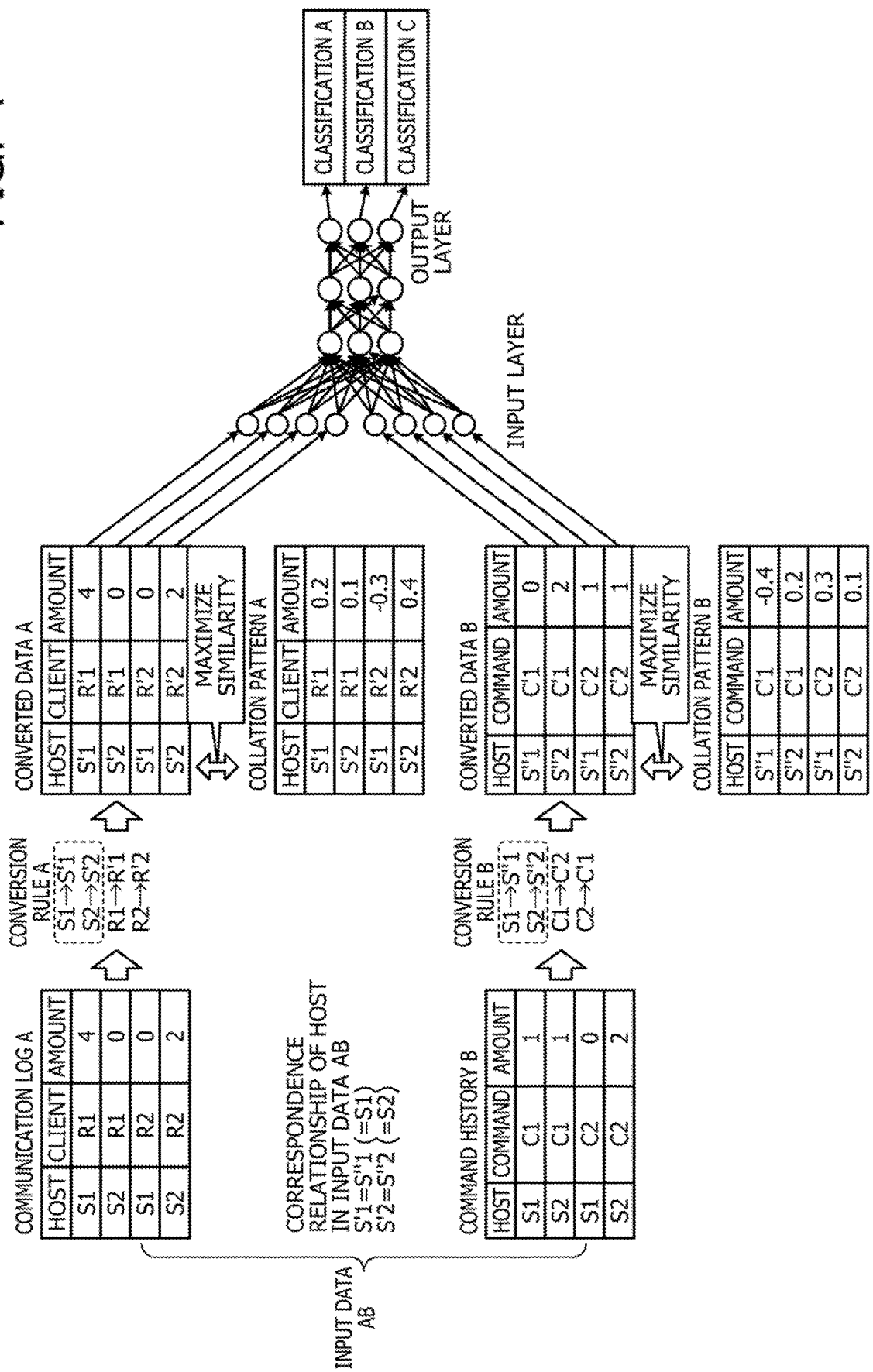
FIG. 4 is a diagram for explaining a problem of a common technique.
Figure 5:
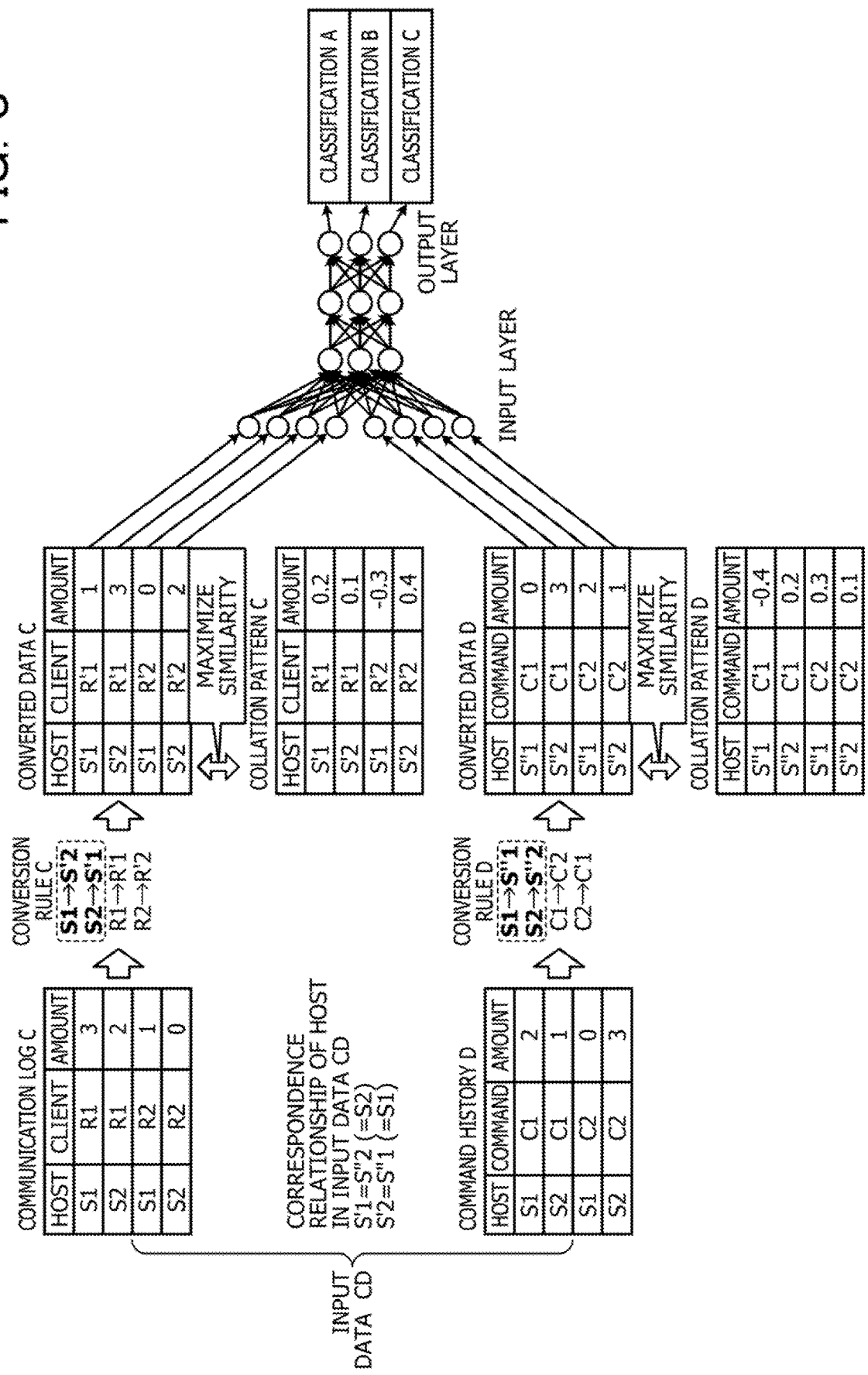
FIG. 5 is a diagram for explaining a problem of a common technique.

However, in a case where common techniques are used for generation of the conversion rule 1 and the conversion rule 2, learning accuracy may be deteriorated because each conversion rule is defined based on each collation pattern. Specific examples in which learning accuracy is deteriorated is described by using FIGS. 4 and 5. FIGS. 4 and 5 are diagrams for explaining a problem in a common technique. In FIGS. 4 and 5, the learning processing using the input data including the communication log and the command history in which an item 'host' is a common variable is described, but conversion rules are different from each other in FIGS. 4 and 5.

In the example illustrated in FIG. 4, with respect to the communication log, a conversion rule A is generated such that a similarity between converted data A obtained by converting a communication log A and a collation pattern A is maximized, and the converted data A is generated from the communication log A according to the conversion rule A. For example, the conversion rule A is a rule for converting S1 into S'1, converting S2 into S'2, converting R1 into R'1, and converting R2 into R'2.

Similarly, as to the command history, a conversion rule B is generated such that a similarity between converted data B obtained by converting a command history B and a collation pattern B is maximized, and the converted data B is generated from the command history B according to the conversion rule B. For example, the conversion rule B is a rule for converting S1 into S"1, converting S2 into S"2, converting C1 into C'2, and converting C2 into C'1.

That is, in the example illustrated in FIG. 4, the correspondence relationship of the host included in each relationship data (communication log A and command history B) in input data AB is 'S'1=S"1(=S1), S'2=S"2(=S2)'.

In the example illustrated in FIG. 5, as to the communication log, a conversion rule C is generated such that a similarity between converted data C obtained by converting a communication log C and a collation pattern C is maximized, and the converted data C is generated from the communication log C according to the conversion rule C. For example, the conversion rule C is a rule for converting S1 into S'2, converting S2 into S'1, converting R1 into R'1, and converting R2 into R'2.

Similarly, as to the command history, a conversion rule D is generated such that a similarity between converted data D obtained by converting a command history D and a collation pattern D is maximized, and the converted data D is generated from the command history D according to the conversion rule D. For example, the conversion rule D is a rule for converting S1 into S"1, converting S2 into S"2, converting C1 into C'2, and converting C2 into C'1.

That is, in the example illustrated in FIG. 5, the correspondence relationship of the host included in each relationship data (communication log C and command history D) in input data CD becomes 'S'1=S"2(=S2), S'2=S"1(=S1)'.

Thus, even in a case where learning is performed by using input data having the same item, the order of input to the neural network may differ depending on the conversion. In other words, even in a case where the IP address (common variable) of the host is included in each of the communication log and the command history, and the relationship between the client IP address and the command is important for classification in a detection of internal fraud, learning considering this relationship may not be executed because the input order of the common variables is different.

To explain regarding this problem in more detail, data indicating the same contents is desirably input to each neuron of the input layer of the neural network. For example, when inputting features of a person (height, weight, age) to the neural network, height is input to the first neuron, weight is input to the second neuron, and age is input to the third neuron. At this time, for example, if 'height, weight, age' is input regarding person A in this order, and 'weight, age, height' is input regarding person B in this order, the relationship between 'height', 'weight', and 'age' may not be appropriately learned, thereby appropriate classification also may not be performed.

In the diagrams of FIG. 4 and FIG. 5, the correspondence relationship between S' and S" does not coincide between input data AB and CD. That is, in the input data AB, S'1 and S"1 indicate the same host, but in the input data CD, S'1 and S"1 indicate different hosts. Therefore, in the input data AB, data related to the same host is input to the first and fifth neurons, but in the input data CD, data related to different hosts is input to the first and fifth neurons.

When it is expected that the classification performed by associating the host of the communication log with the host of the command history is greatly contributed to the accuracy, the positions of the neurons where data related to the same host in the communication log and the command history are input are required to coincide between input data. Since the positions coincide between input data, it is possible to appropriately learn the relationship between the communication log and the command history related to the same host. In other words, since a situation that, the positions do not coincide between the input data, is equivalent to a situation that the orders of inputting the features are different when inputting the features of the person, appropriate learning and classification may not be performed in the situations in FIG. 4 and FIG. 5.

If the parameter or the collation pattern of the neural network is appropriately updated, the correspondence relationships between S' and S" may be converted so as to coincide with each other between the input data. However, as a mechanism for updating the parameter or the collation pattern of the neural network, it may not be guaranteed that the correspondence relationships between S' and S" are coincident between input data. In other words, it is possible to classify with higher accuracy in a way that the correspondence relationship between S' and S" in some input data does not coincide with the correspondence relationship between S' and S" in other input data. This state is generally called overlearning, and although high accuracy may be obtained in input data used for learning, there is a high possibility of low accuracy for unknown input data that is not used for learning.

Thus, when the monitoring server 10 according to Example 1 generates each conversion rule for converting each relationship data (communication log and command history) in the input data, the monitoring server 10 provides a restriction for making the conversion rules the same for the common variable.

Specifically, the monitoring server 10 receives input data configured of a plurality of pieces of relationship data respectively including two or more variables. When the conversion rule for converting the variable value included in each of the plurality of pieces of relationship data into the converted data corresponding to the collation pattern is determined for each of the plurality of pieces of relationship data, the monitoring server 10 determines the conversion rules for each of the plurality of pieces of relationship data such that the conversion rules for a variable (common variable) commonly included in the plurality of pieces of relationship data are the same. Thereafter, when updating the collation pattern, the monitoring server 10 determines an update amount based on the sum of similarities with the converted data of the plurality of pieces of relationship data.

Thus, the monitoring server 10 may match the correspondence relationships of the common variable after the conversion of each relationship data between the input data, and may execute learning considering the association between the relationship data, thereby suppressing the deterioration of the learning accuracy. In Example 1, a case where the monitoring server 10 executes learning processing and prediction processing (classification processing) is explained, but each processing may be executed by separate servers.

Functional Configuration

Figure 6:
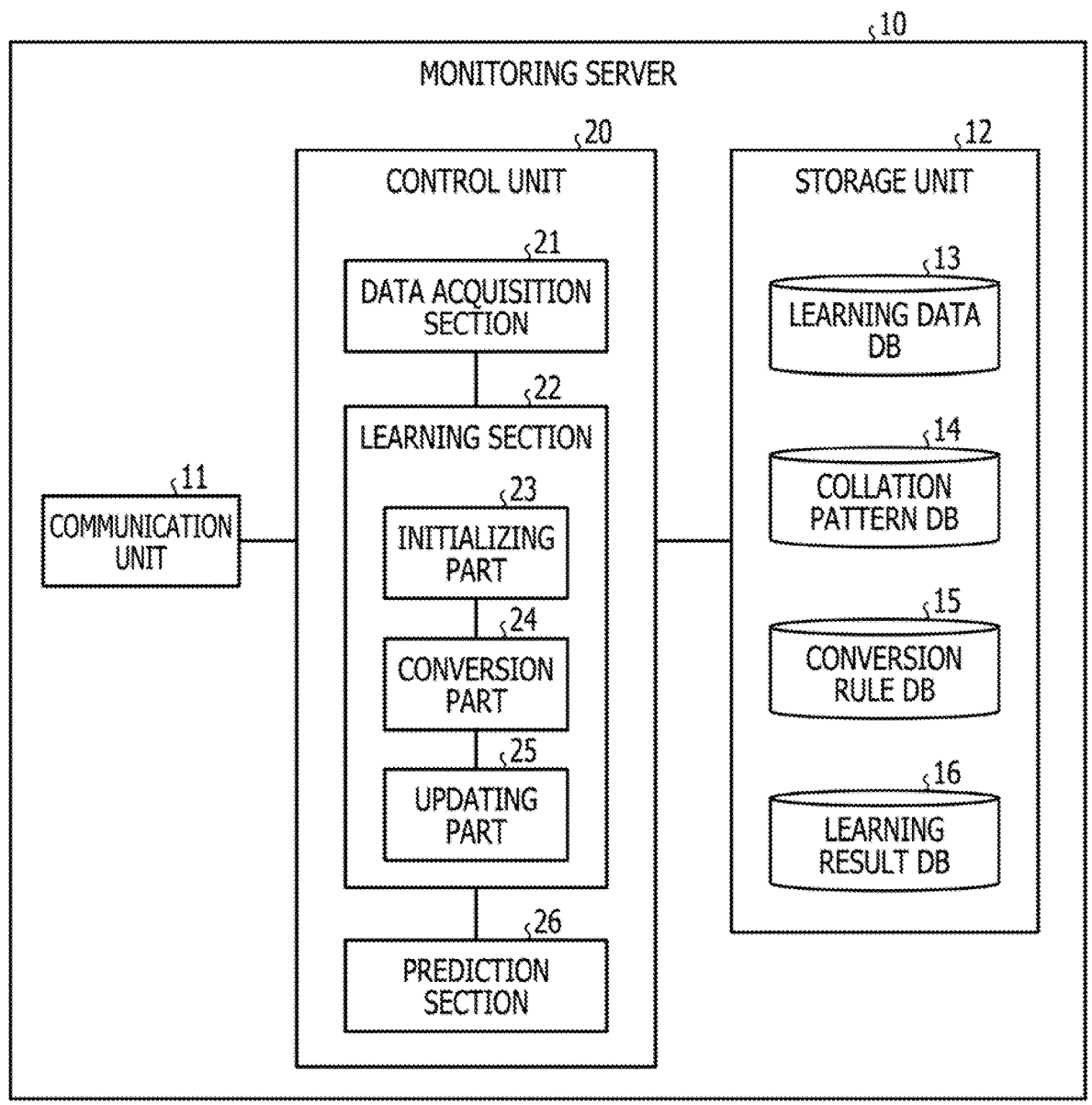
FIG. 6 is a functional block diagram illustrating a functional configuration of the monitoring server according to Example 1.

FIG. 6 is a functional block diagram illustrating a functional configuration of the monitoring server 10 according to Example 1. As illustrated in FIG. 6, the monitoring server 10 includes a communication unit 11, a storage unit 12, and a control unit 20.

The communication unit 11 is a processing unit for controlling communication with the other device, for example, a communication interface. For example, the communication unit 11 receives various kinds of communication transmitted and received via a network N and transmits a prediction result or the like to a manager terminal.

The storage unit 12 is a storage device for storing data, a program executed by the control unit 20, or the like, for example, a memory, a hard disk, or the like. The storage unit 12 stores a learning data DB 13, a collation pattern DB 14, a conversion rule DB 15, and a learning result DB 16.

The learning data DB 13 is a database for storing learning data used for learning a learning model using a neural network. Specifically, the learning data DB 13 stores a plurality of pieces of learning data in which data having a communication log and a command history as one set is associated with a label.

FIG. 7 is a diagram illustrating an example of information stored in the learning data DB 13. As illustrated in FIG. 7, the learning data DB 13 stores 'acquisition time, data, and label' in association with each other. The 'acquisition time' stored here indicates the time when the data is acquired, and the 'data' indicates the data to be learned. The 'label' is correct answer information used for learning of the neural network, '0' is set when indicating unauthorized communication, and '1.0' is set when indicating 'normal communication'.

The example illustrated in FIG. 7 indicates that data (communication log 1 and command history 2) acquired during the acquisition time '10:00 to 10:10' is acquired through normal communication (label=1.0). In the communication log 1, the 'host' indicating the IP address of the communication source, the 'client' indicating the IP address of the client terminal that is the communication destination, and the 'amount' indicating the generated communication amount are associated with each other. For example, as to the communication log 1, communication from a communication source host S1 to a communication destination host R1 has occurred three times.

In the command history 2, the 'host' indicating the IP address of the command issuing source, the 'command' indicating the issued command, and the 'amount' indicating the amount of the generated command are associated with each other. For example, in the command history 2, it is indicated that a command C1 is executed twice from a host S2. The user or the like may designate which item is common among the items included in the communication log and the items included in the command history, and may designate them by a correspondence table or the like.

Each record of the communication log 1 or the command history 2 corresponds to the relationship, 'host', 'client', 'command' or the like corresponds to a variable, 'S1' or the like corresponds to a variable value, and the variable value is an input target to the neural network.

The collation pattern DB 14 is a database that stores a collation pattern in which a reference for ordering numerical values input to the neural network is indicated by an array of a plurality of reference values. Specifically, the collation pattern DB 14 stores a collation pattern for each of the communication log and the command history that are relationship data to be learned. Each collation pattern stored in the collation pattern DB 14 is updated by the control unit 20 described later.

FIG. 8 illustrates an example of information stored in the collation pattern DB 14. As illustrated in FIG. 8, the collation pattern DB 14 stores the collation pattern 1 for the communication log and the collation pattern 2 for the command history. The collation pattern 1 indicates that the amount corresponding to the records of host S'1 and client R'1, the amount corresponding to the records of host S'2 and client R'1, the amount corresponding to the records of host S'1 and client R'2, the amount corresponding to the records of host S'2 and client R'2 are input in this order to the neural network.

Similarly, the collation pattern 2 indicates that the amount corresponding to the records of host S"1 and command C'1, the amount corresponding to the records of host S"2 and command C'1, the amount corresponding to the records of host S"1 and command C'2, and the amount corresponding to the records of host S"2 and command C'2 are input in this order to the neural network.

The conversion rule DB 15 is a database that stores rules for converting learning data into converted data in a format for inputting to the input layer. Specifically, the conversion rule DB 15 stores a conversion rule for each of the communication log and the command history which are relationship data to be learned. Each conversion rule stored in the conversion rule DB 15 is updated by the control unit 20 described later.

Figure 9:
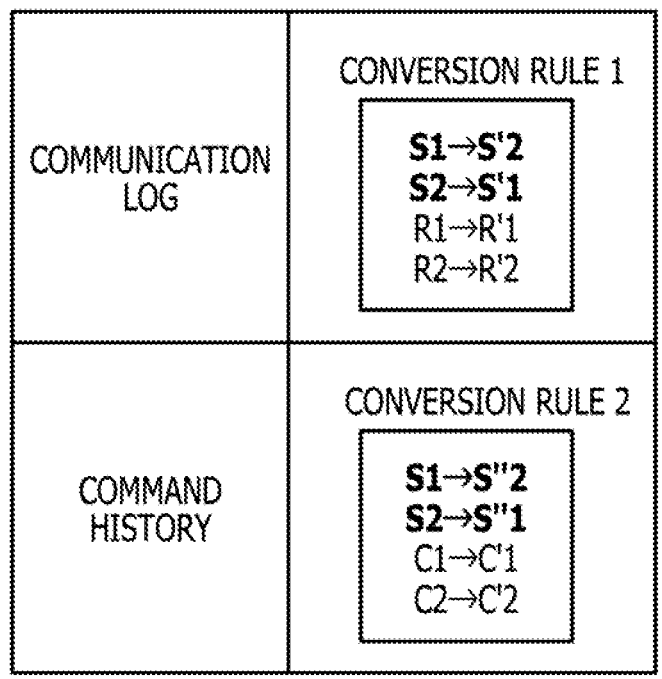
FIG. 9 is a diagram illustrating an example of information stored in a conversion rule DB.

FIG. 9 is a diagram illustrating an example of information stored in the conversion rule DB 15. As illustrated in FIG. 9, the conversion rule DB 15 stores the conversion rule 1 for the communication log and the conversion rule 2 for the command history. The conversion rule 1 indicates that S1 is converted into S'2, S2 is converted into S'1, R1 is converted into R'1, and R2 is converted into R'2. The conversion rule 2 indicates that S1 is converted into S"2, S2 is converted into S"1, C1 is converted into C'1, and C2 is converted into C'2.

The details are described later, the 'conversion from S1 to S'2' and the 'conversion from S2 to S'1' in the conversion rule 1, and the conversion 'from S1 to S"2' and the conversion 'from S2 to S"1' in the conversion rule 2 are contents generated under the restriction of making the conversion rules of the common variable the same, and indicate the same conversion contents. That is, regardless of the order in which the common variable in the communication log and the command history are stored in the relationship data, the common rule guarantees that they are input in a predetermined order when they are input to the neural network.

The learning result DB 16 is a database for storing learning results by the control unit 20 described later. Specifically, the learning result DB 16 stores classification results of the learning data or the value of each parameter of the neural network learned by deep learning. That is, the learning result DB 16 stores various kinds of information to be used for constructing a learned learning model.

The control unit 20 is a processing unit for managing the entire monitoring server 10, for example, a processor. The control unit 20 includes a data acquisition section 21, a learning section 22, and a prediction section 26. The data acquisition section 21, the learning section 22, and the prediction section 26 are examples of electronic circuits included in the processor or examples of processes executed by the processor.

The data acquisition section 21 is a processing unit for acquiring various kinds of data through communication transmitted or received by the network N. For example, the data acquisition section 21 generates the communication log or the command history by using each data. The data acquisition section 21 assigns a label designated by the user to the generated communication log or command history, and stores the label in the learning data DB 13 as learning data. The learning data may be manually generated and stored by the user.

After the learning of the learning model is completed, the data acquisition section 21 acquires various kinds of data through communication transmitted or received by the network N to generate the communication log or the command history. The data acquisition section 21 outputs the generated communication log or command history to the prediction section 26 as data to be predicted.

The learning section 22 is a processing unit that includes an initializing part 23, a conversion part 24, and an updating part 25, learns the neural network for classifying normal communication and unauthorized communication by using two relationship data which is learning data, and constitutes the learning model. Specifically, the learning section 22 calculates the change amount of the converted data when the collation pattern to be updated is minutely converted, and updates the collation pattern or parameters of the neural network by using the calculated change amount. The timing for terminating the learning processing may be optionally set at the time point when the learning using the prescribed number or more of learning data ends, or the time point when a restoration error becomes less than a threshold.

The initializing part 23 is a processing unit for initializing each collation pattern or parameters of the neural network. Specifically, when the learning processing is started, the initializing part 23 sets a random value to each amount of the collation pattern for the communication log and each amount of the collation pattern for the command history stored in the collation pattern DB 14. When the learning processing is started, the initializing part 23 sets a random value for each parameter of the neural network. Not only a random value but also an initial value designated in advance may also be set.

The conversion part 24 is a processing unit for converting input data so as to maximize the total sum of similarities between the collation pattern and converted data, under the restriction that conversion contents of the common variable (hosts) commonly included in each relationship data are made the same between the relationship data.

Specifically, the conversion part 24 determines the conversion rule 1 of the communication log and the conversion rule 2 of the command history such that the total sum (total) of similarities between each converted data and each collation pattern is maximized. At this time, the conversion part 24 generates the conversion rule 1 for the communication log and the conversion rule 2 for the command history, under the restriction that conversion rules for the 'host' which is a common variable between the communication log and the command history are made identical.

The conversion part 24 converts the communication log 1 which is input data into converted data 1 by using the generated conversion rule 1, and converts the command history 2 which is input data into converted data 2 by using the generated conversion rule 2. Thereafter, the conversion part 24 inputs the converted data 1 and the converted data 2 to each input layer of the neural network in the converted order. That is, the conversion part 24 inputs the communication log 1 and the command history 2 to the input layer in the order defined by each collation pattern.

The updating part 25 is a processing unit for updating each conversion rule, each collation pattern, and parameters of the neural network. Specifically, the updating part 25 acquires the output result of the input layer to which each converted data is input by the conversion part 24, from an output layer of the neural network. The updating part 25 acquires an error between a label of the input data and the output result. Thereafter, the updating part 25 updates each conversion rule, each collation pattern, and the parameters of the neural network by using the error obtained by error back propagation. The specific methods of the update will be described later.

While the learning processing is continued, the initializing part 23, the conversion part 24, and the updating part 25 execute each processing for each input data, learn each collation pattern and the parameters of the neural network, and construct a learning model. The initializing part 23, the conversion part 24, and the updating part 25 store the learning result in the learning result DB 16 when the learning processing ends.

The prediction section 26 is a processing unit for predicting unauthorized communication by using the learned learning model. Specifically, the prediction section 26 reads the parameters of the neural network from the learning result DB 16 to construct a learned learning model. The prediction section 26 reads the collation pattern 1 for the communication log learned and the collation pattern 2 for the command history learned from the learning result DB 16.

The prediction section 26 generates each conversion rule (conversion rule 1, conversion rule 2) such that the total sum of each similarity between each collation pattern and the converted data is maximized, under the restriction that the conversion contents of the common variable (host) of input data (communication log, command history) to be predicted are made the same between the relationship data. Then, the prediction section 26 converts the communication log into converted data 1 according to the generated conversion rule 1 and converts the command history into converted data 2 according to the generated conversion rule 2. Thereafter, the prediction section 26 inputs the converted data 1 and the converted data 2 to the neural network to acquire the output result.

The prediction section 26 determines whether the communication is unauthorized communication based on the output result. For example, when the probability of normal communication is 30% and that of unauthorized communication is 70% in the output result, the prediction section 26 determines the input data as unauthorized communication. The prediction method may be optionally changed by the configuration of the output layer.

Flow of Processing

Figure 10:
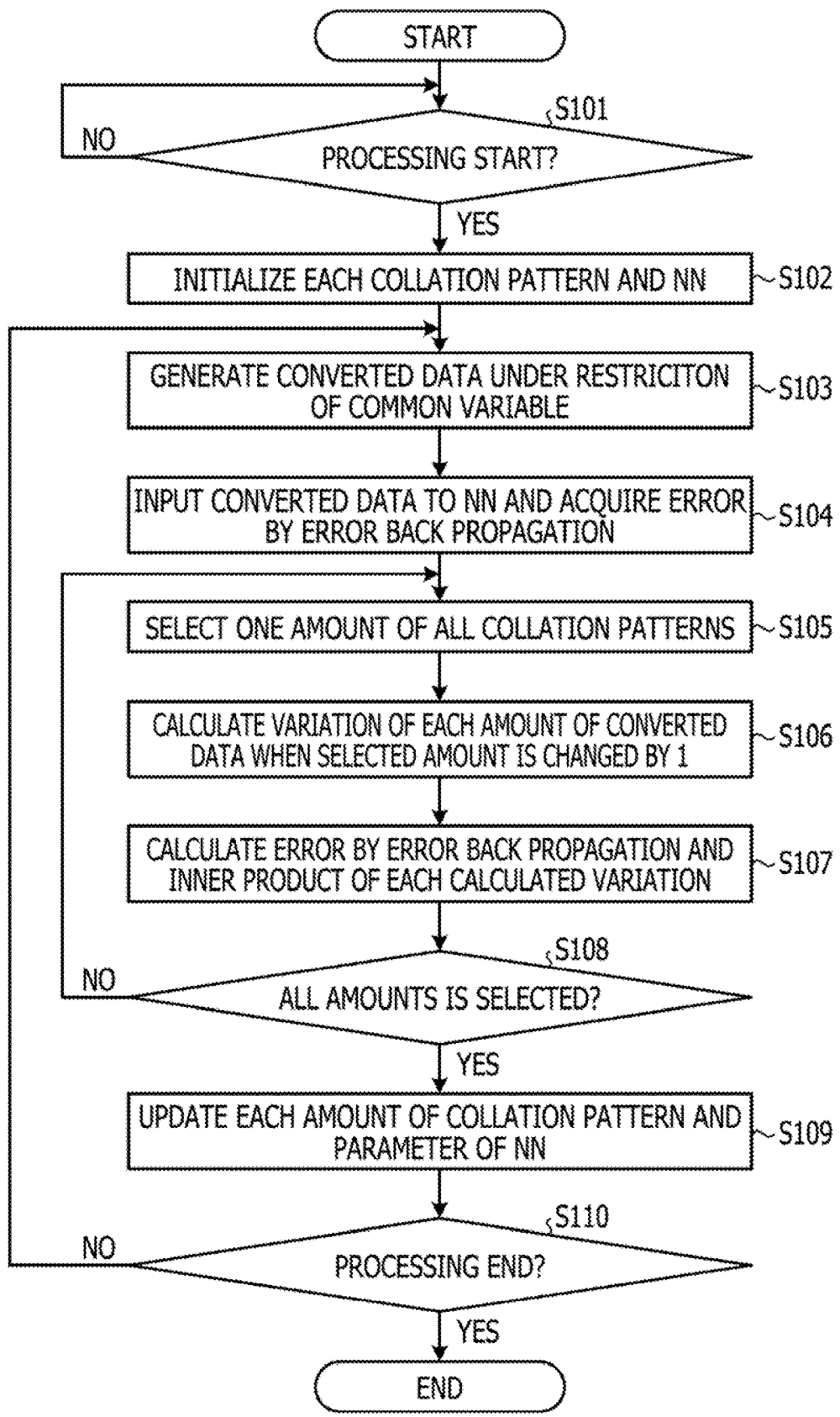
FIG. 10 is a flowchart illustrating a flow of learning processing according to Example 1.

Next, details of learning processing executed by the learning section 22 are explained. FIG. 10 is a flowchart illustrating a flow of the learning processing according to Example 1. As illustrated in FIG. 10, when the processing is started (S101: Yes), the initializing part 23 of the learning section 22 randomly initializes each collation pattern and parameters of a neural network (NN) (S102).

Then, the conversion part 24 generates each conversion rule such that a total sum of each similarity between the collation pattern and the converted data is maximized, under the restriction that the conversion contents of the common variable commonly included in each relationship data are made the same between the relationship data, and generates each converted data according to each conversion rule (S103).

The updating part 25 inputs each converted data to the neural network and acquires an error by error back propagation (S104).

Subsequently, the updating part 25 selects one amount from all collation patterns (S105), and calculates a variation of each amount of converted data when the selected amount is changed by 1 (S106). Thereafter, an updating part 25 calculates the error of error back propagation and the inner product of each calculated variation (S107).

When an unselected amount exists in all collation patterns (S108: No), S105 is executed for the unselected amount. On the other hand, when the processing is completed for the all amounts of the all collation patterns (S108: Yes), the updating part 25 updates each amount of collation pattern and the parameter of the neural network (S109).

Thereafter, when the learning processing is continued (S110: No), S103 and subsequent processes are repeated, and when an end condition is satisfied, the learning processing ends (S110: Yes).

Specific Example

Then, a specific example of learning processing to be executed by the learning section 22 is explained with reference to FIGS. 11A to 22B.

Assumption

First, input data and a neural network are explained as assumption for learning processing. FIGS. 11A and 11B are diagrams for describing input data and a neural network of a specific example. As illustrated in FIG. 11A, description will be made using input data to which a teacher label '1.0' is assigned. The input data includes relationship data X composed of 'term S, term R, amount' and relationship data Y composed of 'term S, term C, amount'.

The relationship data X has 'S1, R1, 3', 'S2, R1, 1', 'S1, R2, 2', and 'S2, R2, 0' as the 'term S, term R, amount'. The relationship data Y has 'S1, C1, 2', 'S2, C1, 1', 'S1, C2, 0', and 'S2, C2, 3' as the 'term S, term C, amount'. That is, the input data is eight pieces of data, and the 'term S' included in the relationship data X and Y becomes a common variable. For example, the term S is a host name or an IP address of a communication source, R2 is an IP address of a client terminal of a communication destination, and the term C is contents of a command, and the amount is the number of times of communication, the number of times of command, or the like, and is data to be learned input to the input layer.

The neural network used here has eight input layers corresponding to eight pieces of input data (amount of eight pieces) as illustrated FIG. 11B. Although an intermediate layer is omitted, parameters (for example, weight) from each input layer to the output layer are defined as 'w1 to w8', propagation of values from the input layer to the output layer is called forward propagation, updating a parameter from the output layer to the input layer is called back propagation. The specific example will be described by using supervised learning in which the parameter is updated by back propagation, using an error between the output result obtained from the output layer and the teacher label.

Initialization

Next, the initialization executed in S102 of FIG. 10 will be described. FIGS. 12A and 12B are diagrams for explaining an initialization. As illustrated in FIG. 12A, a learning section 22 sets a random value to each amount of a collation pattern XA1 for communication log and each amount of a collation pattern YA1 for command history. The collation pattern XA1 is composed of 'term S, term R, amount'. The 'term S, term R' is information for specifying input data, and the 'amount' is a reference value. The collation pattern YA1 is composed of 'term S, term C, amount'. The 'term S, term C' is information for specifying input data, and the 'amount' is a reference value.

In the collation pattern XA1 with the initial values set, 'S'1, R'1, 0.2', 'S'2, R'1, 0.1', 'S'1, R'2, −0.3', and 'S'2, R'2, 0.4' are set as 'term S, term R, amount'. In the collation pattern YA1 with the initial values set, 'S"1, C'1, −0.4', 'S"2, C'1, 0.2', 'S"1, C'2, 0.3', and 'S"2, C'2, 0.1' are set as 'term S, term C, amount'.

That is, according to each collation pattern, it is defined that each amount corresponding to 'S'1, R'1', 'S'2, R'1', 'S'1, R'2', 'S'2, R'2', 'S"1, C'1', 'S"2, C'1', 'S"1, C'2', and 'S"2, C'2' is input to the input layer in this order.

As illustrated in FIG. 12B, the learning section 22 sets '1.2, −0.1, −0.9, 0.6, 0.4, 0.8, −1.3, 0.2' for each of the parameters 'w1, w2, w3, w4, w5, w6, w7, w8' of the neural network.

Generation of Converted Data

Figure 13:
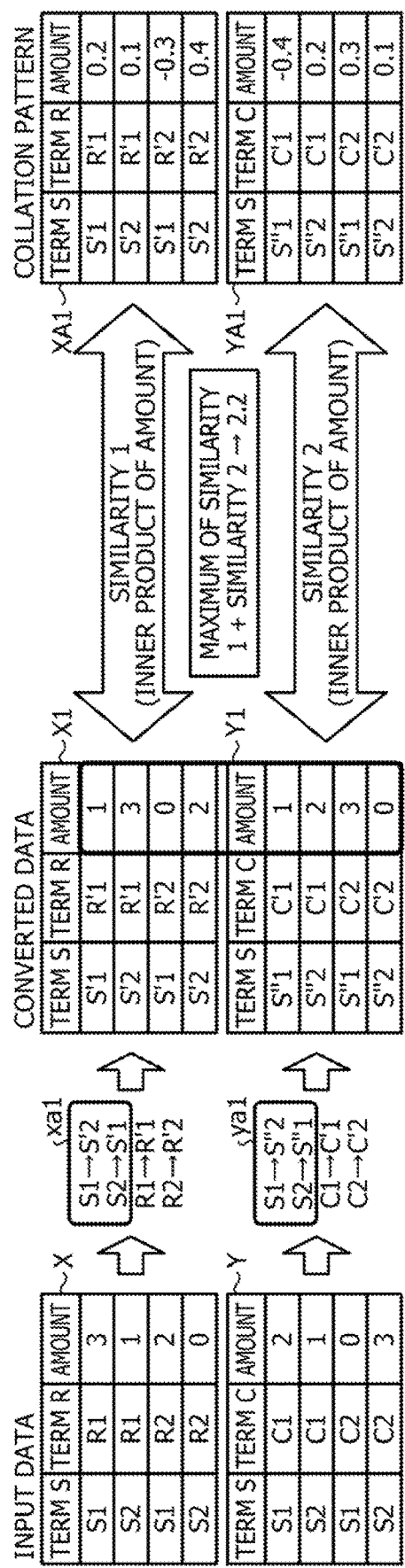
FIG. 13 is a diagram for explaining a generation of converted data.

Next, the converted data executed in S103 of FIG. 10 will be described. FIG. 13 is a diagram for explaining a generation of converted data. As illustrated in FIG. 13, the learning section 22 generates a conversion rule xa1 and a conversion rule yb1 such that the sum of the inner product (similarity 1) of each amount of the converted data X1 converted from the input data X and each amount of the collation pattern XA1, and the inner product (similarity 2) of each amount of the converted data Y1 converted from the input data Y and each amount of the collation pattern YA1 are maximized (condition 1). At this time, the learning section 22 makes the contents for the conversion rules of the variable values (S1, S2) set in the common variable 'term S' the same (condition 2).

The conversion rules or converted data in FIG. 13 illustrates an example satisfying condition 1 and condition 2. Specifically, the similarity 1 between each amount of the converted data X1 and each amount of the collation pattern XA1 is the inner product '(1×0.2)+(3×0.1)+(0×−0.3)+(2×0.4)=1.3'. The similarity 2 between each amount of the converted data Y1 and each amount of the collation pattern YA1 is, the inner product '(1×−0.4)+(2×0.2)+(3×0.3)+(0×0.1)=0.9'.

Therefore, 'similarity 1 (1.3)+similarity 2 (0.9)=2.2' is the maximum value of 'similarity 1+similarity 2', and the conversion rule xa1 at this time is 'S1→S'2, S2→S'1, R1→R'1, R2→R'2', and the conversion rule ya1 is 'S1→S"2, S2→S"1, C1→C'1, C2→C'2'. That is, 'S1→S'2, S2→S'1' of the conversion rule xa1 and 'S1→S"2, S2→S"1' of the conversion rule ya1 indicate the same conversion contents such that the variable values 'S2' and 'S1' of the common variable "term S" in each input data are input in this order. The arrows indicate conversion from the original variable values to the converted variable values.

Update: Part 1

Figure 14A:
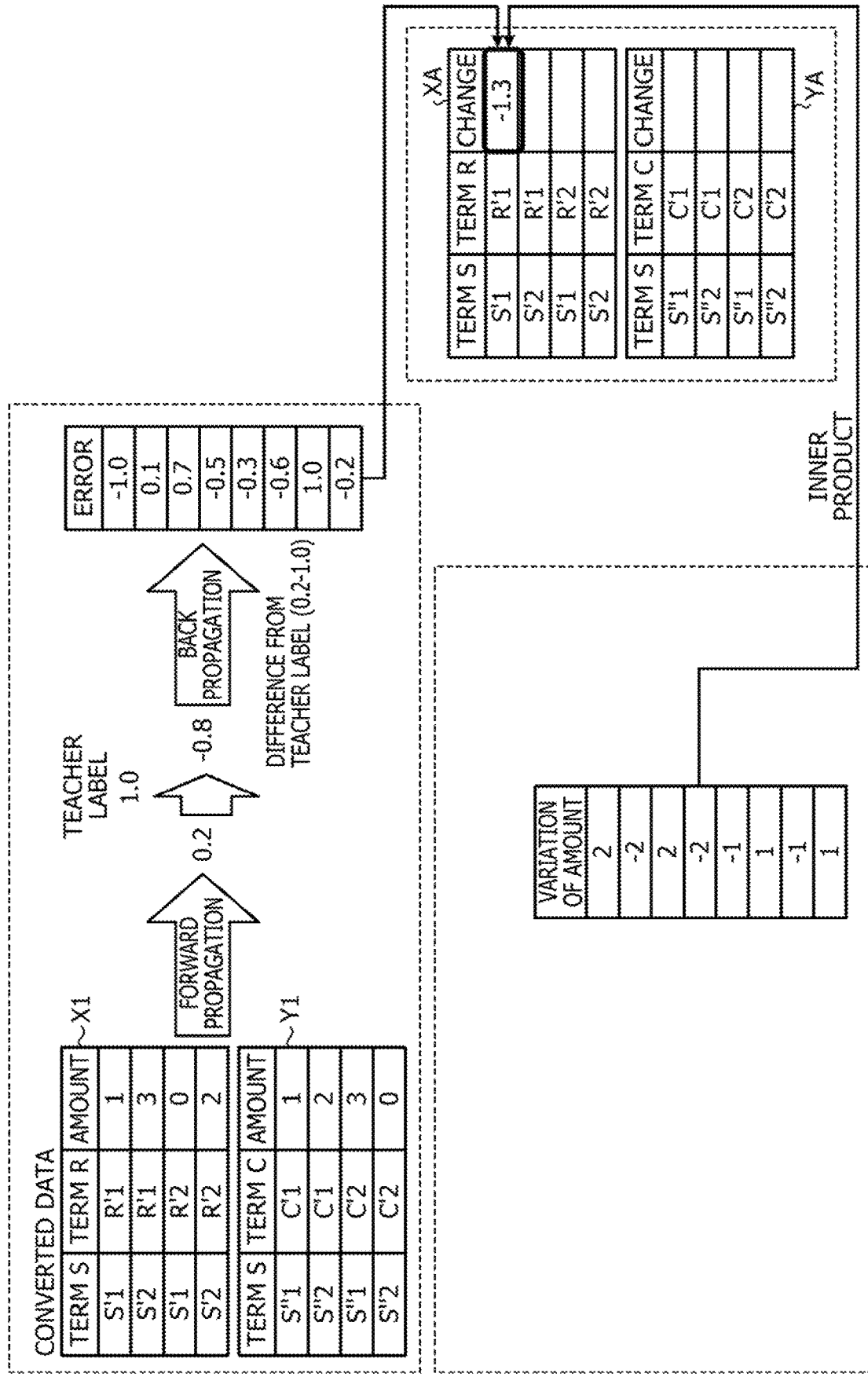
FIGS. 14A and 14B illustrate a diagram for explaining an error acquisition and a variation calculation (part 1) of an amount of converted data.
Figure 14B:
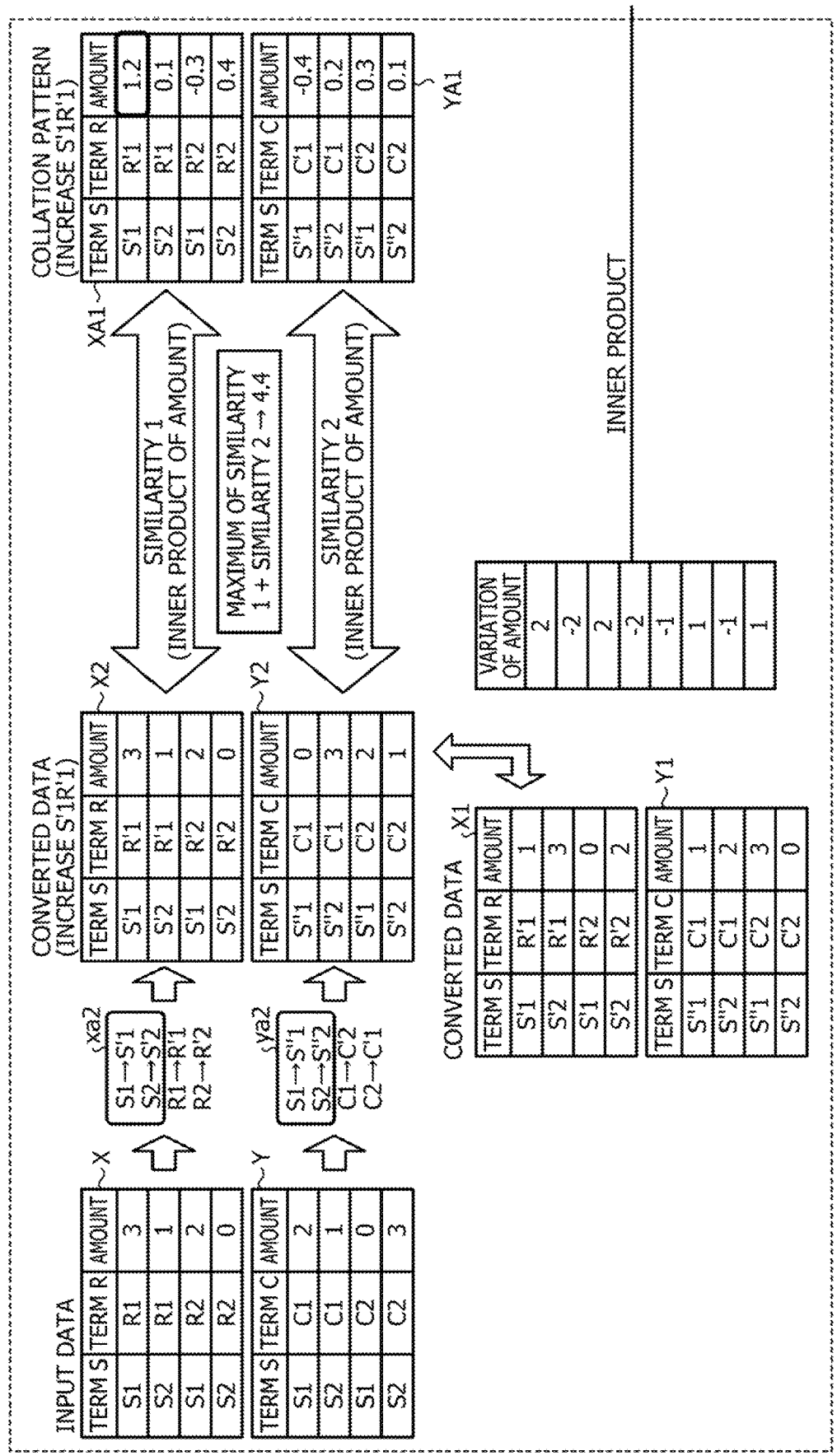

Next, S104 to S108 in FIG. 10 will be specifically described. FIG. 14 (i.e., FIGS. 14A and 14B) is a diagram for explaining an error acquisition and a variation calculation (part 1) of an amount of converted data. First, the learning section 22 inputs the converted data X1 and the converted data Y1 generated in FIG. 13 to an input layer in order from the head to execute forward propagation, and acquires an output value '0.2' from the output layer. The learning section 22 calculates an error '0.2−1.0=−0.8' between the output value and the teacher label, executes back propagation based on the error '−0.8', and acquires the error '−1.0, 0.1, 0.7, −0.5, −0.3, −0.6, 1.0, −0.2'.

Then, the learning section 22 selects one out of all amounts of the collation pattern (in this case, the amount of S'1R'1) and increases it by 1. Specifically, the learning section 22 increases only the amount of 'S'1, R'1, 0.2' by 1 in the collation pattern XA1 illustrated in FIG. 13 to generate 'S'1, R'1, 1.2', 'S'2, R'1, 0.1', 'S'1, R'2, −0.3', and 'S'2, R'2, 0.4'.

The learning section 22 generates a conversion rule xa2 and a conversion rule ya2 under the restriction of making the conversion rules of the common variable the same, such that the total sum of similarity 1 and similarity 2 of the collation pattern and the converted data is maximized.

The conversion rule and the converted data illustrated in FIG. 14 represent an example satisfying the maximum value of the similarity and restriction. Specifically, the similarity 1 between each amount of the converted data X2 and each amount of the collation pattern XA1 is, the inner product '(3×1.2)+(1×0.1)+(2×−0.3)+(0×0.4)=3.1'. The similarity 2 between each amount of the converted data Y2 and each amount of the collation pattern YA1 is, the inner product '(0×−0.4)+(3×0.2)+(2×0.3)+(1×0.1)=1.3'.

Therefore, 'similarity 1 (3.1)+similarity 2 (1.3)=4.4' is the maximum value of 'similarity 1+similarity 2', and the conversion rule xa2 at this time is 'S1→S'1, S2→S'2, R1→R'1, R2→R'2', and the conversion rule ya2 is 'S1→S"1, S2→S"2, C1→C'1, C2→C'2'. That is, 'S1→S'1, S2→S'2' of the conversion rule xa1 and 'S1→S"1, S2→S"2' of the conversion rule ya2 indicate the same conversion contents.

Subsequently, the learning section 22 subtracts the converted data before the update from the converted data after the update to calculate the variation (change amount) of the converted data. Specifically, the learning section 22 calculates a variation '2, −2, 2, −2' between each amount '3, 1, 2, 0' of the converted data X2 and each amount '1, 3, 0, 2' of the converted data X1, and a variation '−1, 1, −1, 1' between each amount '0, 3, 2, 1' of the converted data Y2 and each amount '1, 2, 3, 0' of the converted data Y1.

Thereafter, the learning section 22 calculates the inner product of the error obtained by error back propagation, and the variation of the amount of the converted data. Specifically, the learning section 22 calculates '(−1.0×2)+(0.1×−2)+(0.7×2)+(−0.5×−2)+(−0.3×−1)+(−0.6×1)+(1.0×−1)+(−0.2×1)=−1.3' as the inner product of error '−1.0, 0.1, 0.7, −0.5, −0.3, −0.6, 1.0, −0.2' and variation '2, −2, 2, −2, −1, 1, −1, 1'. The learning section 22 sets the calculated '−1.3' to the change of 'S'1, R'1' of the updated collation pattern XA.

Update: Part 2

Figure 15A:
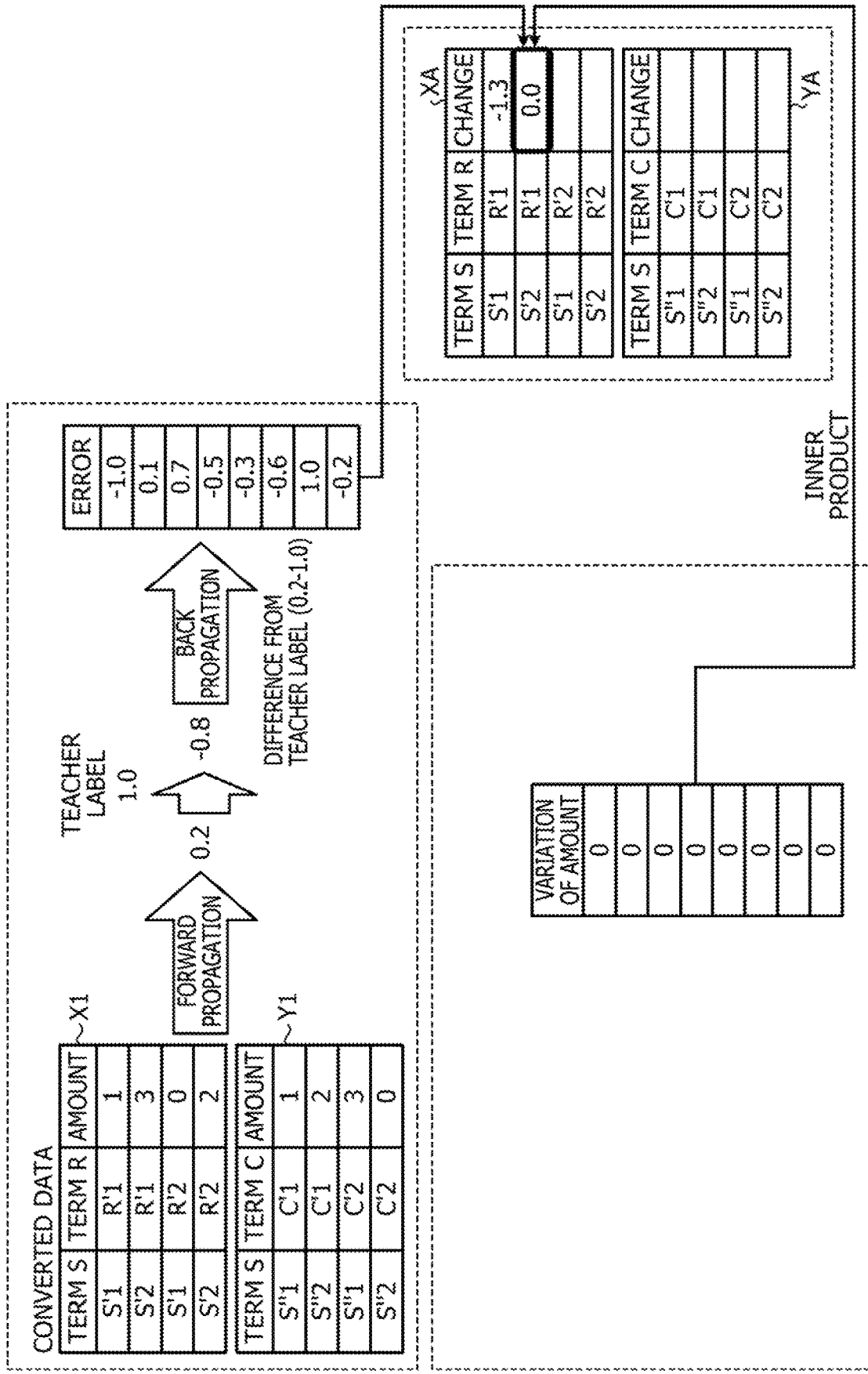
FIGS. 15A and 15B illustrate a diagram for explaining a variation calculation (part 2) of an amount of converted data.
Figure 15B:
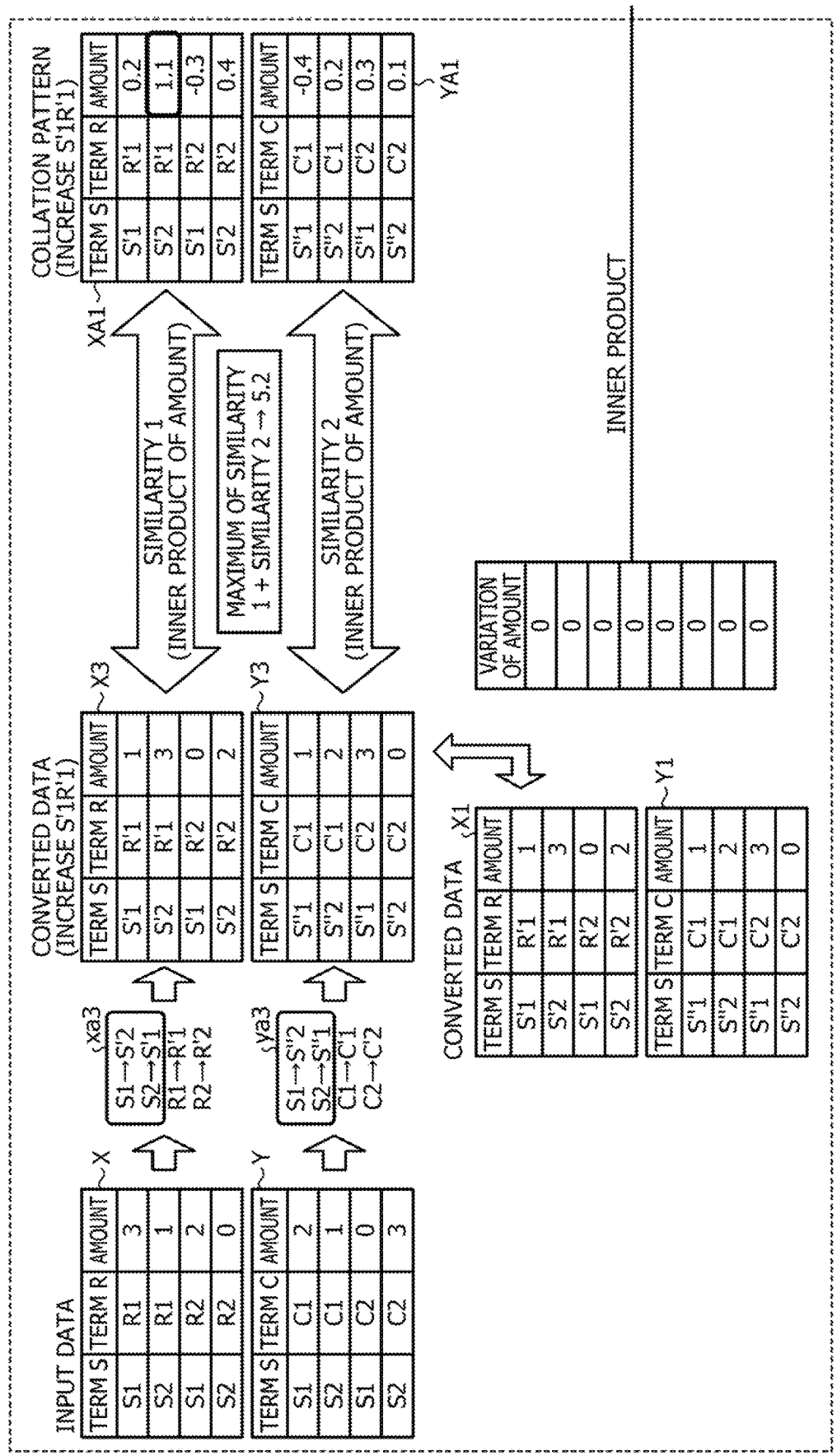

Subsequently, the update of the next amount of the collation pattern will be described. FIG. 15 (i.e., FIGS. 15A and 15B) is a diagram for explaining a variation calculation (part 2) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S'2R'1) out of all amounts of the collation pattern and increases it by 1. Specifically, the learning section 22 increases only the amount of 'S'2, R'1, 0.1' by 1 out of the collation pattern XA1 illustrated in FIG. 13 to generate 'S'1, R'1, 0.2', 'S'2, R'1, 1.1', 'S'1, R'2, −0.3', and 'S'2, R'2, 0.4'.

The learning section 22 generates a conversion rule xa3 and a conversion rule ya3 under the restriction of making the conversion rules of the common variable the same, such that the total sum of similarity 1 and similarity 2 of the collation pattern and the converted data is maximized.

The conversion rule and the converted data illustrated in FIG. 15 represent an example satisfying the maximum value of the similarity and restriction. Specifically, the similarity 1 between each amount of the converted data X3 and each amount of the collation pattern XA1 is, the inner product '(1×0.2)+(3×1.1)+(0×−0.3)+(2×0.4)=4.3'. The similarity 2 between each amount of the converted data Y3 and each amount of the collation pattern YA1 is, the inner product '(1×−0.4)+(2×0.2)+(3×0.3)+(0×0.1)=0.9'.

Therefore, 'similarity 1 (4.3)+similarity 2 (0.9)=5.2' is the maximum value of 'similarity 1+similarity 2', and the conversion rule xa3 at this time is 'S1→S'2, S2→S'1, R1→R'1, R2→R'2', and the conversion rule ya3 is 'S1→S"2, S2→S"1, C1→C'1, C2→C'2'. That is, 'S1→S'2, S2→S'1' of the conversion rule xa3 and 'S1→S"2, S2→S"1' of the conversion rule ya3 indicate the same conversion contents.

Subsequently, the learning section 22 subtracts the converted data before the update from the converted data after the update to calculate the variation of the converted data. Specifically, the learning section 22 calculates a variation '0, 0, 0, 0' between each amount '1, 3, 0, 2' of the converted data X3 and each amount '1, 3, 0, 2' of the converted data X1, and a variation '0, 0, 0, 0' between each amount '1, 2, 3, 0' of the converted data Y2 and each amount '1, 2, 3, 0' of the converted data Y1.

Thereafter, the learning section 22 calculates the inner product of the error obtained by error back propagation, and the variation of the amount of the converted data. Specifically, the learning section 22 calculates '0.0' as the inner product of error '−1.0, 0.1, 0.7, −0.5, −0.3, −0.6, 1.0, −0.2' and variation '0, 0, 0, 0, 0, 0, 0, 0'. The learning section 22 sets the calculated '0.0' to the change of 'S'2, R'1' of the updated collation pattern XA.

Update: Part 3

Figure 16A:
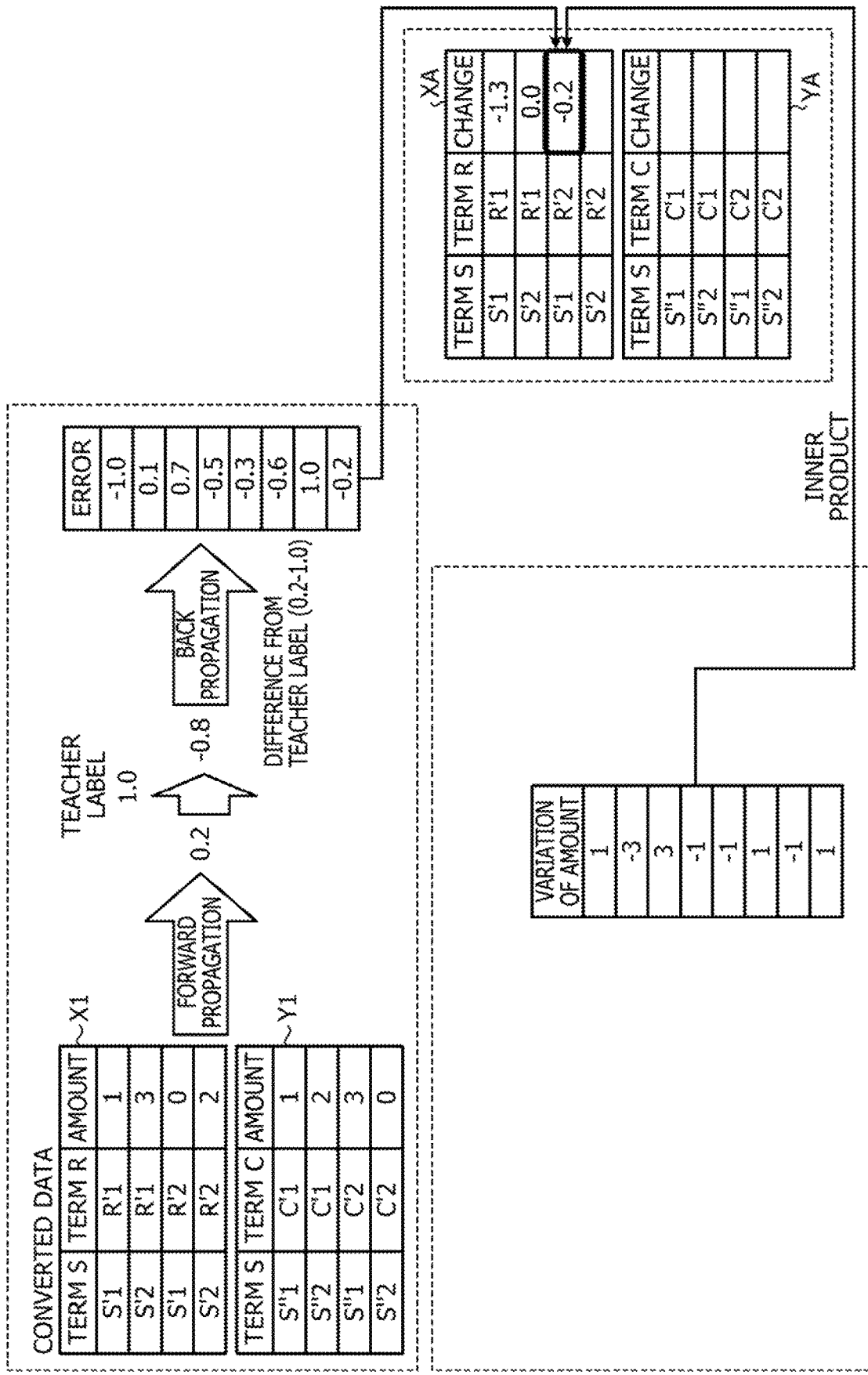
FIGS. 16A and 16B illustrate a diagram for explaining a variation calculation (part 3) of an amount of converted data.
Figure 16B:
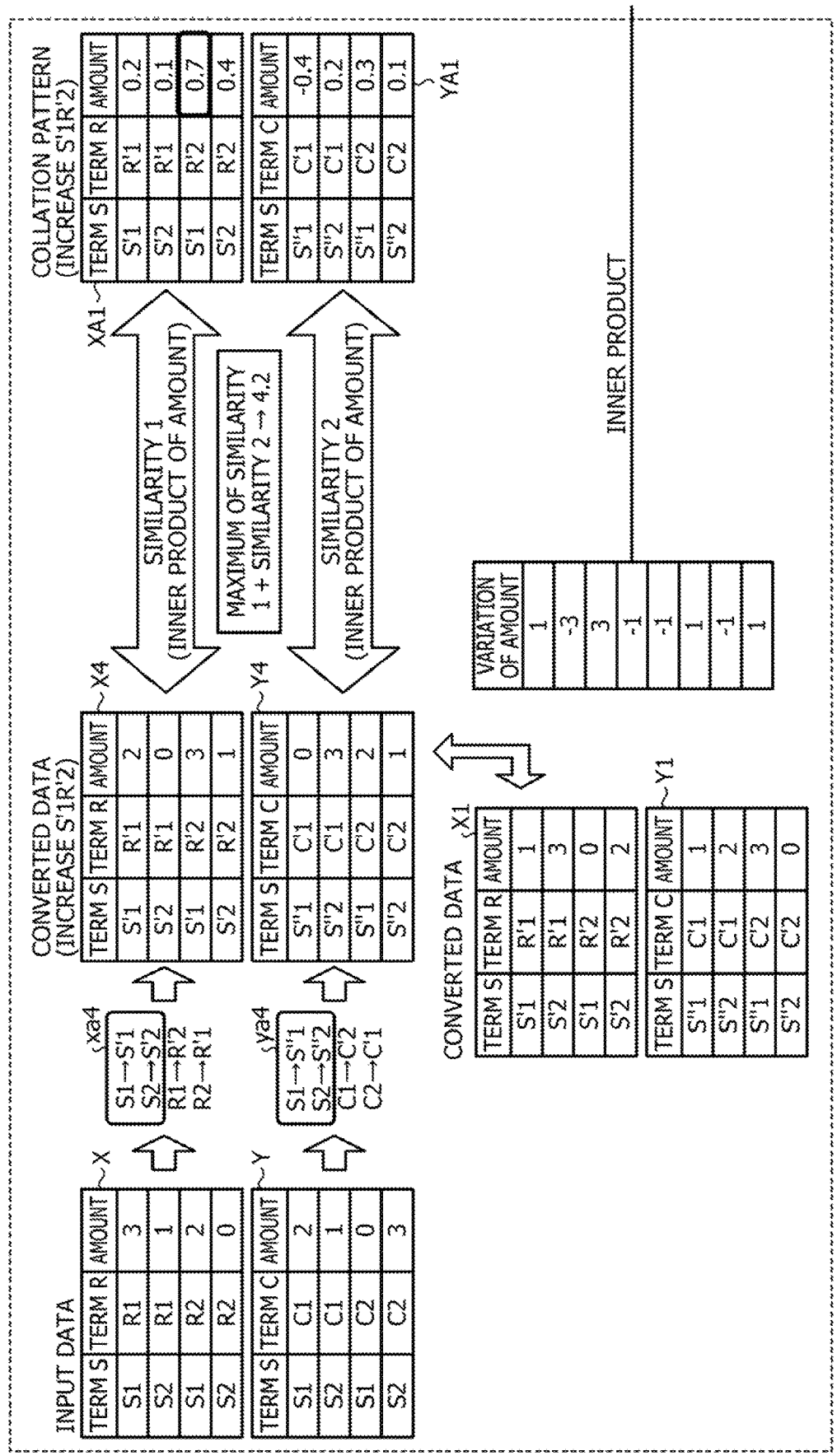

Subsequently, the update of the next amount of the collation pattern will be described. FIG. 16 (i.e., FIGS. 16A and 16B) is a diagram for explaining a variation calculation (part 3) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S'1R'2) out of all amounts of the collation pattern and increases it by 1. Specifically, the learning section 22 increases only the amount of 'S'1, R'2, −0.3' by 1 in the collation pattern XA1 illustrated in FIG. 13 to generate 'S'1, R'1, 0.2', 'S'2, R'1, 0.1', 'S'1, R'2, 0.7', and 'S'2, R'2, 0.4'.

The learning section 22 generates a conversion rule xa4 and a conversion rule ya4 under the restriction of making the conversion rules of the common variable the same, such that the total sum of similarity 1 and similarity 2 of the collation pattern and the converted data is maximized.

The conversion rule and the converted data illustrated in FIG. 16 represent an example satisfying the maximum value and restriction. Specifically, the similarity 1 between each amount of the converted data X4 and each amount of the collation pattern XA1 is, the inner product '(2×0.2)+(0× 0.1)+(3×0.7)+(1×0.4)=2.9'. The similarity 2 between each amount of the converted data Y4 and each amount of the collation pattern YA1 is, the inner product '(0×−0.4)+(3× 0.2)+(2×0.3)+(1×0.1)=1.3'.

Therefore, 'similarity 1 (2.9)+similarity 2 (1.3)=4.2' is the maximum value of 'similarity 1+similarity 2', and the conversion rule xa4 at this time is 'S1→S'1, S2→S'2, R1→R'2, R2→R'1', and the conversion rule ya4 is 'S1→S"1, S2→S"2, C1→C'2, C2→C'1'. That is, 'S1→S'1, S2→S'2' of the conversion rule xa4 and 'S1→S"1, S2→S"2' of the conversion rule ya4 indicate the same conversion contents.

Subsequently, the learning section 22 subtracts the converted data before the update from the converted data after the update to calculate the variation of the converted data. Specifically, the learning section 22 calculates a variation '1, −3, 3, 1' between each amount '2, 0, 3, 1' of the converted data X4 and each amount '1, 3, 0, 2' of the converted data X1, and a variation '−1, 1, −1, 1' between each amount '0, 3, 2, 1' of the converted data Y4 and each amount '1, 2, 3, 0' of the converted data Y1.

Thereafter, the learning section 22 calculates the inner product of the error obtained by error back propagation, and the variation of the amount of the converted data. Specifically, the learning section 22 calculates '−0.2' as the inner product of error '−1.0, 0.1, 0.7, −0.5, −0.3, −0.6, 1.0, −0.2' and variation '1, −3, 3, −1, −1, 1, −1, 1'. The learning section 22 sets the calculated '−0.2' to the change of 'S'1, R'2' of the updated collation pattern XA.

Update: Part 4

Figure 17A:
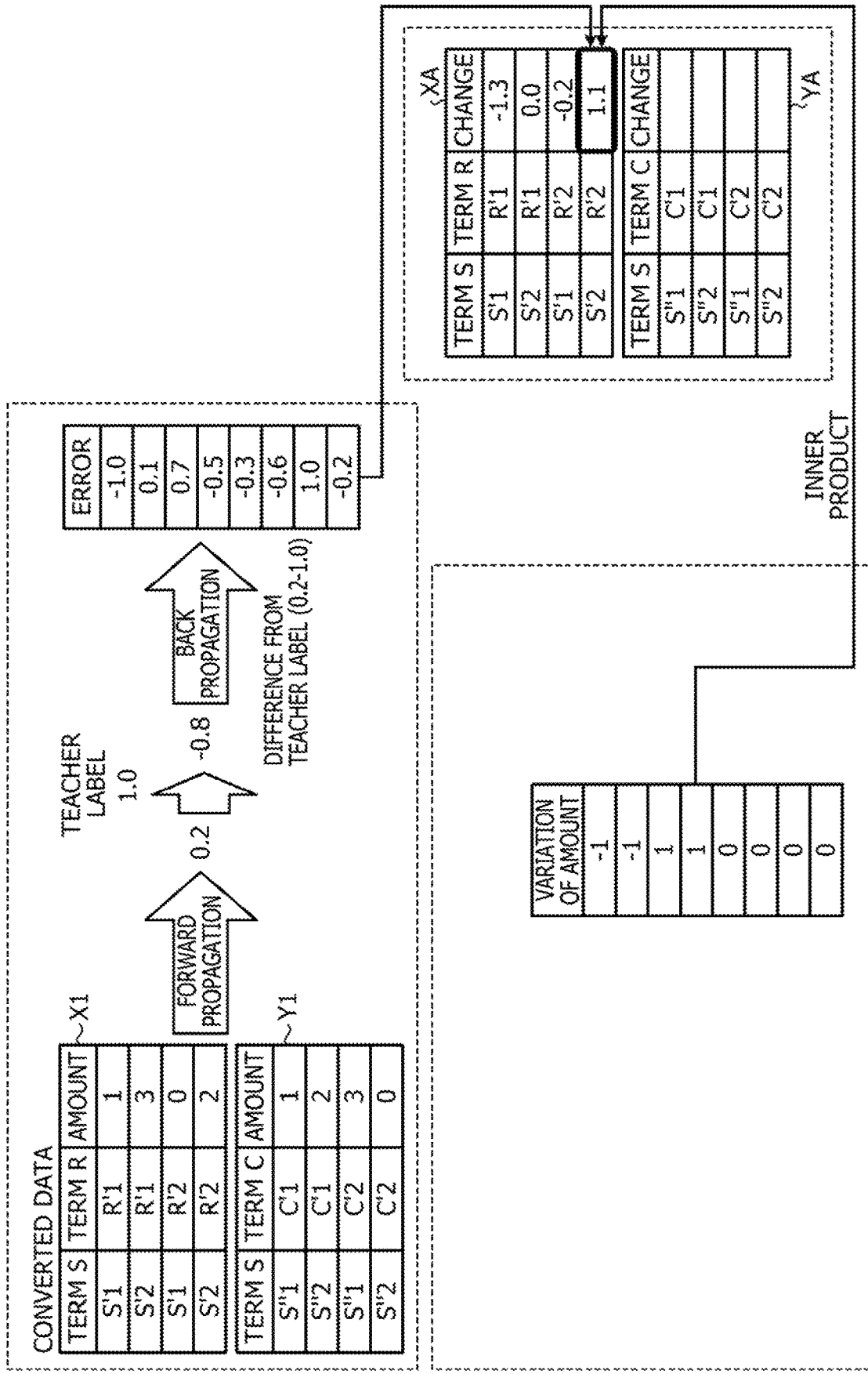
FIGS. 17A and 17B illustrate a diagram for explaining a variation calculation (part 4) of an amount of converted data.
Figure 17B:
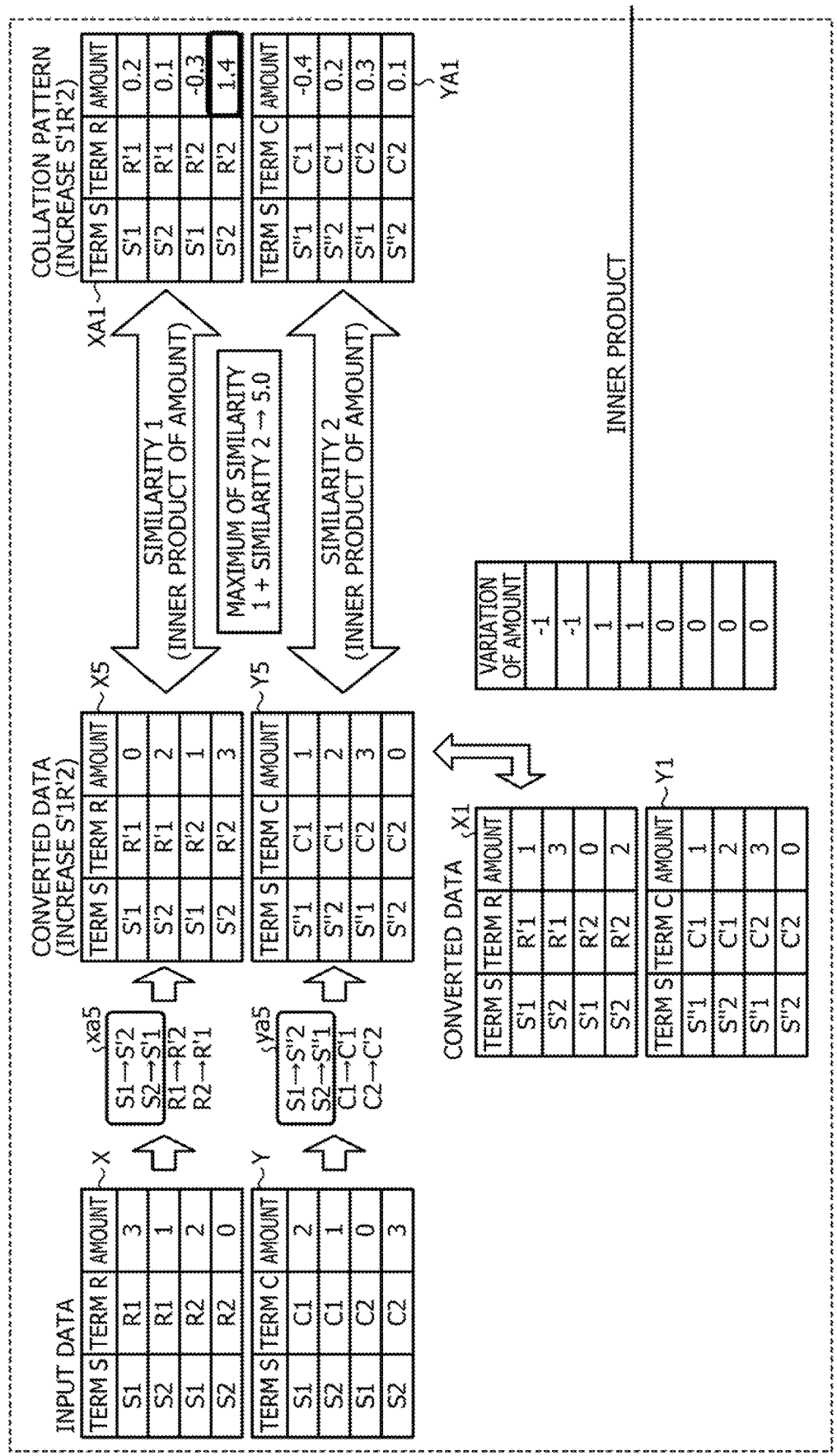

Subsequently, the update of the next amount of the collation pattern will be described. FIG. 17 (i.e., FIGS. 17A and 17B) is a diagram for explaining a variation calculation (part 4) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S'2R'2) out of all amounts of the collation pattern and increases it by 1. Specifically, the learning section 22 increases only the amount of 'S'2, R'2, 0.4' by 1 in the collation pattern XA1 illustrated in FIG. 13 to generate 'S'1, R'1, 0.2', 'S'2, R'1, 0.1', 'S'1, R'2, −0.3', and 'S'2, R'2, 1.4'.

The learning section 22 generates a conversion rule xa5 and a conversion rule ya5 under the restriction of making the conversion rules of the common variable the same, such that the total sum of similarity 1 and similarity 2 of the collation pattern and the converted data is maximized.

The conversion rule and the converted data illustrated in FIG. 17 represent an example satisfying the maximum value and restriction. Specifically, the similarity 1 between each amount of converted data X5 and each amount of a collation pattern XA1 is, the inner product '(0×0.2)+(2×0.1)+(1×− 0.3)+(3×1.4)=4.1'. The similarity 2 between each amount of the converted data Y5 and each amount of the collation pattern YA1 is, the inner product '(1×−0.4)+(2×0.2)+(3× 0.3)+(0×0.1)=0.9'.

Therefore, 'similarity 1 (4.1)+similarity 2 (0.9)=5.0' is the maximum value of 'similarity 1+similarity 2', and the conversion rule xa5 at this time is 'S1→S'2, S2→S'1, R1→R'2, R2→R'1', and the conversion rule ya5 is 'S1→S"2, S2→S"1, C1→C'1, C2→C'2'. That is, 'S1→S'2, S2→S'1' of the conversion rule xa5 and 'S1→S"2, S2→S"1' of the conversion rule ya5 indicate the same conversion contents.

Subsequently, the learning section 22 subtracts the converted data before the update from the converted data after the update to calculate the variation of the converted data. Specifically, the learning section 22 calculates a variation '−1, −1, 1, 1' between each amount '0, 1, 1, 3' of the converted data X5 and each amount '1, 3, 0, 2' of the converted data X1, and a variation '0, 0, 0, 0' between each amount '1, 2, 3, 0' of the converted data Y5 and each amount '1, 2, 3, 0' of the converted data Y1.

Thereafter, the learning section 22 calculates the inner product of the error obtained by error back propagation, and the variation of the amount of the converted data. Specifically, the learning section 22 calculates '1.1' as the inner product of error '−1.0, 0.1, 0.7, −0.5, −0.3, −0.6, 1.0, −0.2' and variation '−1, −1, 1, 1, 0, 0, 0, 0'. The learning section 22 sets the calculated '1.1' to the change of 'S'2, R'2' of the updated collation pattern XA.

Update: Part 5

Figure 18A:
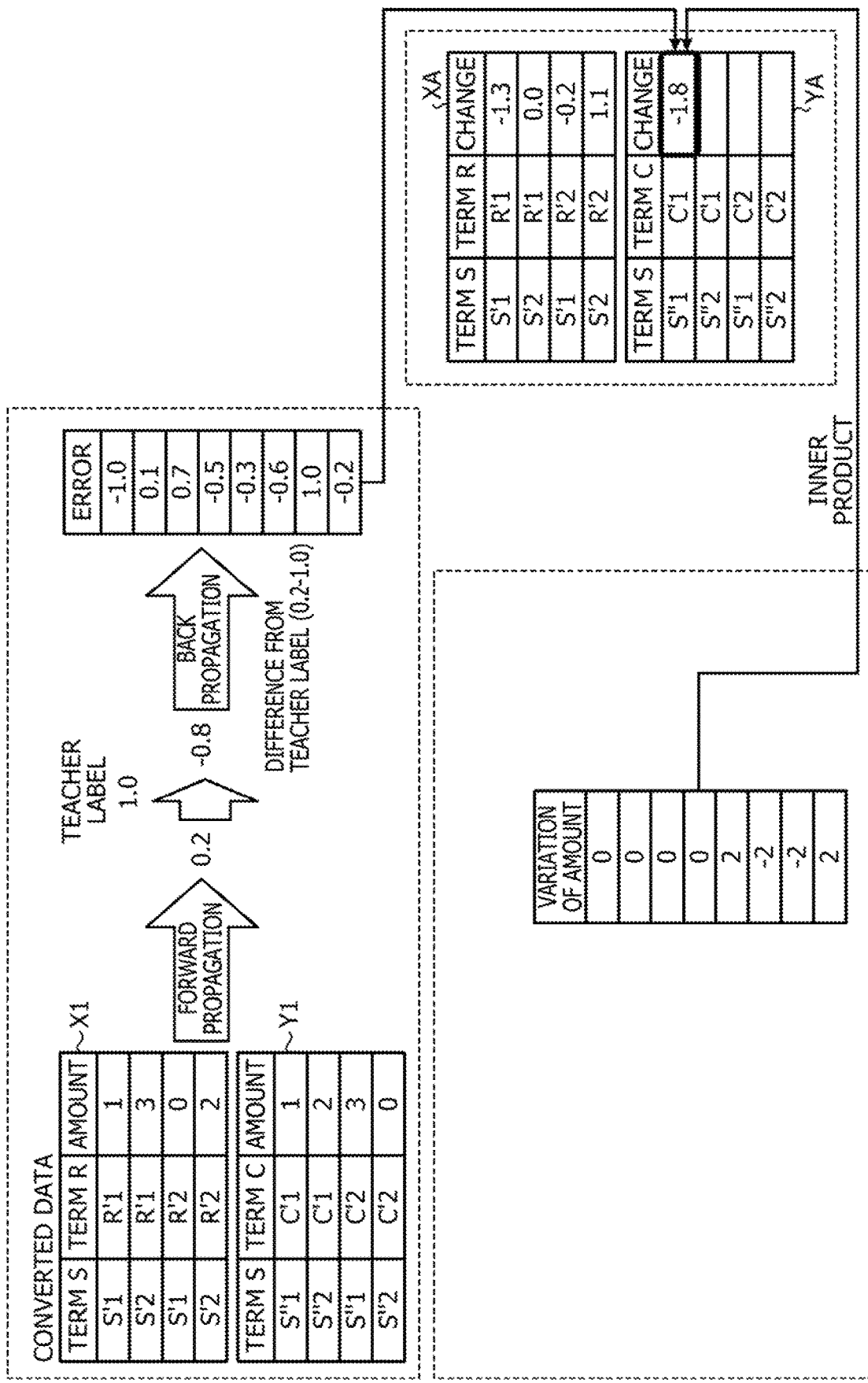
FIGS. 18A and 18B illustrate a diagram for explaining a variation calculation (part 5) of an amount of converted data.
Figure 18B:
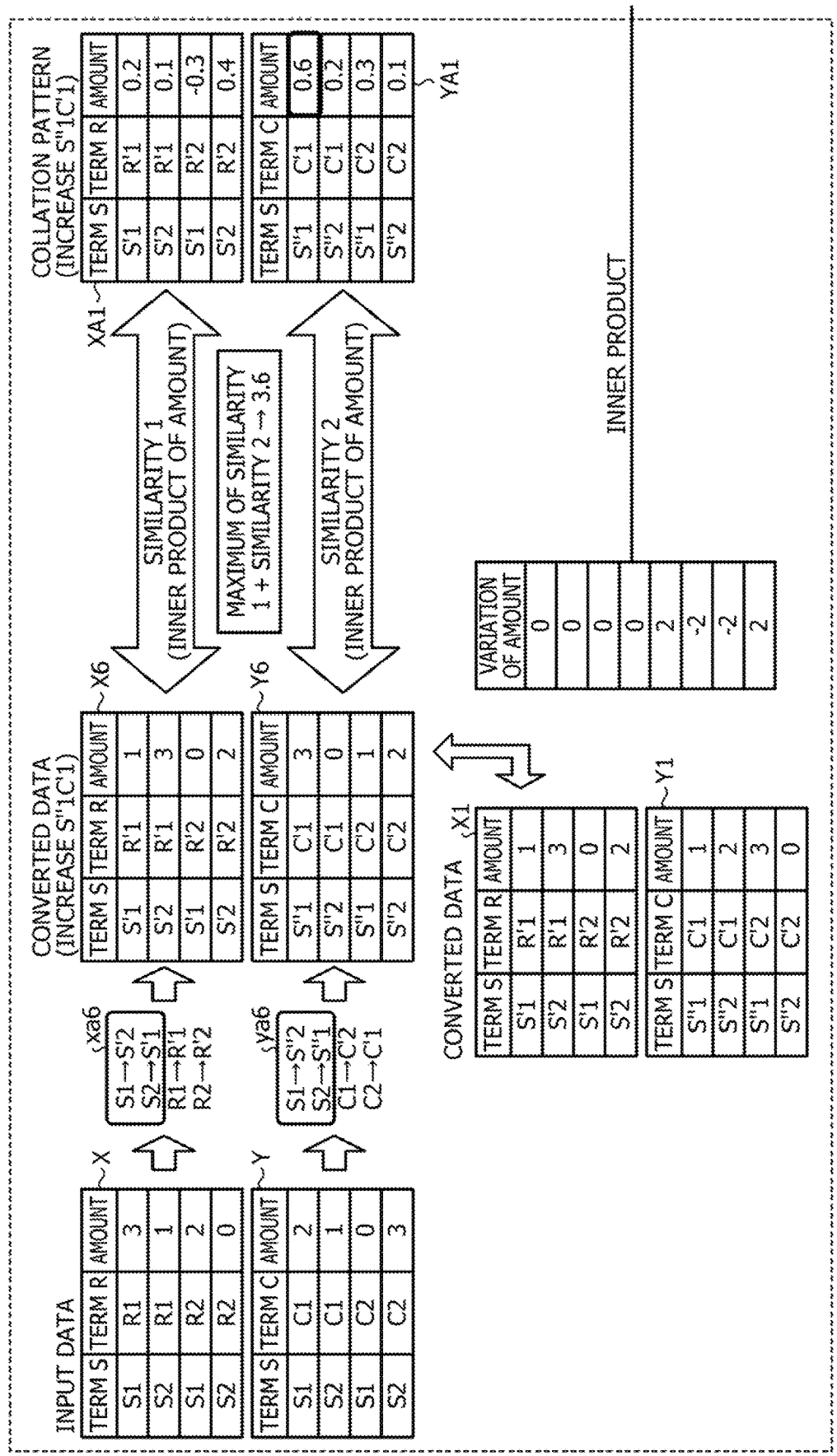

Subsequently, the update of the next amount of the collation pattern will be described. FIG. 18 (i.e., FIGS. 18A and 18B) is a diagram for explaining a variation calculation (part 5) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S"1C'1) out of all amounts of the collation pattern and increases it by 1. Specifically, the learning section 22 increases only the amount of 'S"1, C'1, −0.4' by 1 out of the collation pattern YA1 illustrated in FIG. 13 to generate 'S"1, C'1, 0.6', 'S"2, C'1, 0.2', 'S"1, C'2, 0.3', and 'S"2, C'2, 0.1'.

The learning section 22 generates a conversion rule xa6 and a conversion rule ya6 under the restriction of making the conversion rules of the common variable the same, such that the total sum of similarity 1 and similarity 2 of the collation pattern and the converted data is maximized.

The conversion rule and the converted data illustrated in FIG. 18 represent an example satisfying the maximum value and restriction. Specifically, the sum of similarity 1 between each amount of converted data X6 and each amount of collation pattern XA1, and similarity 2 between each amount of converted data Y6 and each amount of collation pattern YA1 becomes '3.6'. The conversion rule xa6 at this time is 'S1→S'2, S2→S'1, R1→R'1, R2→R'2', and the conversion rule ya6 is 'S1→S"2, S2→S"1, C1→C'2, C2→C'1'. That is, 'S1→S'2, S2→S'1' of the conversion rule xa6 and 'S1→S"2, S2→S"1' of the conversion rule ya6 indicate the same conversion contents.

Subsequently, the learning section 22 calculates a variation '0, 0, 0, 0' between each amount '1, 3, 0, 2' of the converted data X6 and each amount '1, 3, 0, 2' of the converted data X1, and a variation '2, −2, −2, 2' between each amount '3, 0, 1, 2' of the converted data Y6 and each amount '1, 2, 3, 0' of the converted data Y1. Thereafter, the learning section 22 calculates '−1.8' as the inner product of the error '−1.0, 0.1, 0.7, −0.5, −0.3, −0.6, 1.0, −0.2' obtained by error back propagation and the variation '0, 0, 0, 0, 2, −2, −2, 2'. The learning section 22 sets the calculated '−1.8' to the change of 'S"1, C'1' of the updated collation pattern YA.

Update: Part 6

Figure 19B:
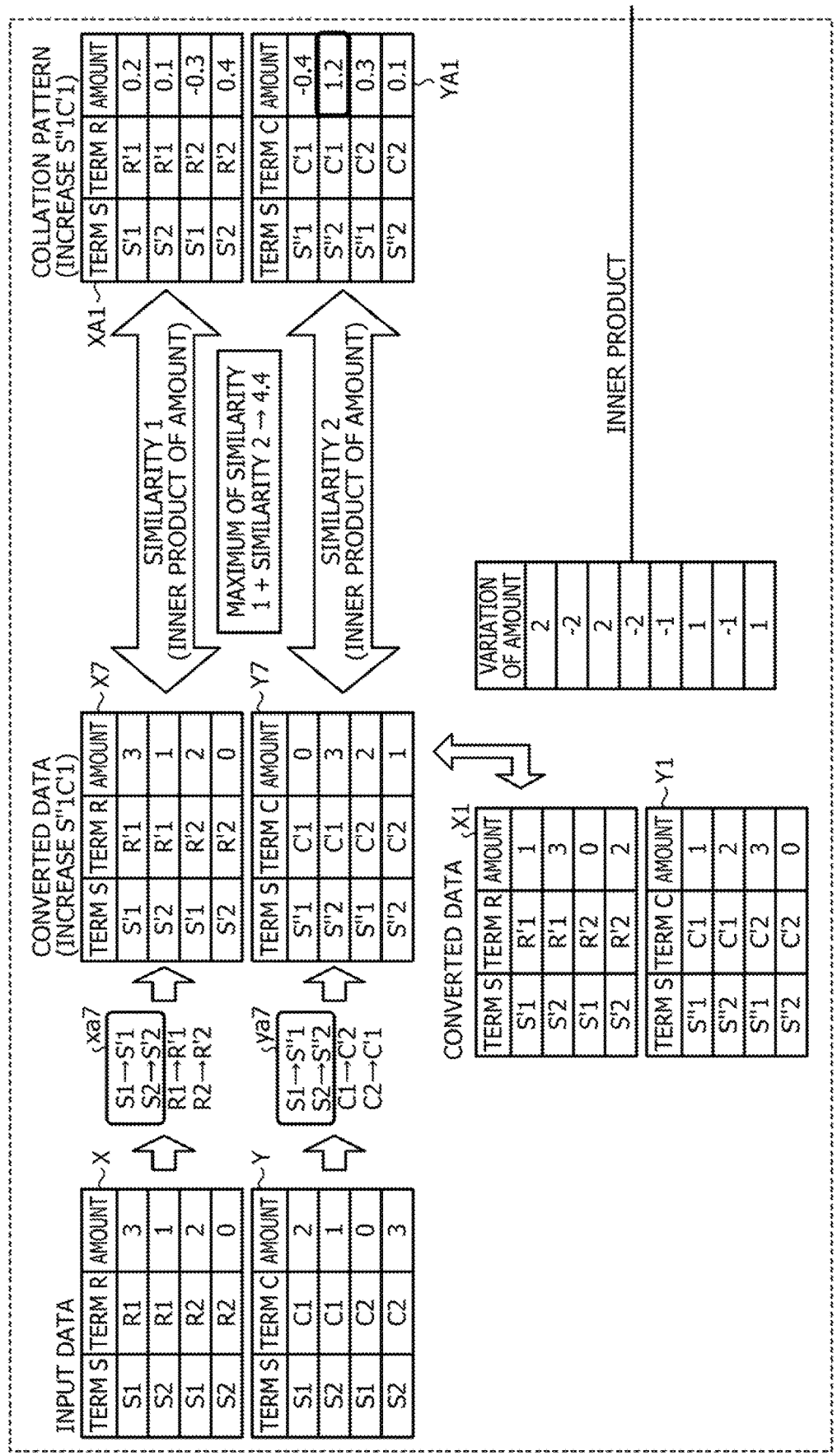

Subsequently, the update of the next amount of the collation pattern will be described. FIG. 19 (i.e., FIGS. 19A and 19B) is a diagram for describing a variation calculation (part 6) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S"2C'1) out of all amounts of the collation pattern and increases it by 1. Specifically, the learning section 22 increases only the amount of 'S"2, C'1, 0.2' by 1 out of the collation pattern YA1 illustrated in FIG. 13 to generate 'S"1, C'1, −0.4', 'S"2, C'1, 1.2', 'S"1, C'2, 0.3', and 'S"2, C'2, 0.1'.

The learning section 22 generates a conversion rule xa7 and a conversion rule ya7 under the restriction of making the conversion rules of the common variable the same, such that the total sum of similarity 1 and similarity 2 of the collation pattern and the converted data is maximized.

The conversion rule and the converted data illustrated in FIG. 19 represent an example satisfying the maximum value and restriction. Specifically, the sum of similarity 1 between each amount of converted data X7 and each amount of collation pattern XA1, and similarity 2 between each amount of converted data Y7 and each amount of collation pattern YA1 becomes '4.4'. The conversion rule xa7 at this time is 'S1→S'1, S2→S'2, R1→R'1, R2→R'2', and the conversion rule ya7 is 'S1→S"1, S2→S"2, C1→C'2, C2→C'1'. That is, 'S1→S'1, S2→S'2' of the conversion rule xa7 and 'S1→S"1, S2→S"2' of the conversion rule ya7 indicate the same conversion contents.

Subsequently, the learning section 22 calculates a variation '2, −2, 2, −2' between each amount '3, 1, 2, 0' of the converted data X7 and each amount '1, 3, 0, 2' of the converted data X1, and a variation '−1, 1, −1, 1' between each amount '0, 3, 2, 1' of the converted data Y7 and each amount '1, 2, 3, 0' of the converted data Y1. Thereafter, the learning section 22 calculates '−1.3' as the inner product of the error '−1.0, 0.1, 0.7, −0.5, −0.3, −0.6, 1.0, −0.2' obtained by error back propagation and the variation '2, −2, 2, −2, −1, 1, −1, 1'. The learning section 22 sets the calculated '−1.3' to the change of 'S"2, C'1' of the updated collation pattern YA.

Update: Part 7

Figure 20A:
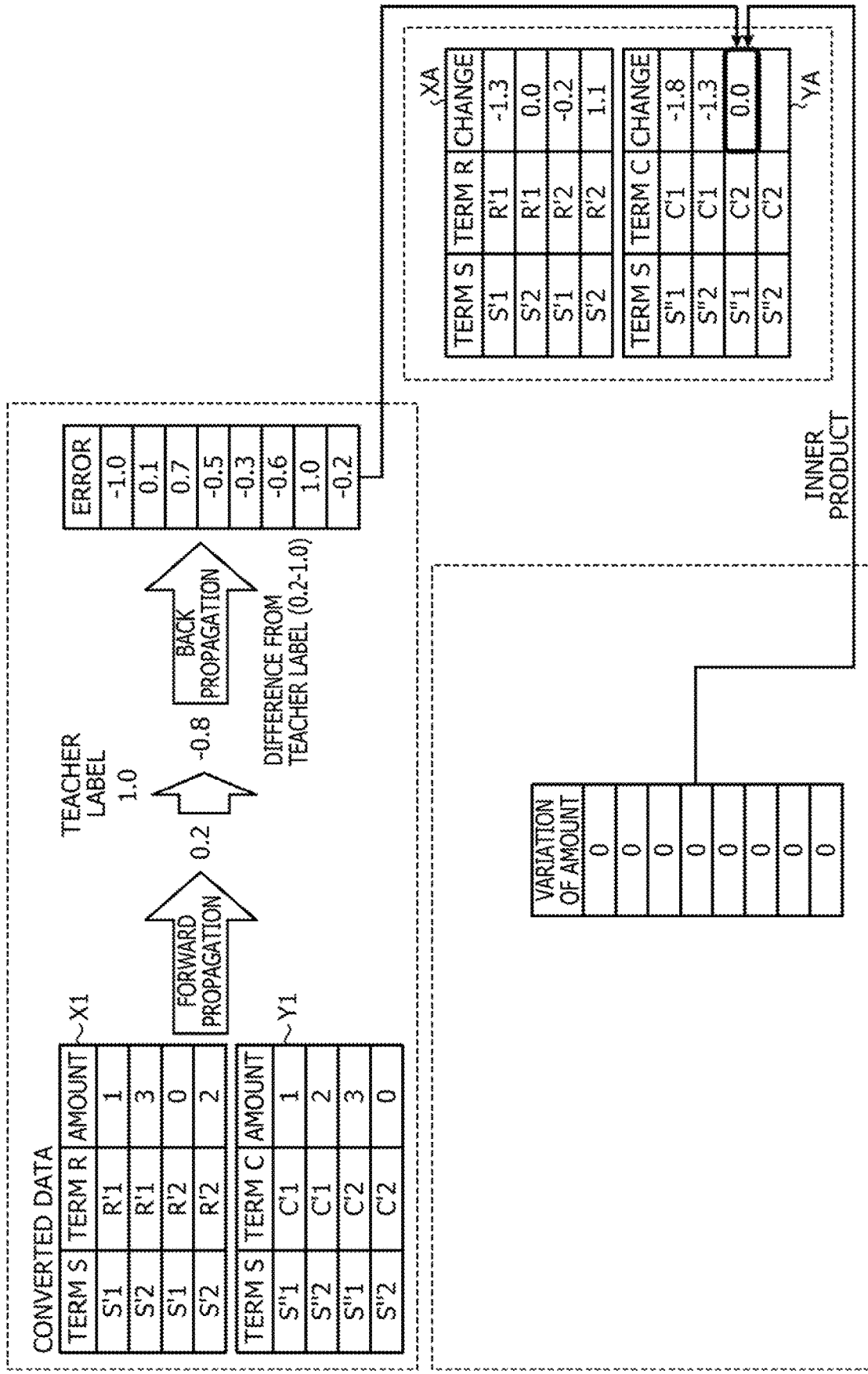
FIGS. 20A and 20B illustrate a diagram for explaining a variation calculation (part 7) of an amount of converted data.
Figure 20B:
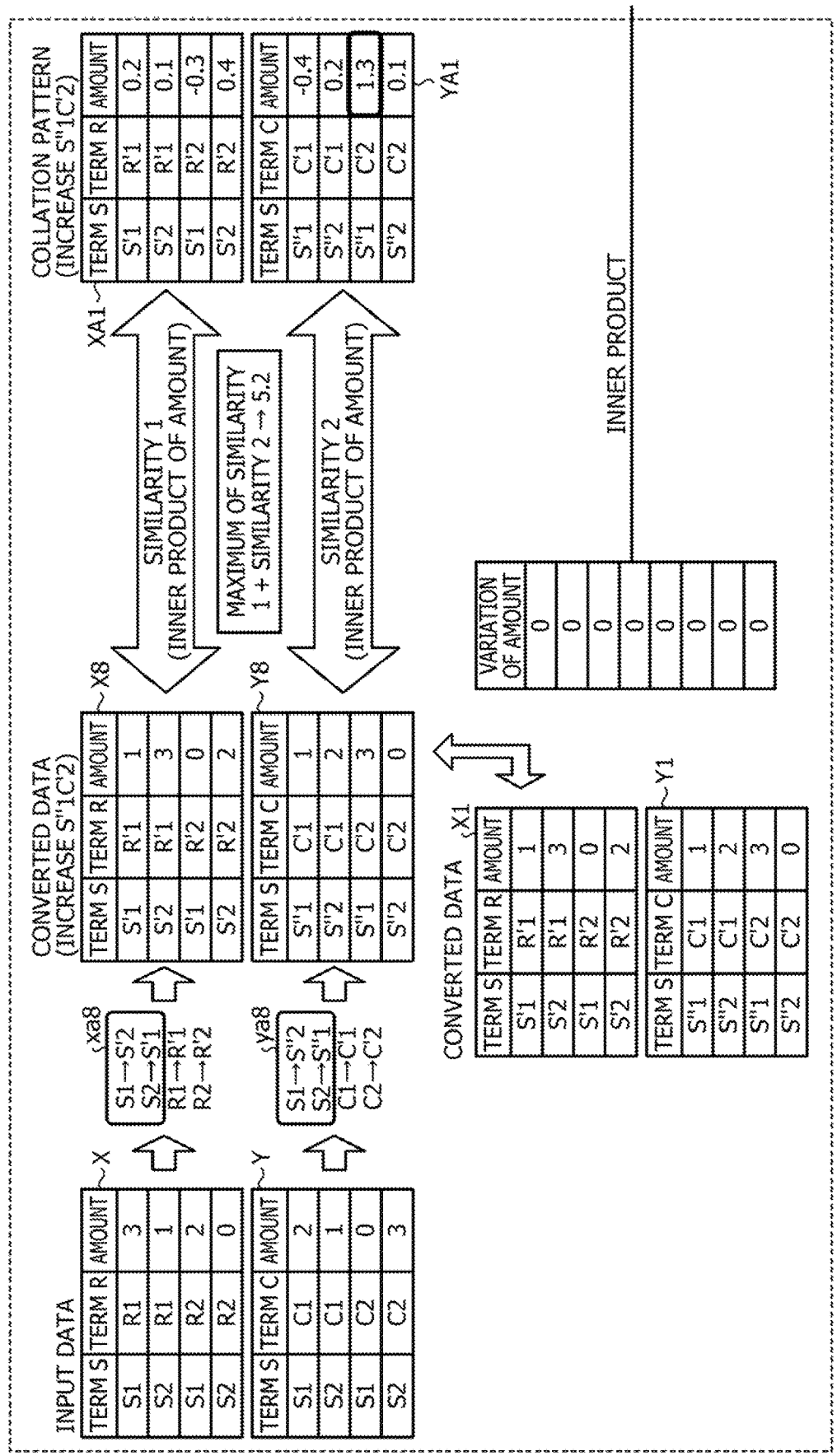

Subsequently, the update of the next amount of the collation pattern will be described. FIG. 20 (i.e., FIGS. 20A and 20B) is a diagram for explaining a variation calculation (part 7) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S"1, C'2) out of all amounts of the collation pattern and increases it by 1. Specifically, the learning section 22 increases only the amount of 'S"1, C'2, 0.3' by 1 out of the collation pattern YA1 illustrated in FIG. 13 to generate 'S"1, C'1, −0.4', 'S"2, C'1, 0.2', 'S"1, C'2, 1.3', and 'S"2, C'2, 0.1'.

The learning section 22 generates a conversion rule xa8 and a conversion rule ya8 under the restriction of making the conversion rules of the common variable the same, such that the total sum of similarity 1 and similarity 2 of the collation pattern and the converted data is maximized.

The conversion rule and the converted data illustrated in FIG. 20 represent an example satisfying the maximum value and restriction. Specifically, the sum of similarity 1 between each amount of converted data X8 and each amount of collation pattern XA1, and similarity 2 between each amount of converted data Y8 and each amount of collation pattern YA1 becomes '5.2'. The conversion rule xa8 at this time is 'S1→S'2, S2→S'1, R1→R'1, R2→R'2', and the conversion rule ya8 is 'S1→S"2, S2→S"1, C1→C'1, C2→C'2'. That is, 'S1→S'2, S2→S'1' of the conversion rule xa8 and 'S1→S"2, S2→S"1' of the conversion rule ya8 indicate the same conversion contents.

Subsequently, the learning section 22 calculates a variation '0, 0, 0, 0' between each amount '1, 3, 0, 2' of the converted data X8 and each amount '1, 3, 0, 2' of the converted data X1, and a variation '0, 0, 0, 0' between each amount '1, 2, 3, 0' of the converted data Y8 and each amount '1, 2, 3, 0' of the converted data Y1. Thereafter, the learning section 22 calculates '0.0' as the inner product of the error '−1.0, 0.1, 0.7, −0.5, −0.3, −0.6, 1.0, −0.2' obtained by error back propagation and the variation '0, 0, 0, 0, 0, 0, 0, 0'. The learning section 22 sets the calculated '0.0' to the change of 'S"1, C'2' of the updated collation pattern YA.

Update: Part 8

Figure 21A:
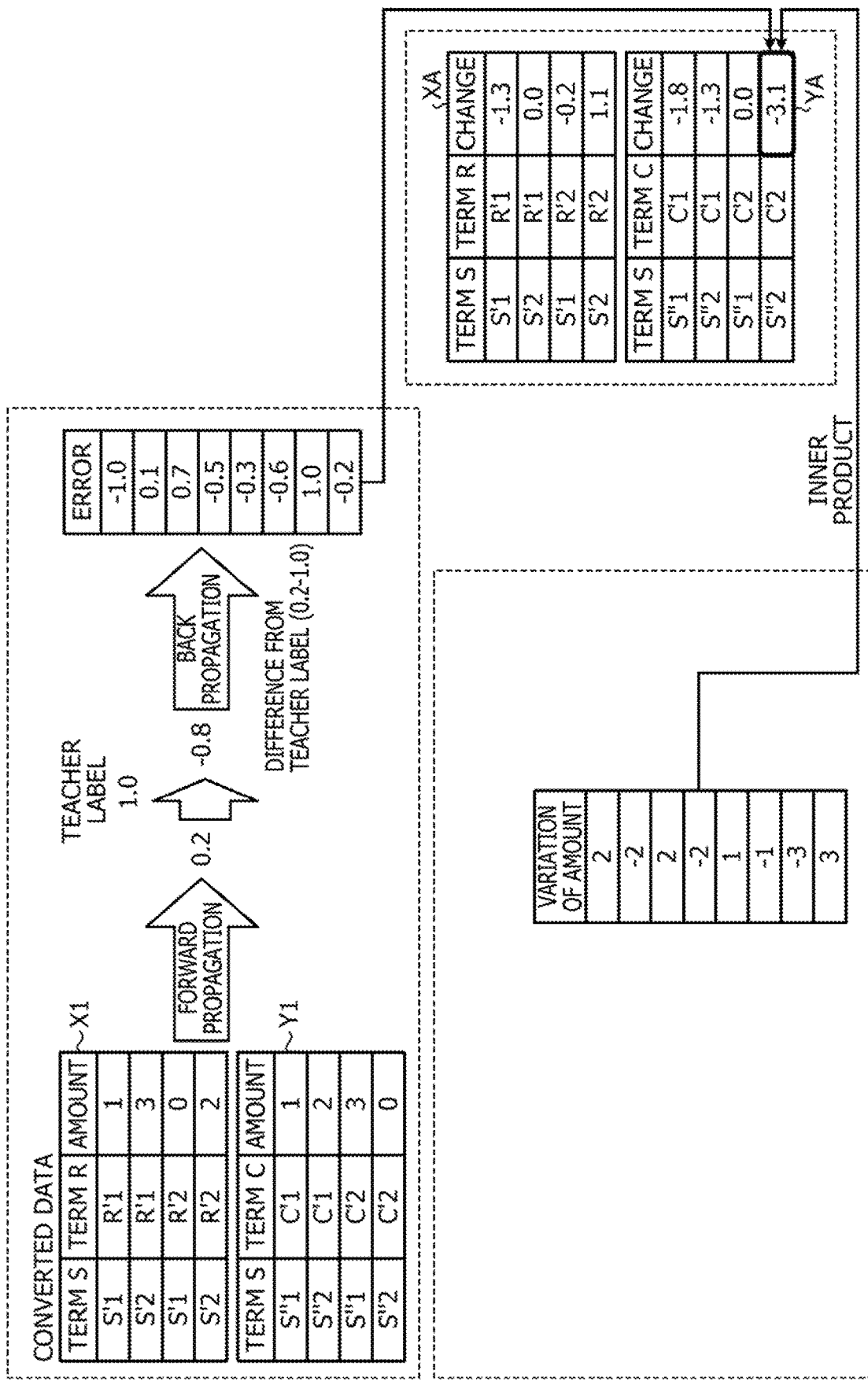
FIGS. 21A and 21B illustrate a diagram for explaining a variation calculation (part 8) of an amount of converted data.
Figure 21B:
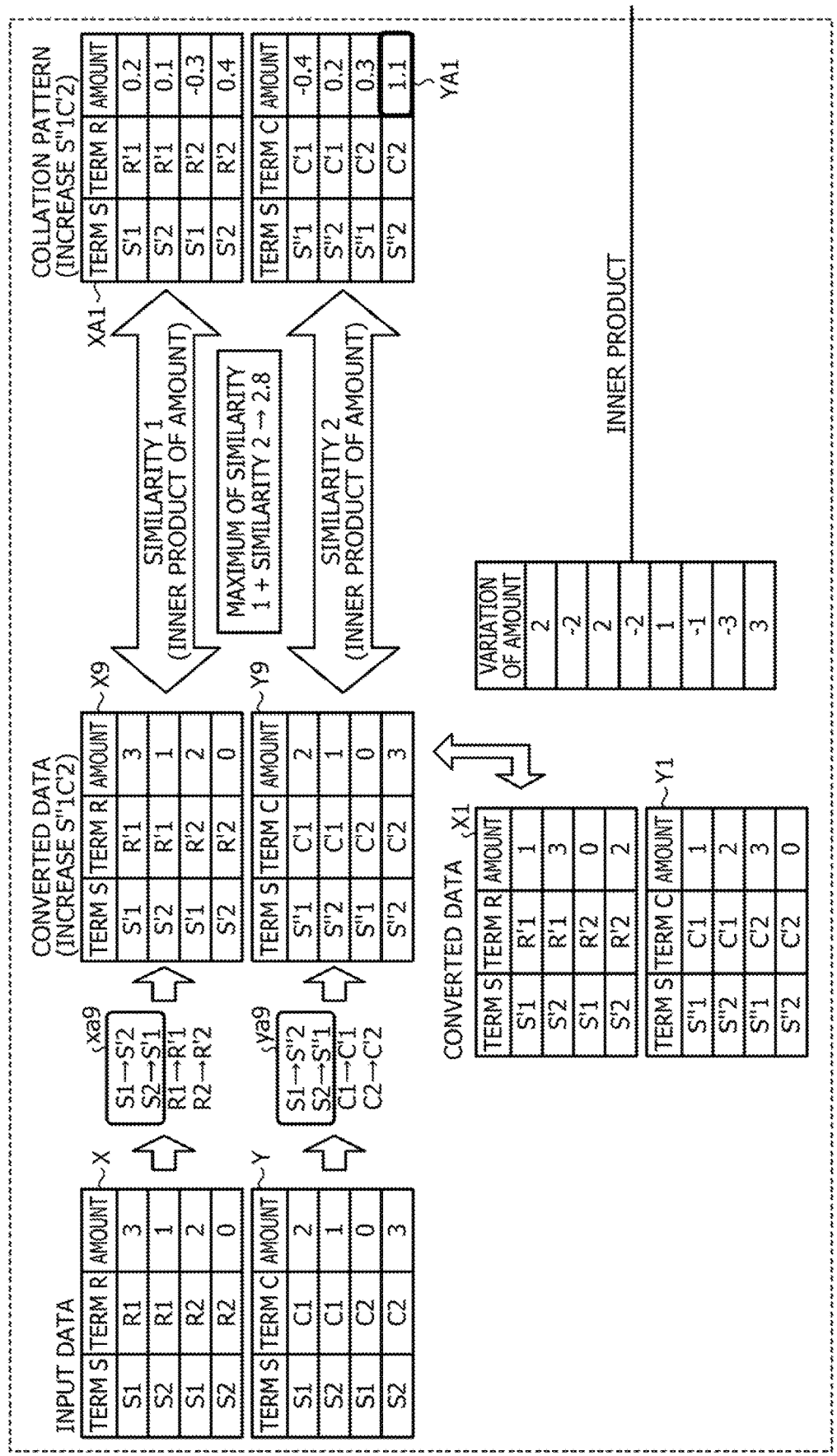

Subsequently, the update of the next amount of the collation pattern will be described. FIG. 21 (i.e., FIGS. 21A and 21B) is a diagram for explaining a variation calculation (part 8) of an amount of converted data. The processing described here is also executed by inputting the converted data X1 and the converted data Y1 generated in FIG. 13 and by using an error obtained by error back propagation.

First, the learning section 22 selects one unselected amount (in this case, the amount of S"2, C'2) out of all amounts of the collation pattern and increases it by 1. Specifically, the learning section 22 increases only the amount of 'S"2, C'2, 0.1' by 1 out of the collation pattern YA1 illustrated in FIG. 13 to generate 'S"1, C'1, −0.4', 'S"2, C'1, 0.2', 'S"1, C'2, 0.3', and 'S"2, C'2, 1.1'.

The learning section 22 generates a conversion rule xa9 and a conversion rule ya9 under the restriction of making the conversion rules of the common variable the same, such that the total sum of similarity 1 and similarity 2 of the collation pattern and the converted data is maximized.

The conversion rule and the converted data illustrated in FIG. 21 represent an example satisfying the maximum value and restriction. Specifically, the sum of similarity 1 between each amount of converted data X9 and each amount of collation pattern XA1, and similarity 2 between each amount of converted data Y9 and each amount of collation pattern YA1 becomes '2.8'. The conversion rule xa9 at this time is 'S1→S'2, S2→S'1, R1→R'1, R2→R'2', and the conversion rule ya9 is 'S1→S"2, S2→S"1, C1→C'1, C2→C'2'. That is, 'S1→S'2, S2→S'1' of the conversion rule xa9 and 'S1S"2, S2-S"1' of the conversion rule ya9 indicate the same conversion contents.

Subsequently, the learning section 22 calculates a variation '2, −2, 2, −2' between each amount '3, 1, 2, 0' of the converted data X9 and each amount '1, 3, 0, 2' of the converted data X1, and a variation '1, −1, −3, 3' between each amount '2, 1, 0, 3' of the converted data Y9 and each amount '1, 2, 3, 0' of the converted data Y1. Thereafter, the learning section 22 calculates '−3.1' as the inner product of the error '−1.0, 0.1, 0.7, −0.5, −0.3, −0.6, 1.0, −0.2' obtained by error back propagation and the variation '2, −2, 2, −2, 1, −1, −3, 3'. The learning section 22 sets the calculated '−3.1' to the variation of 'S"2, C'2' of the updated collation pattern YA.

Collation Pattern Update and Parameter Update

Since change calculation when minute conversion is applied is executed for each amount of input data as in the above-described FIGS. 13 to 21, finally, S109 in FIG. 10 to be executed thereafter will be explained in detail. FIGS. 22A and 22B are diagrams for explaining an update of a parameter and an update of a collation pattern.

As illustrated in FIG. 22A, the learning section 22 subtracts a value, obtained by multiplying a multiplication value of a difference from the teacher label obtained by error back propagation and the amount of each converted data by a (for example, 1.0) which is a step size, from an initial value of the parameter to update the parameter. Specifically, the learning section 22 calculates '2.0, 2.3, −0.9, 2.2, 1.2, 2.4, 1.1, 0.2' by subtracting '1×−0.8, 3×−0.8, 0×−0.8, 2×−0.8, 1×−0.8, 2×−0.8, 3×−0.8, 0×−0.8' from each of the initial values '1.2, −0.1, −0.9, 0.6, 0.4, 0.8, −1.3, 0.2' of the parameters 'w1, w2, w3, w4, w5, w6, w7, w8'.

As illustrated in FIG. 22B, the learning section 22 subtracts the multiplication value of change amount calculated up to FIG. 21 and the step size a (for example, 1.0), from each collation pattern to update each collation pattern.

Specifically, the learning section 22 calculates 'S'1, R'1, 1.5', 'S'2, R'1, 0.1', 'S'1, R'2, −0.1', and 'S'2, R'2, −0.7' of an updated collation pattern XA1' by subtracting 'S'1, R'1, −1.3', 'S'2, R'1, 0.0', 'S'1, R'2, −0.2', and 'S'2, R'2, 1.1' of the calculated change XA, from 'S'1, R'1, 0.2', 'S'2, R'1, 0.1', 'S'1, R'2, −0.3', and 'S'2, R'2, 0.4' of the collation pattern XA1.

Similarly, the learning section 22 calculates 'S"1, C'1, 1.4', 'S"2, C'1, 1.5', 'S"1, C'2, 0.3', and 'S"2, C'2, 3.2' of the updated collation pattern YA1' by subtracting 'S"1, C'1, −1.8', 'S"2, C'1, −1.3', 'S"1, C'2, 0.0', and 'S"2, C'2, −3.1' of the calculated change YA from 'S"1, C'1, −0.4', 'S"2, C'1, 0.2', 'S"1, C'2, 0.3', and 'S"2, C'2, 0.1' of the collation pattern YA1.

The learning section 22 updates the parameter and the collation pattern by executing the above-described processing. Similar processing is executed for the next learning data (input data) with the updated parameter and the collation pattern as initial values.

Effect

As described above, the monitoring server 10 may make the correspondence relationships coincide with each other between the input data, in the converted data after conversion of the common variable commonly included in a plurality of pieces of relationship data. Thus, since the conversion rules are unified and the discrepancy of recognition of the variable values is suppressed, overlearning may be suppressed. As a result, the monitoring server 10 may execute appropriate learning and may realize highly accurate prediction.

Example 2

When a plurality of pieces of relationship data are input as input data, each relationship data is not necessarily equally important. For example, in detection of an internal fraud, the command history may be more important than the communication log. It is difficult to specify which relationship data is how important before learning.

On the other hand, the neural network has an effect of learning the importance of input data to itself, so it may be considered that the importance may be taken into account by this effect. However, because of the mechanism that converts such that the similarity between each relationship data and the collation pattern is high, and since the importance is desirably taken into account during the generation of the converted data before inputting it into the neural network, it is not sufficient with only the effect of the neural network.

Therefore, in Example 2, a parameter indicating importance of each relationship data is introduced, and converted data of each relationship data is generated based on the similarity weighted by the importance, thereby improving learning accuracy.

Overall Configuration

Figure 23:
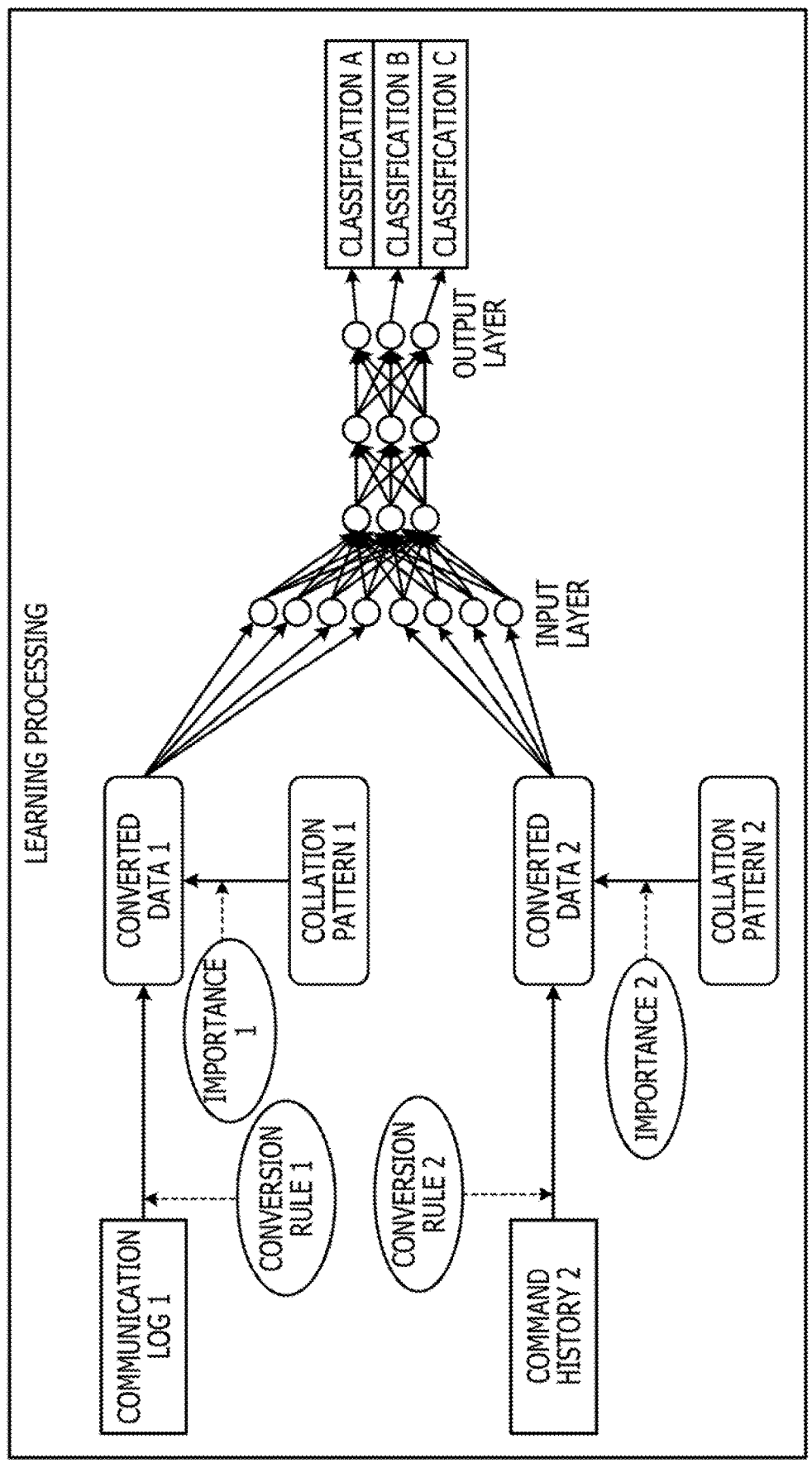
FIG. 23 is a diagram for explaining learning processing of a monitoring server according to Example 2.

FIG. 23 is a diagram for explaining learning processing of a monitoring server 10 according to Example 2. As illustrated in FIG. 23, the monitoring server 10 executes learning processing by using two relationship data of the communication log and the command history as teacher data.

The monitoring server 10 calculates, as to the communication log 1, a similarity 1 obtained by multiplying an inner product of a vector having each value of converted data 1 as each component and a vector having each value of a collation pattern 1 as each component by an importance 1. Similarly, as to the command history 2, the monitoring server 10 calculates a similarity 2 obtained by multiplying an inner product of a vector having each value of the converted data 2 as each component and a vector having each value of the collation pattern 2 as each component by an importance 2.

The monitoring server 10 generates converted data 1 in which the communication log is converted and converted data 2 in which the command history is converted such that the total sum of the similarity 1 and the similarity 2 becomes maximum. Thereafter, the monitoring server 10 inputs the converted data 1 converted based on the converted data 1 and the converted data 2 converted based on the converted data 2 into the neural network and executes an update by the same method as in the Example 1.

Flow of Processing

Figure 24:
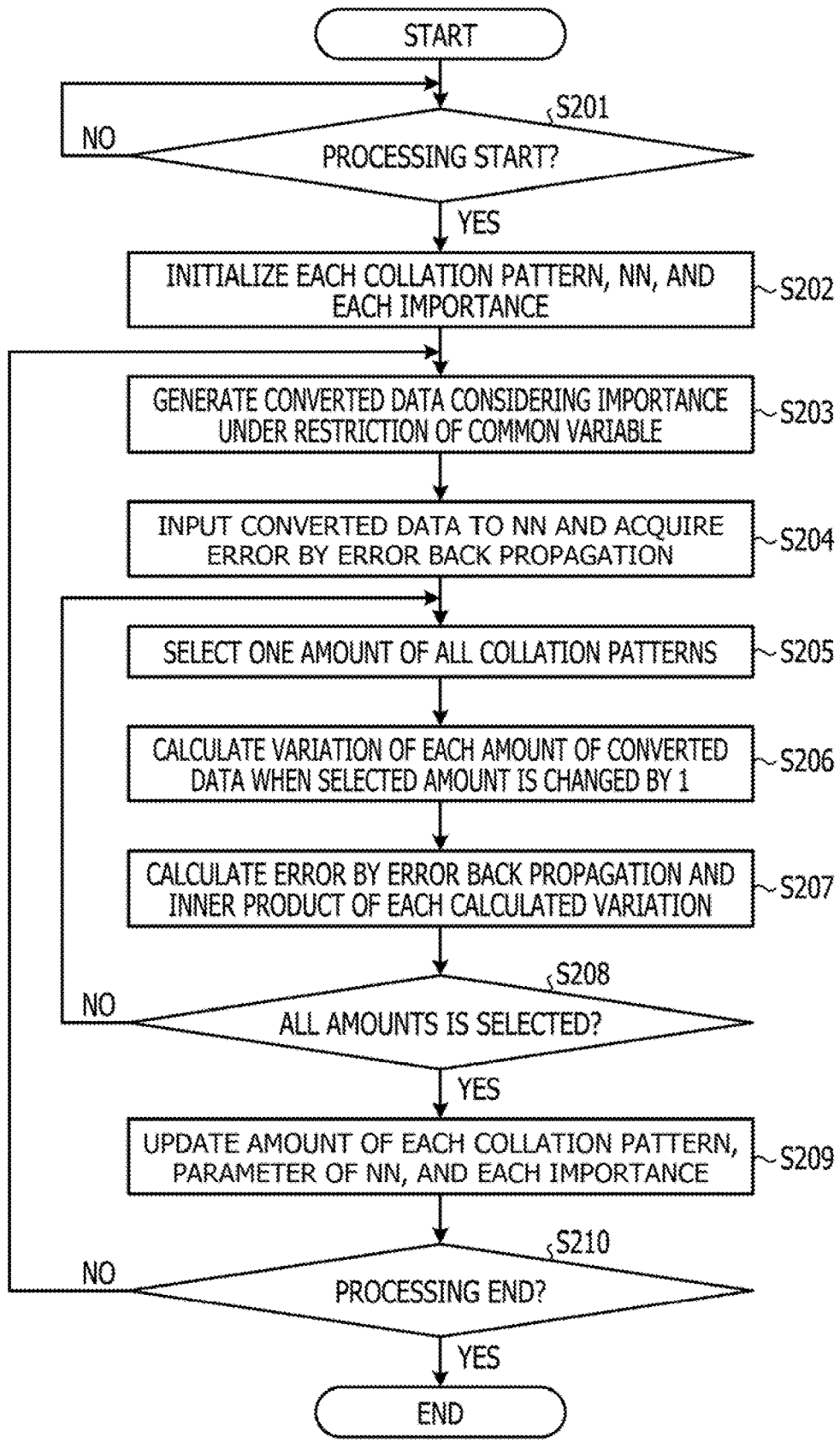
FIG. 24 is a flowchart illustrating a flow of learning processing according to Example 2.

FIG. 24 is a flowchart illustrating a flow of the learning processing according to Example 2. As illustrated in FIG. 24, when processing is started (S201: Yes), the initializing part 23 of the learning section 22 randomly initializes each importance in addition to each collation pattern and a parameter of a neural network (NN) (S202).

Then, the conversion part 24 generates each conversion rule such that the total sum of each similarity between the collation pattern considering importance and the converted data is maximized under the restriction that the conversion contents of the common variable commonly included in each relationship data are made the same between the relationship data, and generates each converted data according to each conversion rule (S203).

The updating part 25 inputs each converted data to the neural network and acquires an error by error back propagation (S204).

Then, the updating part 25 selects one amount from all collation patterns (S205), and calculates a variation of each amount of converted data when the selected amount is changed by one (S206). Thereafter, the updating part 25 calculates the error of the error back propagation and the inner product of each calculated variation (S207).

When an unselected amount exists in all collation patterns (S208: No), S205 is executed for the unselected amount. On the other hand, when processing is completed for all amounts of all collation patterns (S208: Yes), the updating part 25 updates each importance in addition to the amount of each collation pattern and the parameter of the neural network (S209).

Thereafter, when the learning processing is continued (S210: No), S203 and subsequent processes are repeated, and when the end condition is satisfied, the learning processing is ended (S210: Yes).

Specific Example

Next, a specific example of learning processing executed by the learning section 22 will be explained using FIGS. 25A to 37C. The difference from Example 1 is that, importance is used, and is that, not only the collation pattern and the parameters of the neural network but also the importance is included in the update target by calculation of similarity and variation of error. The assumption is the same as that of Example 1.

Initialization

Next, the initialization executed in S202 of FIG. 24 will be described. FIGS. 25A to 25C are diagrams for explaining an initialization according to Example 2. Initialization of each amount of the collation pattern XA1 for the communication log and the collation pattern YA1 for the command history illustrated in FIG. 25A, and initialization of the parameters of the neural network illustrated in FIG. 25B are the same as in Example 1 as illustrated in FIGS. 12A and 12B.

In Example 2, the learning section 22 executes initialization of each importance. Specifically, as illustrated in FIG. 25C, the learning section 22 sets 0.2 as a random value to the importance K1 for the communication log, and sets 0.8 as a random value to the importance K2 for the command history.

Generation of Converted Data

Figure 26:
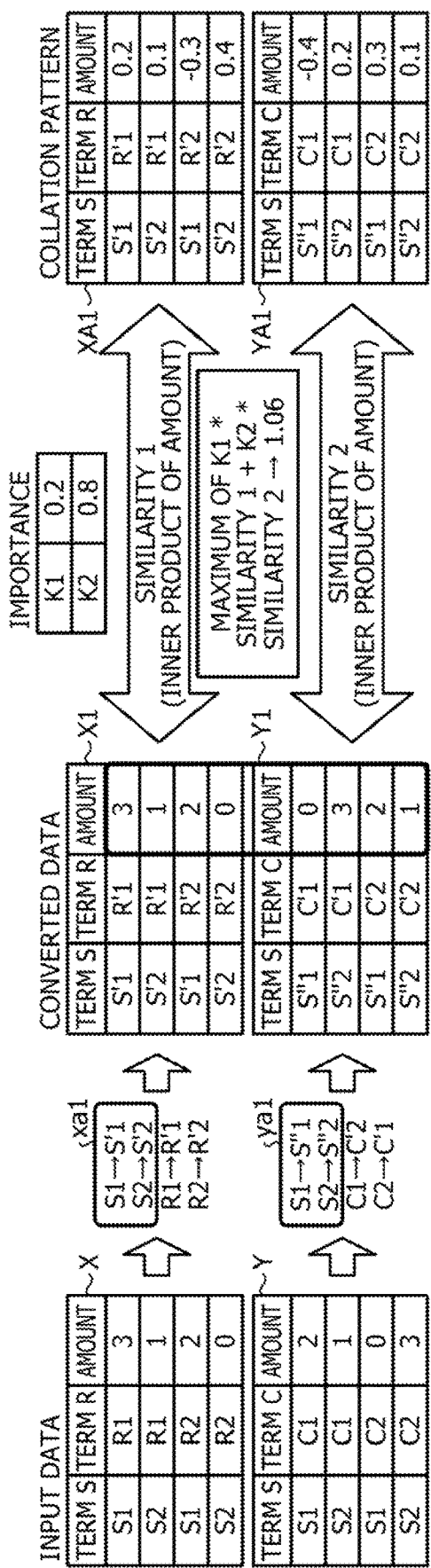
FIG. 26 is a diagram for explaining a generation of converted data according to Example 2.

Next, the converted data executed in S203 of FIG. 24 will be described. FIG. 26 is a diagram for explaining a generation of converted data according to Example 2. As illustrated in FIG. 26, the learning section 22 generates a conversion rule xa1 and a conversion rule ya1 under the restriction of making the conversion rules of the common variable the same, such that the total sum of similarity 1 and similarity 2 of the collation pattern and the converted data is maximized.

The conversion rule and the converted data illustrated in FIG. 26 represent an example satisfying the maximum value of the similarity and restriction. Specifically, the similarity 1 between each amount of the converted data X1 and each amount of the collation pattern XA1 is, the inner product '((3×0.2)+(1×0.1)+(2×−0.3)+(0×0.4))×importance K1 '0.2'=0.1×0.2=0.02'. The similarity 2 between each amount of the converted data Y1 and each amount of the collation pattern YA1 is, the inner product '((0×−0.4)+(3×0.2)+(2× 0.3)+(1×0.1))×importance K2 '0.8'=1.3×0.8=1.04'.

Therefore, 'similarity 1 (0.02)+similarity 2 (1.04)=1.06' is the maximum value of 'similarity 1+similarity 2', and the conversion rule xa1 at this time is 'S1→S'1, S2→S'2, R1→R'1, R2→R'2', and the conversion rule ya1 is 'S1→S"1, S2→S"2, C1→C'2, C2→C'1'. That is, 'S1→S'1, S2→S'2' of the conversion rule xa1 and 'S1→S"1, S2→S"2' of the conversion rule ya1 indicate the same conversion contents such that the variable values 'S1' and 'S2' of the common variable 'term S' in each input data are input in this order.

Update: Part 1

Next, update processing from S204 to S208 in FIG. 24 will be described in detail. The processing flow is the same as in Example 1, and the calculation method of similarity is the same.

Figure 27A:
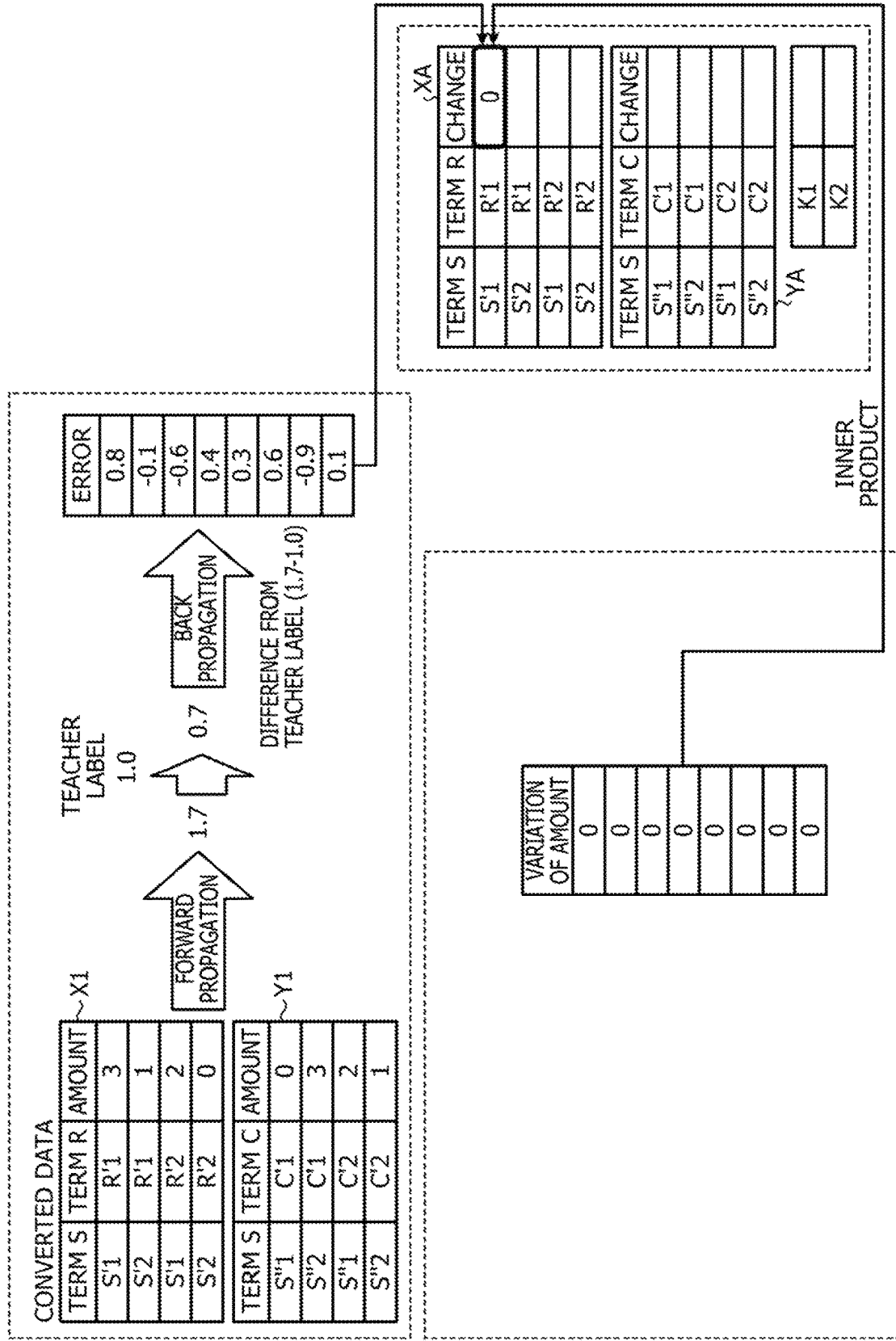
FIGS. 27A and 27B illustrate a diagram for explaining an error acquisition according to Example 2 and a variation calculation (part 1) of an amount of converted data.
Figure 27B:
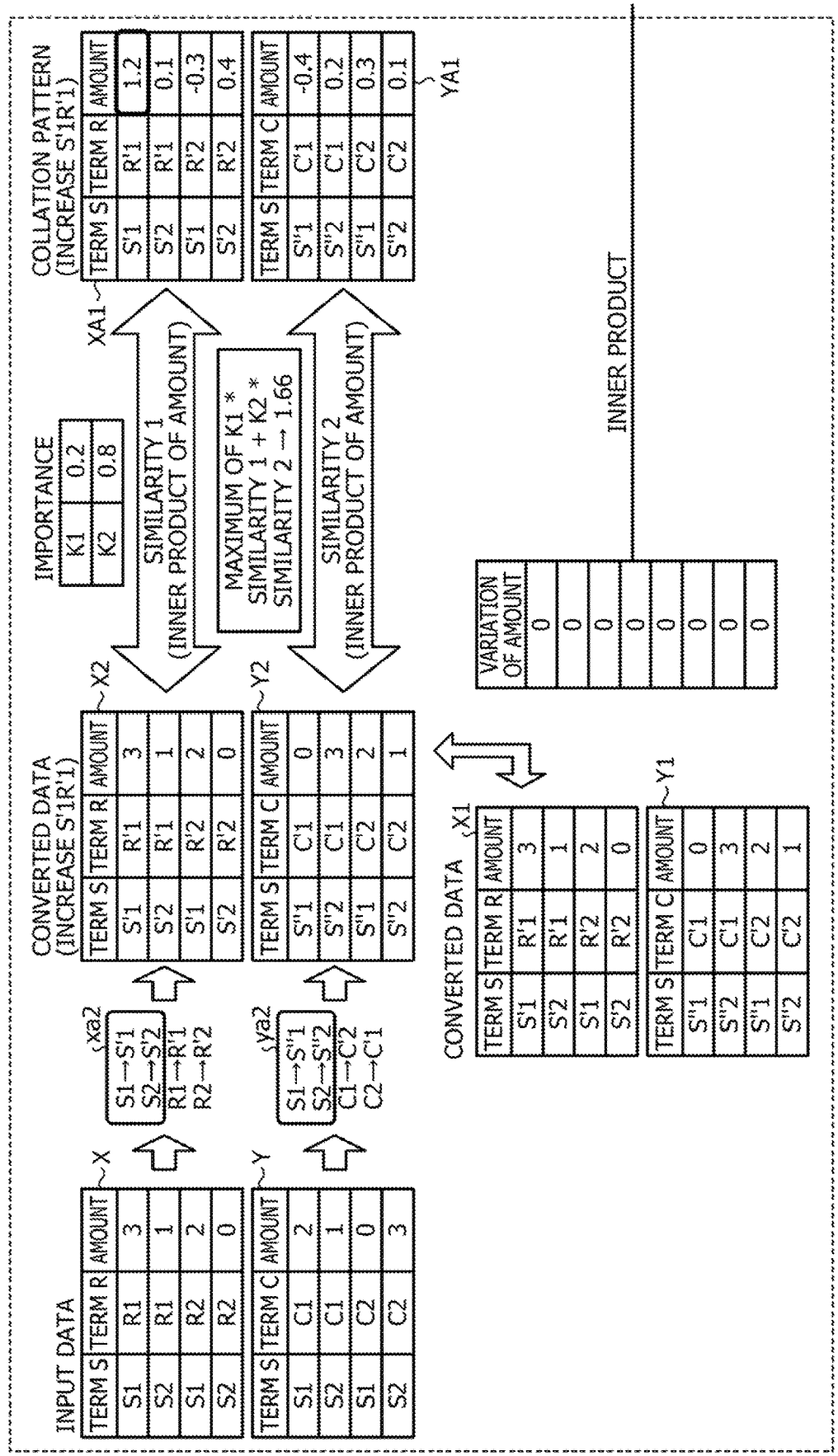

FIG. 27 (i.e., FIGS. 27A and 27B) is a diagram for explaining an error acquisition according to Example 2 and a variation calculation (part 1) of an amount of converted data. First, the learning section 22 inputs the converted data X1 and the converted data Y1 generated in FIG. 26 to an input layer in order from the head to execute forward propagation, and acquires an output value '1.7' from the output layer. The learning section 22 calculates error '1.7−1.0=0.7' between the output value and the teacher label, executes back propagation based on the error '0.7', and acquires error '0.8, −0.1, −0.6, 0.4, 0.3, 0.6, −0.9, 0.1'.

Then, the learning section 22 selects one out of all amounts of the collation pattern (in this case, the amount of S'1R'1) and increases it by 1. Specifically, the learning section 22 increases only the amount of 'S'1, R'1, 0.2' by 1 in the collation pattern XA1 illustrated in FIGS. 25A to 25C to generate 'S'1, R'1, 1.2', 'S'2, R'1, 0.1', 'S'1, R'2, −0.3', and 'S'2, R'2, 0.4'.

The learning section 22 generates a conversion rule xa2 and a conversion rule ya2 under the restriction of making the conversion rules of the common variable the same, such that the total sum of similarity 1 and similarity 2 of the collation pattern and the converted data is maximized considering the importance.

The conversion rule and the converted data illustrated in FIG. 27 represent an example satisfying the maximum value of the similarity and restriction. Specifically, the total sum of similarity 1 (importance K1×inner product of each amount) between each amount of converted data X2 and each amount of collation pattern XA1, and similarity 2 (importance K2×inner product of each amount) between each amount of converted data Y2 and each amount of collation pattern YA1 becomes, '1.66'.

As illustrated in FIG. 27, when the maximum value of the total sum of similarities is '1.66', the conversion rule xa2 is 'S1→S'1, S2→S'2, R1→R'1, R2→R'2', and the conversion rule ya2 is 'S1→S"1, S2→S"2, C1→C'1, C2→C'2'. That is, 'S1→S'1, S2→S'2' of the conversion rule xa2 and 'S1→S"1, S2→S"2' of the conversion rule ya2 indicate the same conversion contents.

Subsequently, the learning section 22 calculates a variation '0, 0, 0, 0' between each amount '3, 1, 2, 0' of the converted data X2 and each amount '3, 1, 2, 0' of the converted data X1, and a variation '0, 0, 0, 0' between each amount '0, 3, 2, 1' of the converted data Y2 and each amount '0, 3, 2, 1' of the converted data Y1. Thereafter, the learning section 22 calculates '0' as the inner product of the error '0.8, −0.1, −0.6, 0.4, 0.3, 0.6, −0.9, 0.1' and the variation '0, 0, 0, 0, 0, 0, 0, 0'. The learning section 22 sets the calculated '0' to the change of 'S'1, R'1' of the updated collation pattern XA.

Update: Part 2

Figure 28A:
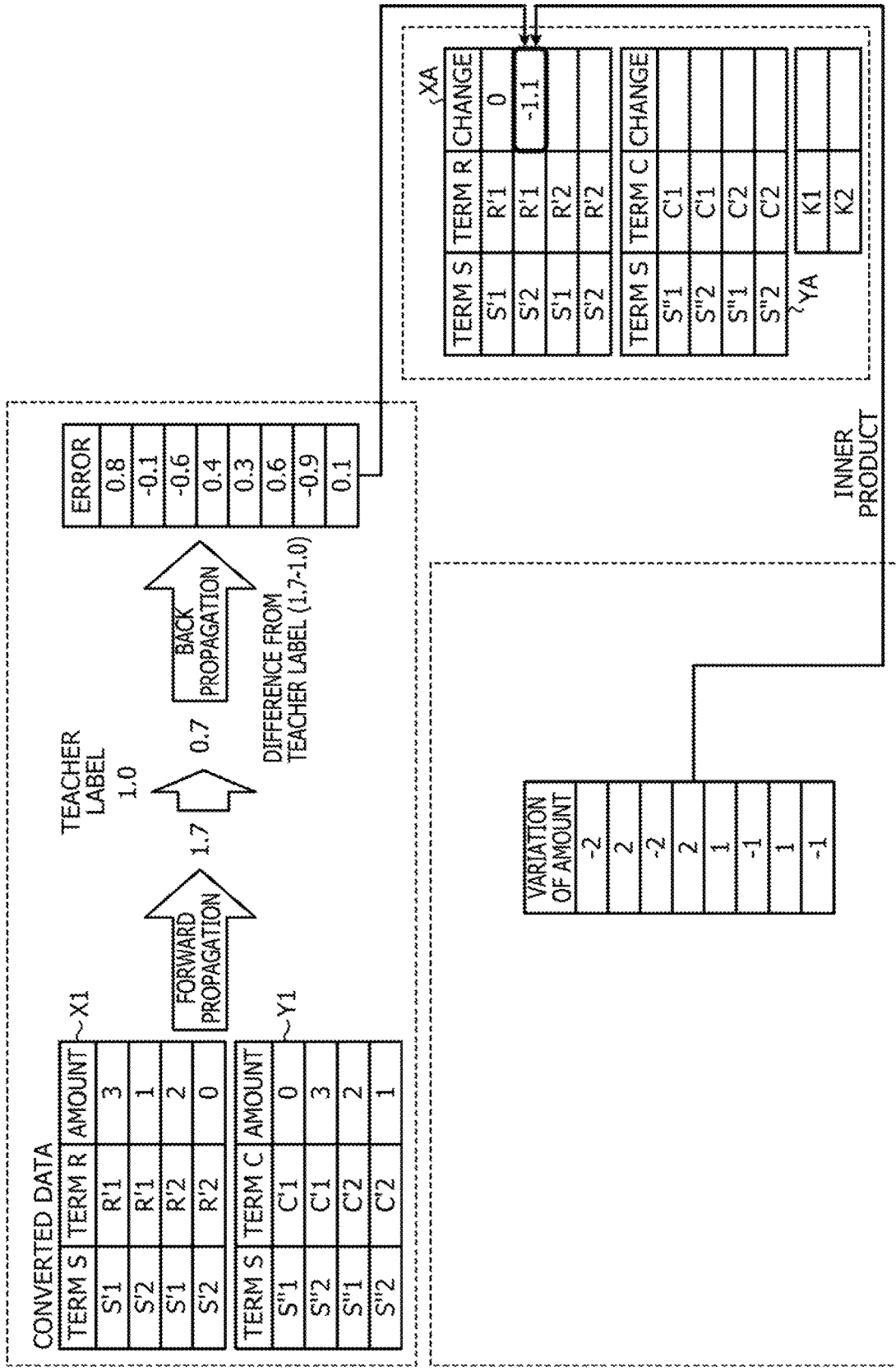
FIGS. 28A and 28B illustrate a diagram for explaining a variation calculation (part 2) of an amount of converted data according to Example 2.
Figure 28B:
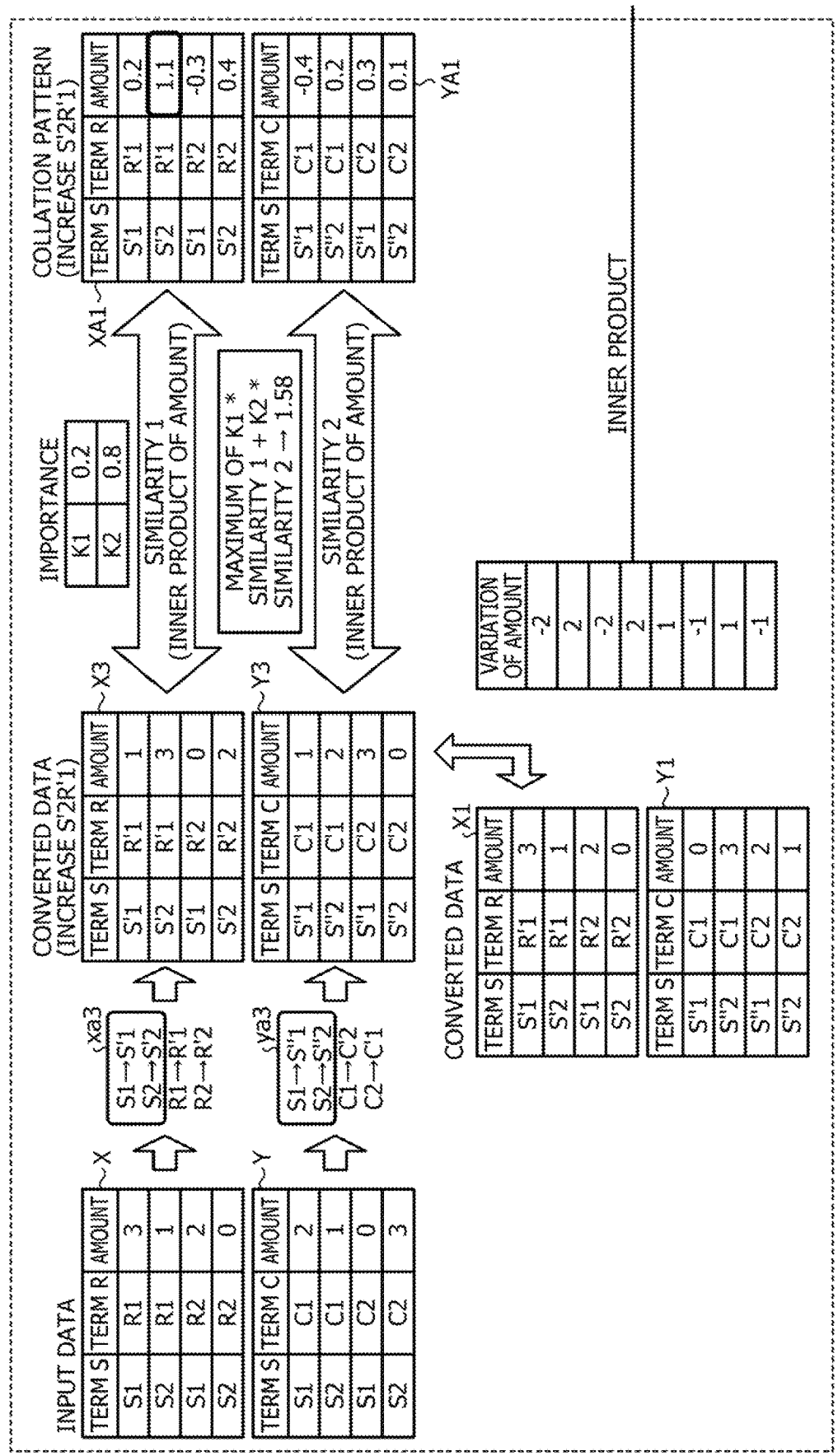

Subsequently, the update of the next amount of the collation pattern will be described. FIG. 28 (i.e., FIGS. 28A and 28B) is a diagram for explaining a variation calculation (part 2) of an amount of converted data according to Example 2. The processing described here is also executed by inputting the converted data X1 and the converted data Y1 generated in FIG. 27 and by using an error obtained by error back propagation.

Specifically, the learning section 22 increases only the amount of 'S'2, R'1, 0.1' by 1 out of the collation pattern XA1 illustrated in FIGS. 25A to 25C to generate 'S'1, R'1, 0.2', 'S'2, R'1, 1.1', 'S'1, R'2, −0.3', and 'S'2, R'2, 0.4'.

The learning section 22 generates a conversion rule xa3 and a conversion rule ya3 under the restriction of making the conversion rules of the common variable the same, such that the total sum of similarity 1 and similarity 2 of the collation pattern and the converted data is maximized considering the importance.

The conversion rule and the converted data illustrated in FIG. 28 represent an example satisfying the maximum value of the similarity and restriction. Specifically, the total sum of similarity 1 (importance K1×inner product of each amount) between each amount of converted data X3 and each amount of collation pattern XA1, and similarity 2 (importance K2×inner product of each amount) between each amount of converted data Y3 and each amount of collation pattern YA1 becomes, '1.58'.

As illustrated in FIG. 28, when the maximum value of the total sum of similarities is '1.58', the conversion rule xa3 is 'S1→S'1, S2→S'2, R1→R'1, R2→R'2', and the conversion rule ya3 is 'S1→S"1, S2→S"2, C1→C'2, C2→C'1'. That is, 'S1→S'1, S2→S'2' of the conversion rule xa3 and 'S1→S"1, S2→S"2' of the conversion rule ya3 indicate the same conversion contents.

Subsequently, the learning section 22 calculates a variation '−2, 2, −2, 2' between each amount '1, 3, 0, 2' of the converted data X3 and each amount '3, 1, 2, 0' of the converted data X1, and a variation '1, −1, 1, −1' between each amount '1, 2, 3, 0' of the converted data Y3 and each amount '0, 3, 2, 1' of the converted data Y1. Thereafter, the learning section 22 calculates '−1.1' as the inner product of the error '0.8, −0.1, −0.6, 0.4, 0.3, 0.6, −0.9, 0.1' and the variation '−2, 2, −2, 2, 1, −1, 1, −1'. The learning section 22 sets the calculated '−1.1' to the change of 'S'2, R'1' of the updated collation pattern XA.

Update: Part 3

Figure 29B:
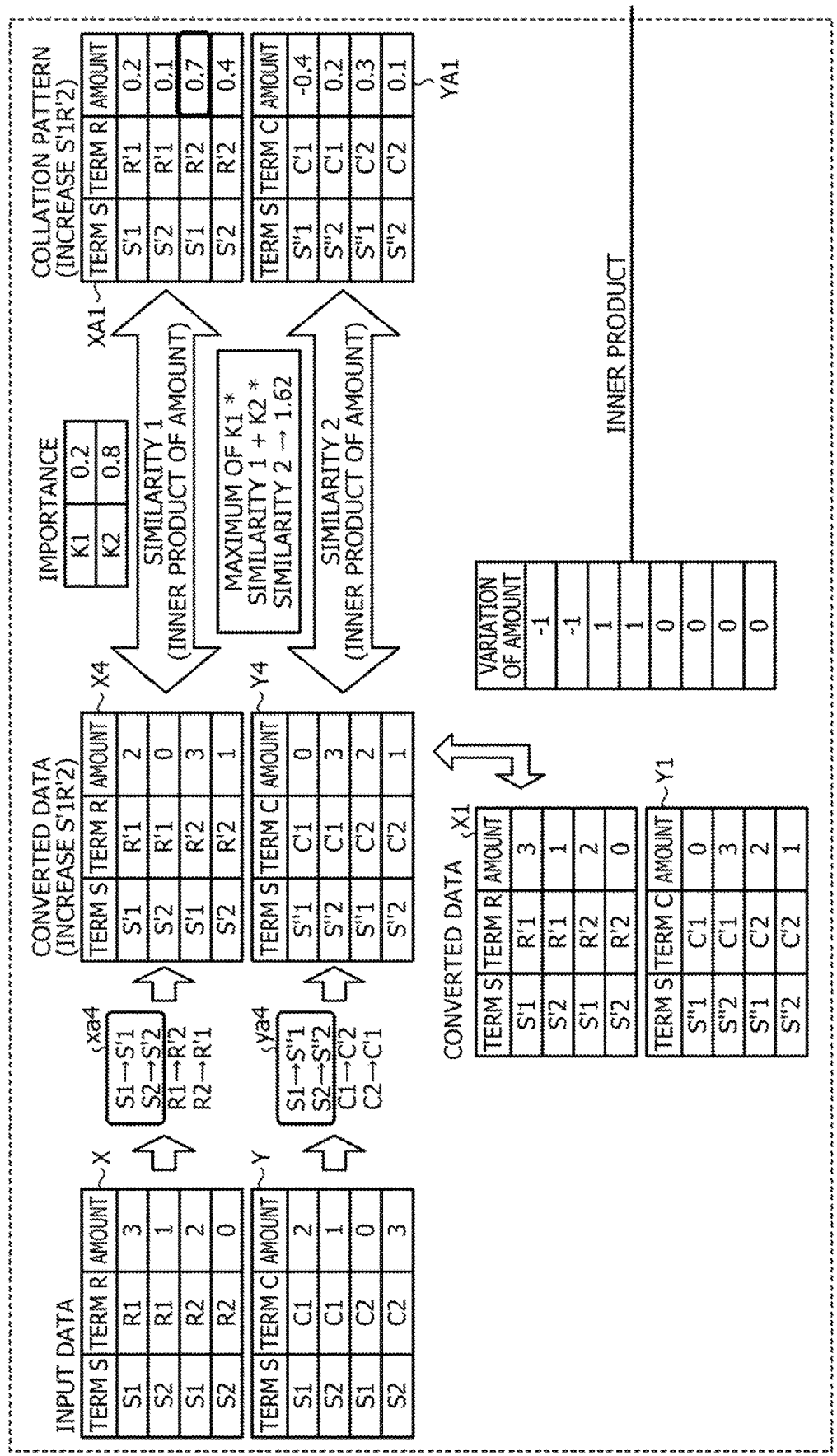

Subsequently, the update of the next amount of the collation pattern will be described. FIG. 29 (i.e., FIGS. 29A and 29B) is a diagram for explaining a variation calculation (part 3) of an amount of converted data according to Example 2. The processing described here is also executed by inputting the converted data X1 and the converted data Y1 generated in FIG. 27 and by using an error obtained by error back propagation.

The learning section 22 increases only the amount of 'S'1, R'2, −0.3' by 1 out of the collation pattern XA1 illustrated in FIGS. 25A to 25C to generate 'S'1, R'1, 0.2', 'S'2, R'1, 0.1', 'S'1, R'2, 0.7', and 'S'2, R'2, 0.4'.

The learning section 22 generates a conversion rule xa4 and a conversion rule ya4 under the restriction of making the conversion rules of the common variable the same, such that the sum of similarity 1 and similarity 2 of the collation pattern and the converted data is maximized considering the importance.

The conversion rule and the converted data illustrated in FIG. 29 represent an example satisfying the maximum value of the similarity and restriction. Specifically, the total sum of similarity 1 (importance K1×inner product of each amount) between each amount of converted data X4 and each amount of collation pattern XA1, and similarity 2 (importance K2×inner product of each amount) between each amount of converted data Y4 and each amount of collation pattern YA1 becomes, '1.62'.

As illustrated in FIG. 29, when the maximum value of the total sum of similarities is '1.62', the conversion rule xa4 is 'S1→S'1, S2→S'2, R1→R'2, R2→R'1', and the conversion rule ya4 is 'S1→S"1, S2→S"2, C1→C'2, C2→C'1'. That is, 'S1→S'1, S2→S'2' of the conversion rule xa4 and 'S1→S"1, S2→S"2' of the conversion rule ya4 indicate the same conversion contents.

Subsequently, the learning section 22 calculates a variation '−1, −1, 1, 1' between each amount '2, 0, 3, 1' of the converted data X4 and each amount '3, 1, 2, 0' of the converted data X1, and a variation '0, 0, 0, 0' between each amount '0, 3, 2, 1' of the converted data Y4 and each amount '0, 3, 2, 1' of the converted data Y1. Thereafter, the learning section 22 calculates '−0.9' as the inner product of the error '0.8, −0.1, −0.6, 0.4, 0.3, 0.6, −0.9, 0.1' and the variation '−1, −1, 1, 1, 0, 0, 0, 0'. The learning section 22 sets the calculated '−0.9' to the change of 'S'1, R'2' of the updated collation pattern XA.

Update: Part 4

Figure 30A:
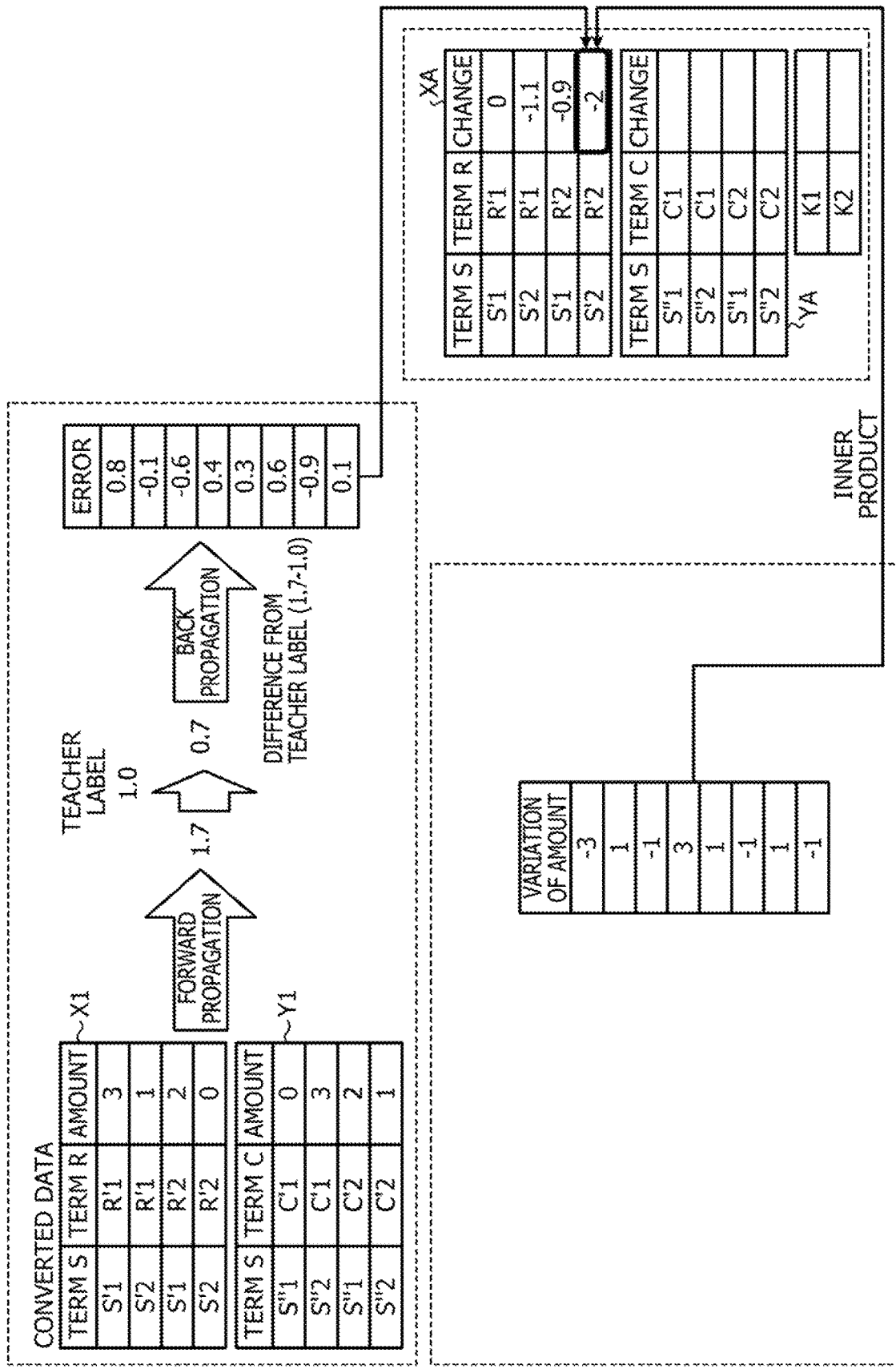
FIGS. 30A and 30B illustrate a diagram for explaining a variation calculation (part 4) of an amount of converted data according to Example 2.
Figure 30B:
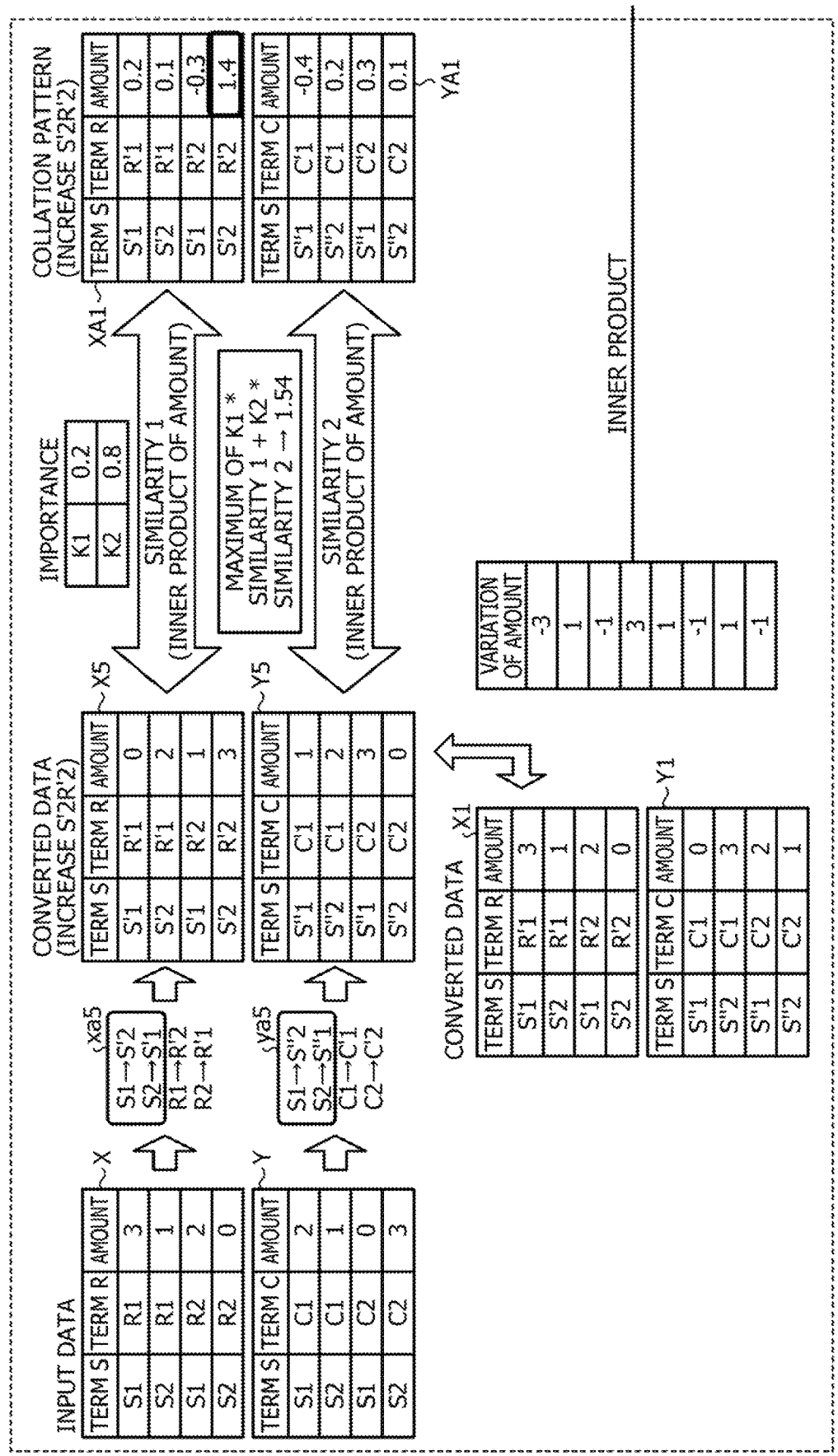

Subsequently, the update of the next amount of the collation pattern will be described. FIG. 30 (i.e., FIGS. 30A and 30B) is a diagram for explaining a variation calculation (part 4) of an amount of converted data according to Example 2. The processing described here is also executed by inputting the converted data X1 and the converted data Y1 generated in FIG. 27 and by using an error obtained by error back propagation.

Specifically, the learning section 22 increases only the amount of 'S'2, R'2, 0.4' by 1 out of the collation pattern XA1 illustrated in FIGS. 25A to 25C to generate 'S'1, R'1, 0.2', 'S'2, R'1, 0.1', 'S'1, R'2, −0.3', and 'S'2, R'2, 1.4'.

The learning section 22 generates a conversion rule xa5 and a conversion rule ya5 under the restriction of making the conversion rules of the common variable the same, such that the total sum of similarity 1 and similarity 2 of the collation pattern and the converted data is maximized considering the importance.

The conversion rule and the converted data illustrated in FIG. 30 represent an example satisfying the maximum value of the similarity and restriction. Specifically, the total sum of similarity 1 (importance K1×inner product of each amount) between each amount of converted data X5 and each amount of collation pattern XA1, and similarity 2 (importance K2×inner product of each amount) between each amount of converted data Y5 and each amount of collation pattern YA1 becomes, '1.54'.

As illustrated in FIG. 30, when the maximum value of the total sum of similarities is '1.54', the conversion rule xa5 is 'S1→S'2, S2→S'1, R1→R'2, R2→R'1', and the conversion rule ya5 is 'S1→S"2, S2−→"1, C1→C'1, C2→C'2'. That is, 'S1→S'2, S2→S'1' of the conversion rule xa5 and 'S1→S"2, S2→S"1' of the conversion rule ya5 indicate the same conversion contents.

Subsequently, the learning section 22 calculates a variation '−3, 1, −1, 3' between each amount '0, 2, 1, 3' of the converted data X5 and each amount '3, 1, 2, 0' of the converted data X1, and a variation '1, −1, 1, −1' between each amount '1, 2, 3, 0' of the converted data Y5 and each amount '0, 3, 2, 1' of the converted data Y1. Thereafter, the learning section 22 calculates '−2.0' as the inner product of the error '0.8, −0.1, −0.6, 0.4, 0.3, 0.6, −0.9, 0.1' and the variation '−3, 1, −1, 3, 1, −1, 1, −1'. The learning section 22 sets the calculated '−2.0' to the change of 'S'2, R'2' of the updated collation pattern XA.

Update: Part 5

Figure 31A:
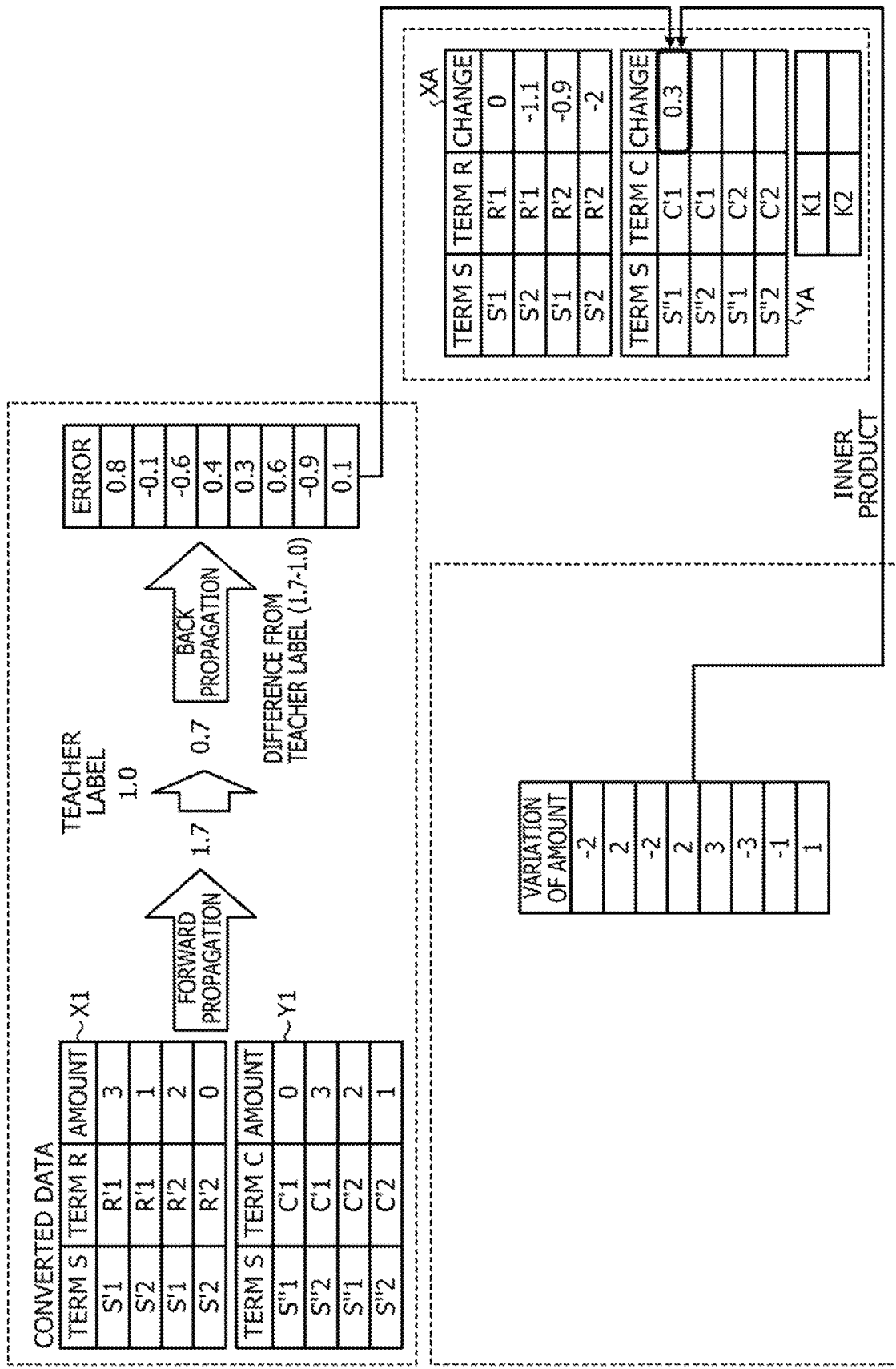
FIGS. 31A and 31B illustrate a diagram for explaining a variation calculation (part 5) of an amount of converted data according to Example 2.
Figure 31B:
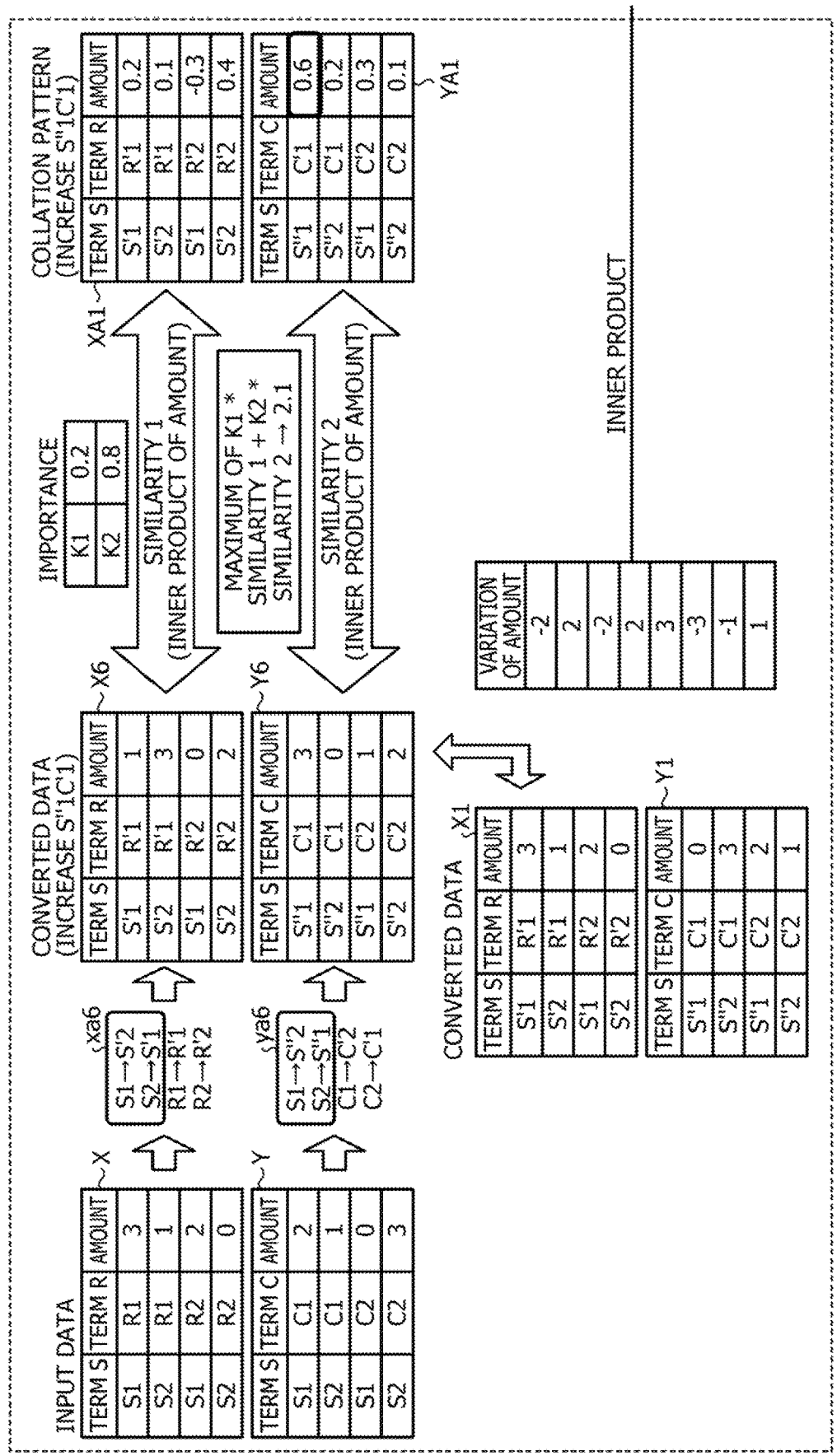

Subsequently, the update of the next amount of the collation pattern will be described. FIG. 31 (i.e., FIGS. 31A and 31B) is a diagram for explaining a variation calculation (part 5) of an amount of converted data according to Example 2. The processing described here is also executed by inputting the converted data X1 and the converted data Y1 generated in FIG. 27 and by using an error obtained by error back propagation.

The learning section 22 increases only the amount of 'S"1, C'1, −0.4' by 1 out of the collation pattern YA1 illustrated in FIGS. 25A to 25C to generate 'S"1, C'1, 0.6', 'S"2, C'1, 0.2', 'S"1, C'2, 0.3', and 'S"2, C'2, 0.1'.

The learning section 22 generates a conversion rule xa6 and a conversion rule ya6 under the restriction of making the conversion rules of the common variable the same, such that the total sum of similarity 1 and similarity 2 of the collation pattern and the converted data is maximized considering the importance.

The conversion rule and the converted data illustrated in FIG. 31 represent an example satisfying the maximum value of the similarity and restriction. Specifically, the total sum of similarity 1 (importance K1×inner product of each amount) between each amount of converted data X6 and each amount of collation pattern XA1, and similarity 2 (importance K2×inner product of each amount) between each amount of converted data Y6 and each amount of collation pattern YA1 becomes, '2.1'.

As illustrated in FIG. 31, when the maximum value of the total sum of similarities is '2.1', the conversion rule xa6 is 'S1→S'2, S2→S'1, R1→R'1, R2→R'2', and the conversion rule ya6 is 'S1→S"2, S2→S"1, C1→C'2, C2→C'1'. That is, 'S1→S'2, S2→S'1' of the conversion rule xa6 and 'S1→S"2, S2→S"1' of the conversion rule ya6 indicate the same conversion contents.

Subsequently, the learning section 22 calculates a variation '−2, 2, −2, 2' between each amount '1, 3, 0, 2' of the converted data X6 and each amount '3, 1, 2, 0' of the converted data X1, and a variation '3, −3, −1, 1' between each amount '3, 0, 1, 2' of the converted data Y6 and each amount '0, 3, 2, 1' of the converted data Y1. Thereafter, the learning section 22 calculates '0.3' as the inner product of the error '0.8, −0.1, −0.6, 0.4, 0.3, 0.6, −0.9, 0.1' and the variation '−2, 2, −2, 2, 3, −3, −1, 1'. The learning section 22 sets the calculated '0.3' to the change of 'S"1, C'1' of the updated collation pattern XA.

Update: Part 6

Figure 32A:
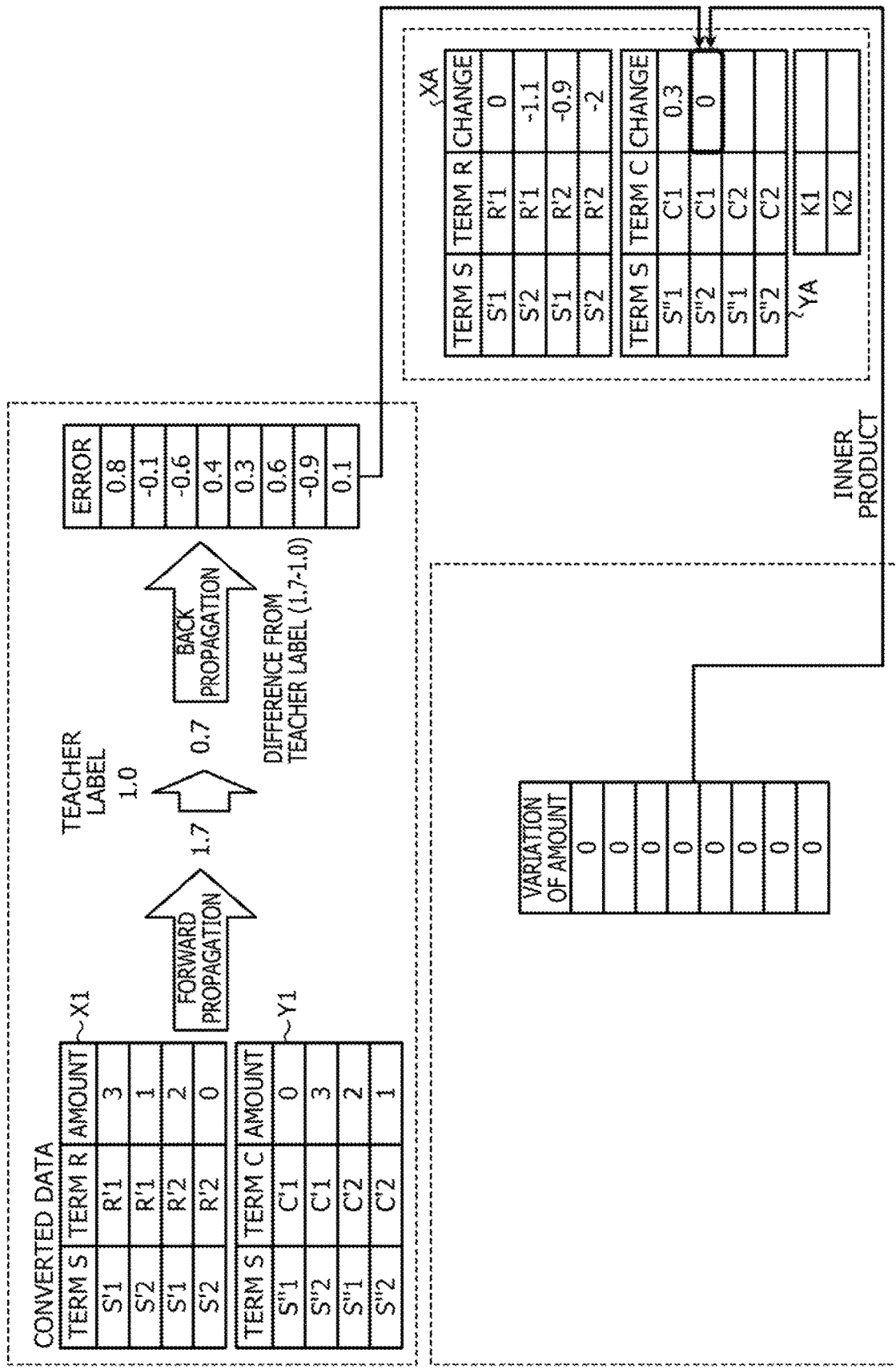
FIGS. 32A and 32B illustrate a diagram for explaining a variation calculation (part 6) of an amount of converted data according to Example 2.
Figure 32B:
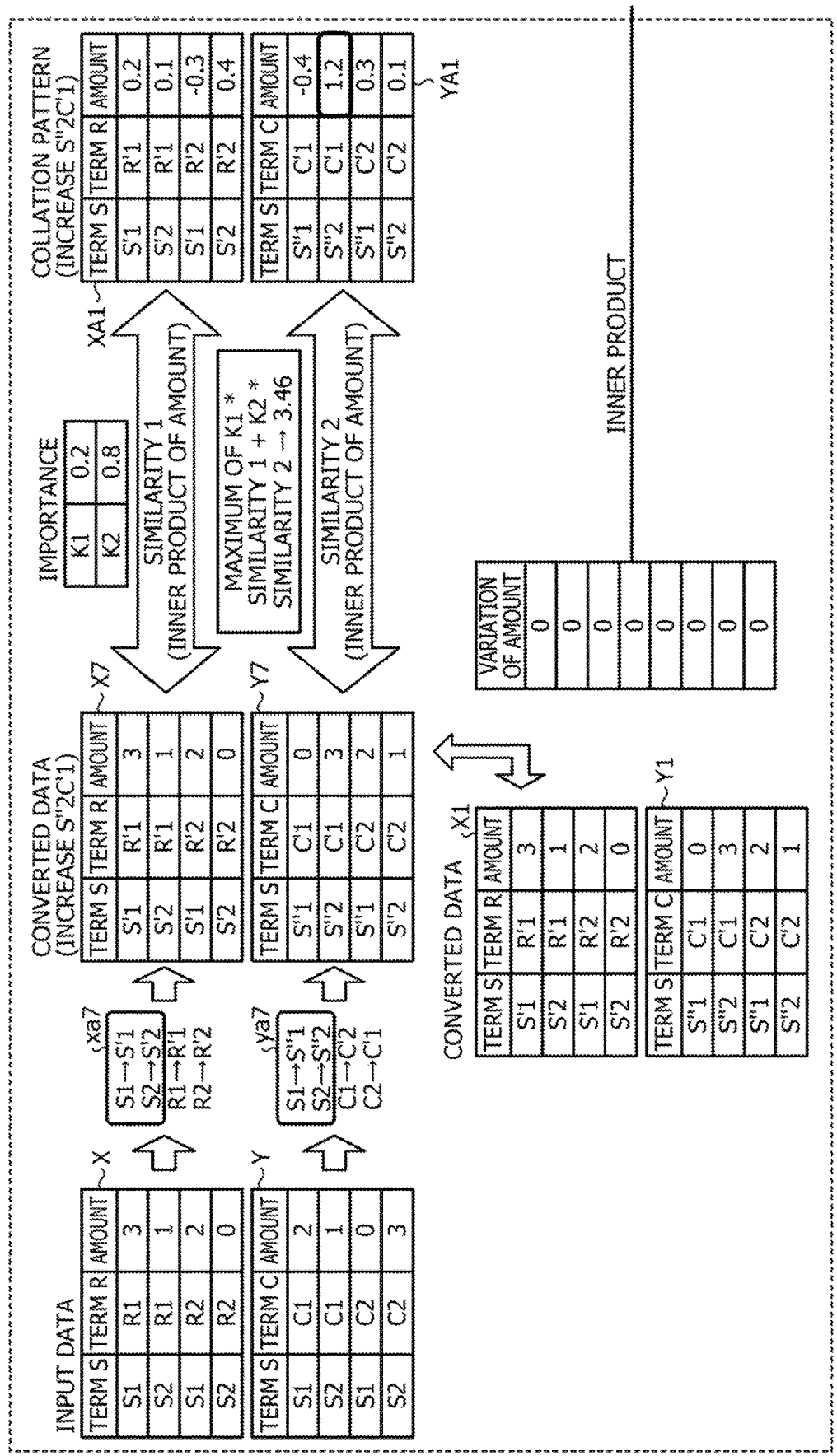

Subsequently, the update of the next amount of the collation pattern will be described. FIG. 32 (i.e., FIGS. 32A and 32B) is a diagram for explaining a variation calculation (part 6) of an amount of converted data according to Example 2. The processing described here is also executed by inputting the converted data X1 and the converted data Y1 generated in FIG. 27 and by using an error obtained by error back propagation.

Specifically, the learning section 22 increases only the amount of 'S"2, C'1, 0.2' by 1 out of the collation pattern YA1 illustrated in FIGS. 25A to 25C to generate 'S"1, C'1, −0.4', 'S"2, C'1, 1.2', 'S"1, C'2, 0.3', and 'S"2, C'2, 0.1'.

The learning section 22 generates a conversion rule xa7 and a conversion rule ya7 under the restriction of making the conversion rules of the common variable the same, such that the total sum of similarity 1 and similarity 2 of the collation pattern and the converted data is maximized considering the importance.

The conversion rule and the converted data illustrated in FIG. 32 represent an example satisfying the maximum value of the similarity and restriction. Specifically, the total sum of similarity 1 (importance K1×inner product of each amount) between each amount of converted data X7 and each amount of collation pattern XA1, and similarity 2 (importance K2×inner product of each amount) between each amount of converted data Y7 and each amount of collation pattern YA1 becomes, '3.46'.

As illustrated in FIG. 32, when the maximum value of the total sum of similarities is '3.46', the conversion rule xa7 is 'S1→S'1, S2→S'2, R1→R'1, R2→R'2', and the conversion rule ya7 is 'S1→S"1, S2→S"2, C1→C'2, C2→C'1'. That is, 'S1→S'1, S2→S'2' of the conversion rule xa7 and 'S1→S"1, S2→S"2' of the conversion rule ya7 indicate the same conversion contents.

Subsequently, the learning section 22 calculates a variation '0, 0, 0, 0' between each amount '3, 1, 2, 0' of the converted data X7 and each amount '3, 1, 2, 0' of the converted data X1, and a variation '0, 0, 0, 0' between each amount '0, 3, 2, 1' of the converted data Y7 and each amount '0, 3, 2, 1' of the converted data Y1. Thereafter, the learning section 22 calculates '0' as the inner product of the error '0.8, −0.1, −0.6, 0.4, 0.3, 0.6, −0.9, 0.1' and the variation '0, 0, 0, 0, 0, 0, 0, 0'. The learning section 22 sets the calculated '0' to the change of 'S"2, C'1' of the updated collation pattern XA.

Update: Part 7

Figure 33A:
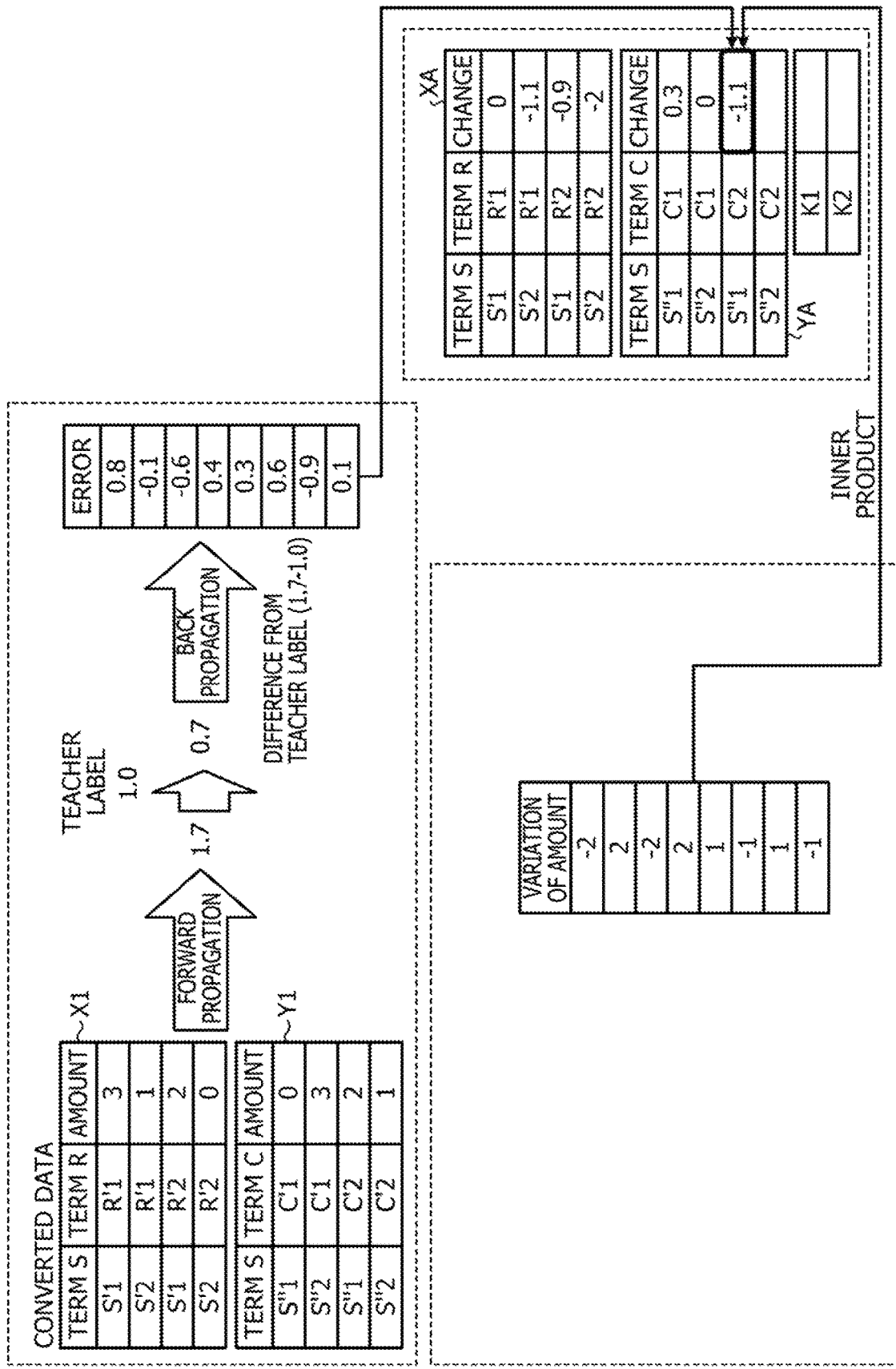
FIGS. 33A and 33B illustrate a diagram for explaining a variation calculation (part 7) of an amount of converted data according to Example 2.
Figure 33B:
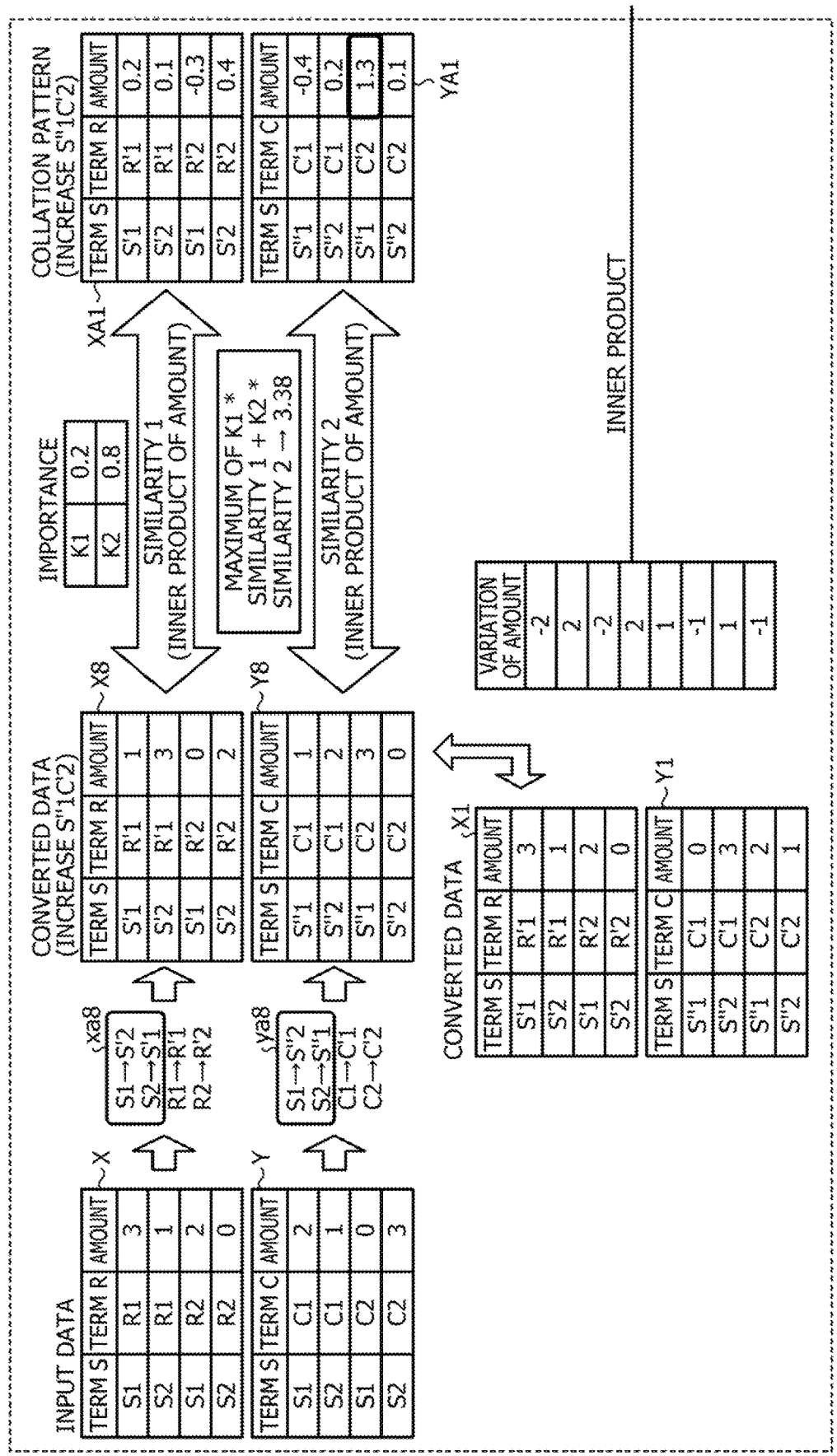

Subsequently, the update of the next amount of the collation pattern will be described. FIG. 33 (i.e., FIGS. 33A and 33B) is a diagram for explaining a variation calculation (part 7) of an amount of converted data according to Example 2. The processing described here is also executed by inputting the converted data X1 and the converted data Y1 generated in FIG. 27 and by using an error obtained by error back propagation.

Specifically, the learning section 22 increases only the amount of 'S"1, C'2, 0.3' by 1 out of the collation pattern YA1 illustrated in FIGS. 25A to 25C to generate 'S"1, C'1, −0.4', 'S"2, C'1, 0.2', 'S"1, C'2, 1.3', and 'S"2, C'2, 0.1'.

The learning section 22 generates a conversion rule xa8 and a conversion rule ya8 under the restriction of making the conversion rules of the common variable the same, such that the total sum of similarity 1 and similarity 2 of the collation pattern and the converted data is maximized considering the importance.

The conversion rule and the converted data illustrated in FIG. 33 represent an example satisfying the maximum value of the similarity and restriction. Specifically, the total sum of similarity 1 (importance K1×inner product of each amount) between each amount of converted data X8 and each amount of collation pattern XA1, and similarity 2 (importance K2×inner product of each amount) between each amount of converted data Y8 and each amount of collation pattern YA1 becomes, '3.38'.

As illustrated in FIG. 33, when the maximum value of the total sum of similarities is '3.38', the conversion rule xa8 is 'S1→S'2, S2→S'1, R1→R'1, R2→R'2', and the conversion rule ya8 is 'S1→S"2, S2→S"1, C1→C'2, C2→C'1'. That is, 'S1→S'2, S2→S'1' of the conversion rule xa8 and 'S1→S"2, S2→S"1' of the conversion rule ya8 indicate the same conversion contents.

Subsequently, the learning section 22 calculates a variation '−2, 2, −2, 2' between each amount '1, 3, 0, 2' of the converted data X8 and each amount '3, 1, 2, 0' of the converted data X1, and a variation '1, −1, 1, −1' between each amount '1, 2, 3, 0' of the converted data Y8 and each amount '0, 3, 2, 1' of the converted data Y1. Thereafter, the learning section 22 calculates '−1.1' as the inner product of the error '0.8, −0.1, −0.6, 0.4, 0.3, 0.6, −0.9, 0.1' and the variation '−2, 2, −2, 2, 1, −1, 1, −1'. The learning section 22 sets the calculated '−1.1' to the change of 'S"1, C'2' of the updated collation pattern XA.

Update: Part 8

Figure 34A:
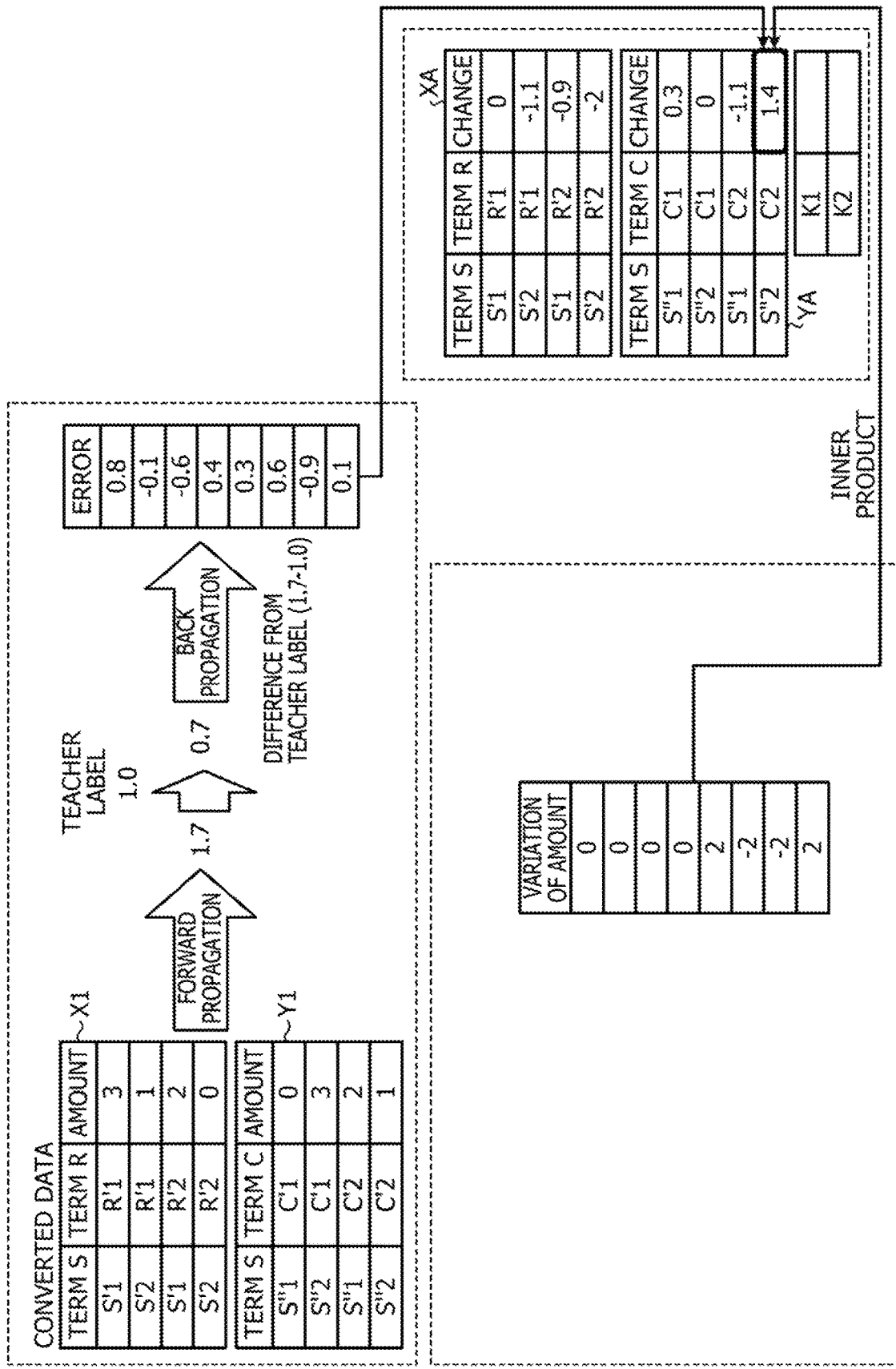
FIGS. 34A and 34B illustrate a diagram for explaining a variation calculation (part 8) of an amount of converted data according to Example 2.
Figure 34B:
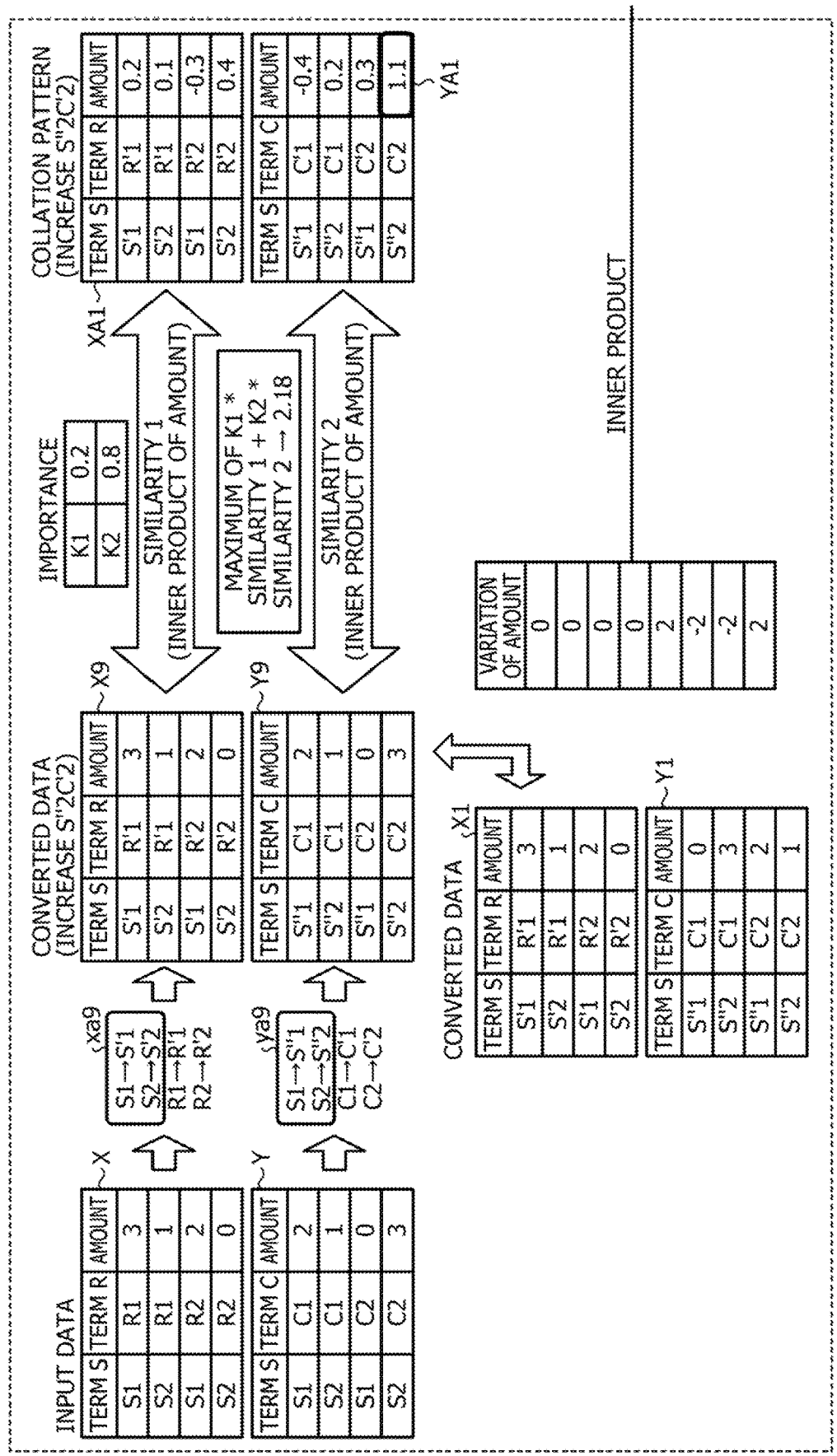

Subsequently, the update of the next amount of the collation pattern will be described. FIG. 34 (i.e., FIGS. 34A and 34B) is a diagram for explaining a variation calculation (part 8) of an amount of converted data according to Example 2. The processing described here is also executed by inputting the converted data X1 and the converted data Y1 generated in FIG. 27 and by using an error obtained by error back propagation.

The learning section 22 increases only the amount of 'S"2, C'2, 0.1' by 1 out of the collation pattern YA1 illustrated in FIGS. 25A to 25C to generate 'S"1, C'1, −0.4', 'S"2, C'1, 0.2', 'S"1, C'2, 0.3', and 'S"2, C'2, 1.1'.

The learning section 22 generates a conversion rule xa9 and a conversion rule ya9 under the restriction of making the conversion rules of the common variable the same, such that the total sum of similarity 1 and similarity 2 of the collation pattern and the converted data is maximized considering the importance.

The conversion rule and the converted data illustrated in FIG. 34 represent an example satisfying the maximum value of the similarity and restriction. Specifically, the total sum of similarity 1 (importance K1×inner product of each amount) between each amount of converted data X9 and each amount of collation pattern XA1, and similarity 2 (importance K2×inner product of each amount) between each amount of converted data Y9 and each amount of collation pattern YA1 becomes, '2.18'.

As illustrated in FIG. 34, when the maximum value of the total sum of similarities is '2.18', the conversion rule xa9 is 'S1→S'1, S2→S'2, R1→R'1, R2→R'2', and the conversion rule ya9 is 'S1→S"1, S2→S"2, C1→C'1, C2→C'2'. That is, 'S1→S'1, S2→S'2' of the conversion rule xa9 and 'S1→S"1, S2→S"2' of the conversion rule ya9 indicate the same conversion contents.

Subsequently, the learning section 22 calculates a variation '0, 0, 0, 0' between each amount '3, 1, 2, 0' of the converted data X9 and each amount '3, 1, 2, 0' of the converted data X1, and a variation '2, −2, −2, 2' between each amount '2, 1, 0, 3' of the converted data Y9 and each amount '0, 3, 2, 1' of the converted data Y1. Thereafter, the learning section 22 calculates '1.4' as the inner product of the error '0.8, −0.1, −0.6, 0.4, 0.3, 0.6, −0.9, 0.1' and the variation '0, 0, 0, 0, 2, −2, −2, 2'. The learning section 22 sets the calculated '1.4' to the change of 'S"2, C'2' of the updated collation pattern XA.

Update of Importance: Part 1

Figure 35A:
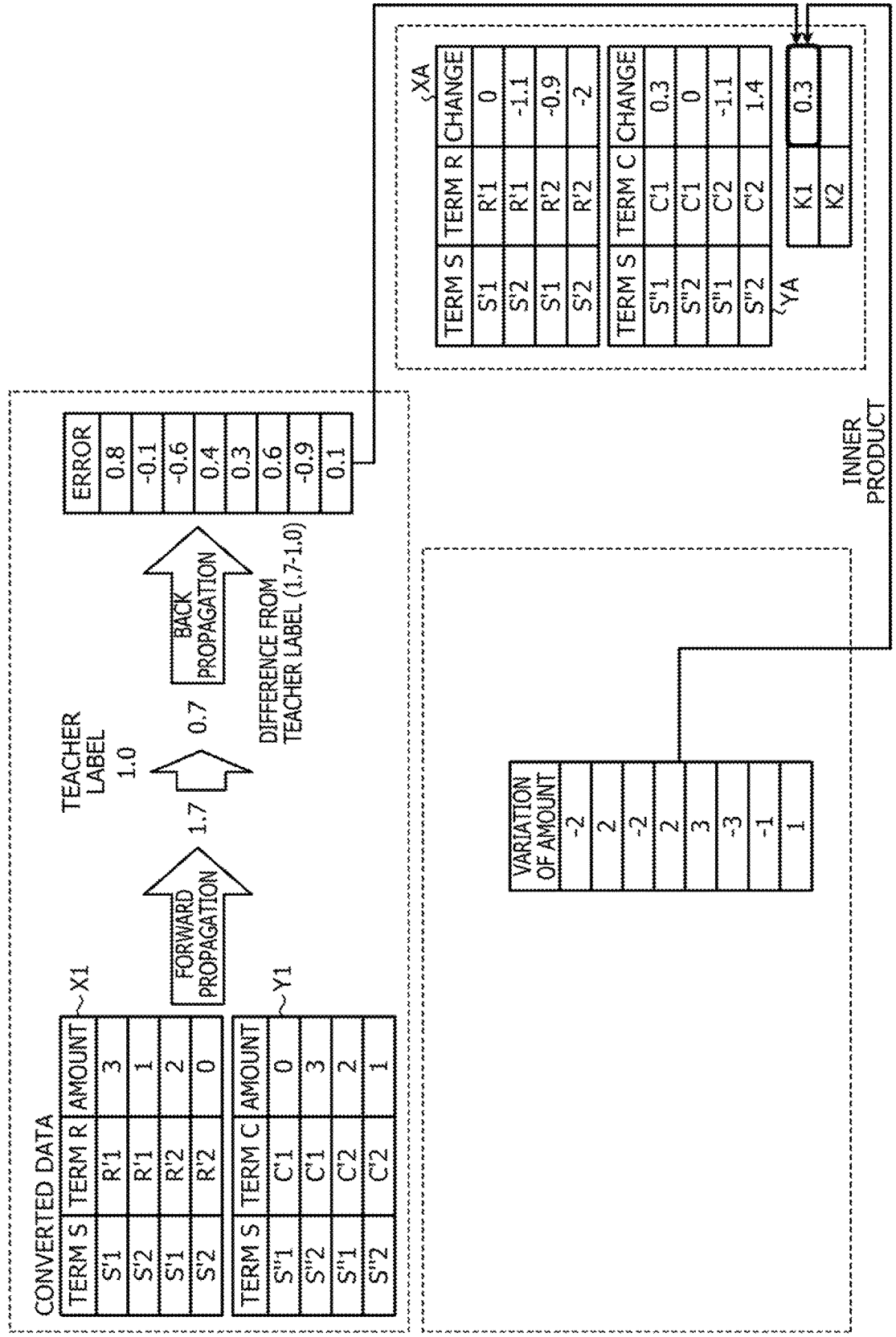

Subsequently, unlike Example 1, the learning section 22 updates the importance. FIG. 35 (i.e., FIGS. 35A and 35B)

is a diagram for explaining a variation inner product of an importance K1 according to Example 2. The processing described here is also executed by inputting the converted data X1 and the converted data Y1 generated in FIG. 27 and by using an error obtained by error back propagation.

The learning section 22 increases the importance K1 by 1 out of the importance K1 (0.2) and the importance K2 (0.8) illustrated in FIGS. 25A to 25C, to '1.2'. The learning section 22 generates a conversion rule xa10 and a conversion rule ya10 under the restriction of making the conversion rules of the common variable the same, such that the total sum of similarity 1 and similarity 2 of the collation pattern and the converted data is maximized considering the increased importance.

The conversion rule and the converted data illustrated in FIG. 35 represent an example satisfying the maximum value of the similarity and restriction. Specifically, the total sum of similarity 1 (importance K1(=1.2)×inner product of each amount) between each amount of converted data X10 and each amount of collation pattern XA1, and similarity 2 (importance K2(=0.8)×inner product of each amount) between each amount of converted data Y10 and each amount of collation pattern YA1 becomes, '2.6'.

As illustrated in FIG. 35, when the maximum value of the total sum of similarities is '2.6', the conversion rule xa10 is 'S1→S'2, S2→S'1, R1→R'1, R2→R'2', and the conversion rule ya10 is 'S1→S"2, S2→S"1, C1→C'2, C2→C'1'. That is, 'S1→S'2, S2→S'1' of the conversion rule xa10 and 'S1→S"2, S2→S"1' of the conversion rule ya10 indicate the same conversion contents.

Subsequently, the learning section 22 calculates a variation '−2, 2, −2, 2' between each amount '1, 3, 0, 2' of the converted data X10 and each amount '3, 1, 2, 0' of the converted data X1, and a variation '3, −3, −1, 1' between each amount '3, 0, 1, 2' of the converted data Y10 and each amount '0, 3, 2, 1' of the converted data Y1. Thereafter, the learning section 22 calculates '0.3' as the inner product of the error '0.8, −0.1, −0.6, 0.4, 0.3, 0.6, −0.9, 0.1' and the variation '−2, 2, −2, 2, 3, −3, −1, 1'. The learning section 22 sets the calculated '0.3' to the change in the updated importance K1.

Update of Importance: Part 2

Figure 36A:
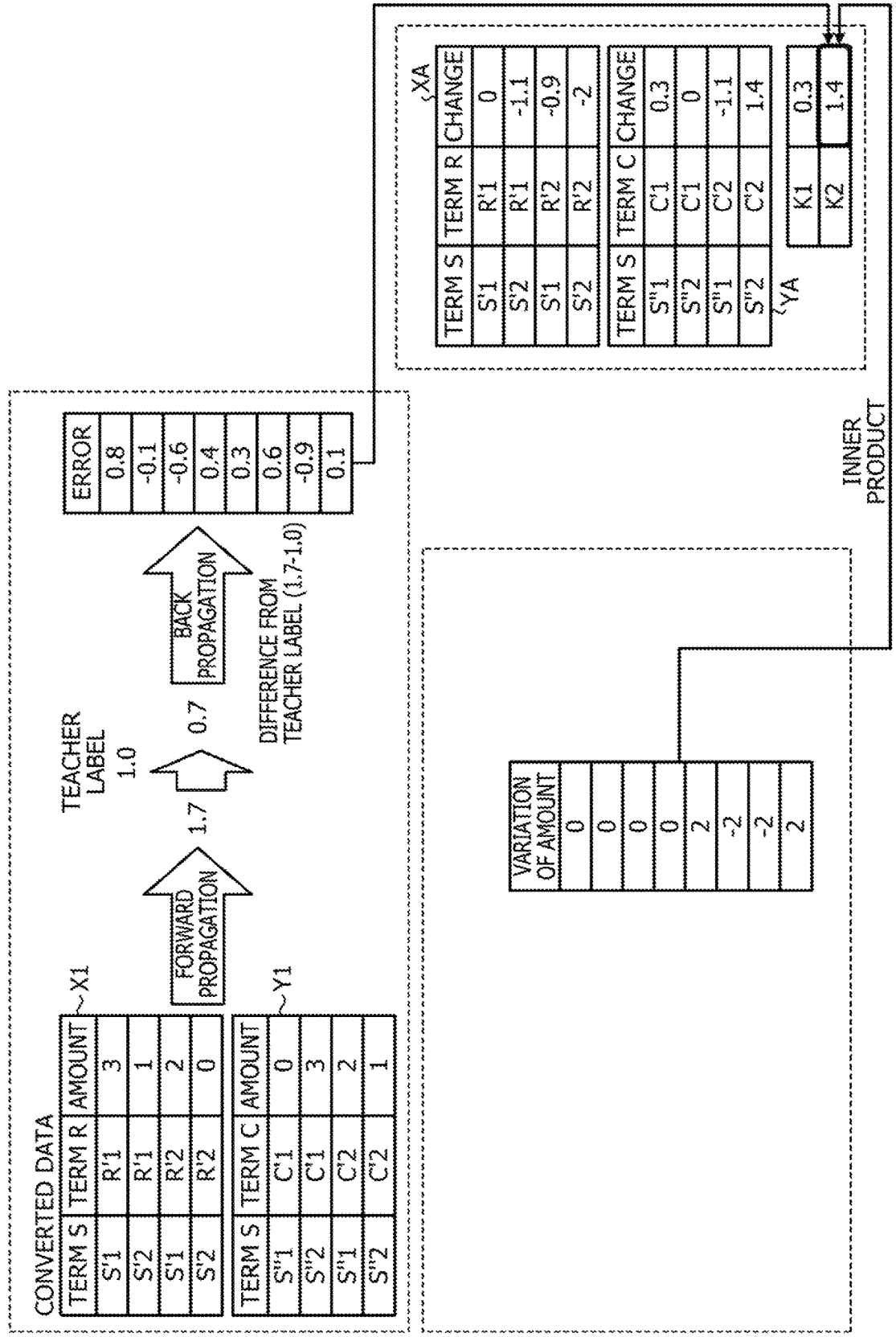
FIGS. 36A and 36B illustrate a diagram for explaining a variation inner product of an importance K2 according to Example 2.
Figure 36B:
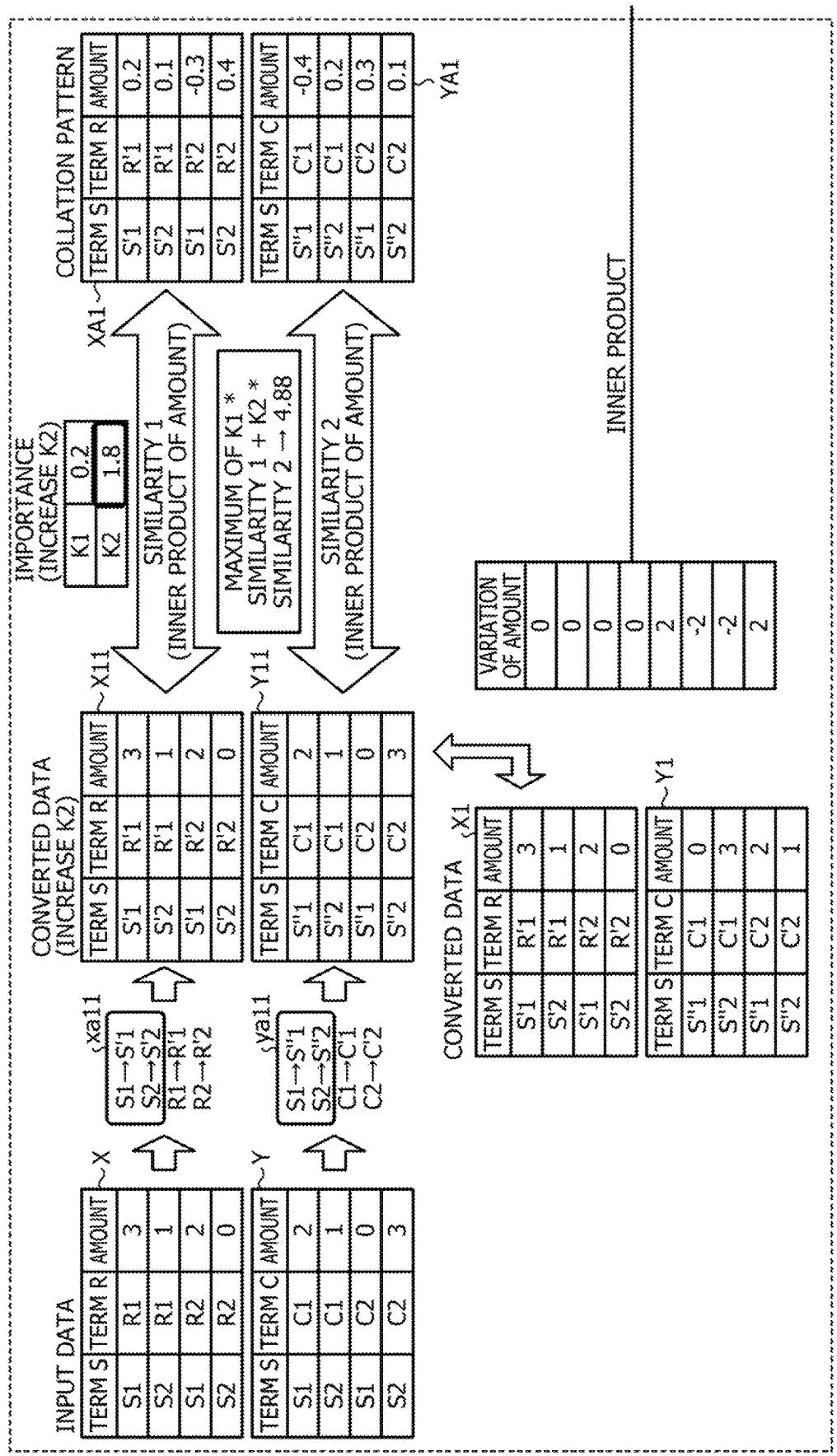

FIG. 36 (i.e., FIGS. 36A and 36B) is a diagram for explaining a variation inner product of an importance K2 according to Example 2. The processing described here is also executed by inputting the converted data X1 and the converted data Y1 generated in FIG. 27 and by using an error obtained by error back propagation.

The learning section 22 increases the importance K2 by 1 out of the importance K1 (0.2) and the importance K2 (0.8) illustrated in FIGS. 25A to 25C, to '1.8'. The learning section 22 generates a conversion rule xa11 and a conversion rule ya11 under the restriction of making the conversion rules of the common variable the same, such that the total sum of similarity 1 and similarity 2 of the collation pattern and the converted data is maximized considering the increased importance.

The conversion rule and the converted data illustrated in FIG. 36 represent an example satisfying the maximum value of the similarity and restriction. Specifically, the total sum of similarity 1 (importance K1(=0.2)×inner product of each amount) between each amount of converted data X11 and each amount of collation pattern XA1, and similarity 2 (importance K2(=1.8)×inner product of each amount) between each amount of converted data Y11 and each amount of collation pattern YA1 becomes, '4.88'.

As illustrated in FIG. 36, when the maximum value of the total sum of similarities is '4.88', the conversion rule xa11 is 'S1→S'1, S2→S'2, R1→R'1, R2→R'2', and the conversion rule ya11 is 'S1→S"1, S2→S"2, C1→C'1, C2→C'2'. That is, 'S1→S'1, S2→S'2' of the conversion rule xa11 and 'S1→S"1, S2→S"2' of the conversion rule ya11 indicate the same conversion contents.

Subsequently, the learning section 22 calculates a variation '0, 0, 0, 0' between each amount '3, 1, 2, 0' of the converted data X11 and each amount '3, 1, 2, 0' of the converted data X1, and a variation '2, −2, −2, 2' between each amount '2, 1, 0, 3' of the converted data Y11 and each amount '0, 3, 2, 1' of the converted data Y1. Thereafter, the learning section 22 calculates '1.4' as the inner product of the error '0.8, −0.1, −0.6, 0.4, 0.3, 0.6, −0.9, 0.1' and the variation '0, 0, 0, 0, 2, −2, −2, 2'. The learning section 22 sets the calculated '1.4' to the change in the updated importance K2.

Collation Pattern Update, Parameter Update, and Importance Update

With the above-described processing, change calculation is executed for each amount of input data when a minute change is given. Finally, S209 of FIG. 24 executed thereafter will be described in detail. FIGS. 37A to 37C are diagrams for explaining an update of parameter, an update of a collation pattern, and an update of in importance according to Example 2.

As illustrated in FIG. 37A, the learning section 22 subtracts a value, obtained by multiplying a multiplication value of a difference from the teacher label obtained by error back propagation and the amount of each converted data by a (for example, 1.0) which is a step size, from an initial value of the parameter to update the parameter. Specifically, the learning section 22 calculates '−0.9, −0.8, −2.3, 0.6, 0.4, −1.3, −2.7, −0.5' by subtracting '3×0.7, 1×0.7, 2×0.7, 0×0.7, 0×0.7, 3×0.7, 2×0.7, 1×0.7' from each of the initial values '1.2, −0.1, −0.9, 0.6, 0.4, 0.8, −1.3, 0.2' of the parameters 'w1, w2, w3, w4, w5, w6, w7, w8'.

As illustrated in FIG. 37B, the learning section 22 subtracts the multiplication value of change amount calculated up to FIG. 36 and the step size a (for example, 1.0) from each collation pattern to update each collation pattern.

Specifically, the learning section 22 calculates 'S'1, R'1, 0.2', 'S'2, R'1, 1.2', 'S'1, R'2, 0.6', and 'S'2, R'2, 2.4' of the updated collation pattern XA1' by subtracting 'S'1, R'1, 0.0', 'S'2, R'1, −0.1', 'S'1, R'2, −0.9', 'S'2, R'2, −2.0' of the calculated variation XA from 'S'1, R'1, 0.2', 'S'2, R'1, 0.1', 'S'1, R'2, −0.3', and 'S'2, R'2, 0.4' of the collation pattern XA1.

Similarly, the learning section 22 calculates 'S"1, C'1, −0.7', 'S"2, C'1, 0.2', 'S"1, C'2, 1.4', and 'S"2, C'2, −1.3' of the updated collation pattern YA1' by subtracting 'S"1, C'1, 0.3', 'S"2, C'1, 0.0', 'S"1, C'2, −1.1', and 'S"2, C'2, 1.4' of the calculated variation YA from 'S"1, C'1, −0.4', 'S"2, C'1, 0.2', 'S"1, C'2, 0.3', and 'S"2, C'2, 0.1' of the collation pattern YA1.

As illustrated in FIG. 37C, the learning section 22 subtracts a value obtained by multiplying the calculated change amount by a (for example, 1.0) which is a step size from the initial value of the importance to update the importance. Specifically, the learning section 22 subtracts '0.3, 1.4' from the each of initial values '0.2, 0.8' of the importance 'K1, K2' to calculate '−0.1, −0.6' of new importance 'K1, K2'.

The learning section 22 updates the parameter, the collation pattern, and the importance by executing the above-described processing. Similar processing is executed for the next learning data (input data) with the updated parameter, the collation pattern, and the importance as initial values.

Effect

Since the monitoring server 10 may generate converted data based on the importance, the importance of each relationship data may be appropriately taken into consideration, thereby learning accuracy may be improved. Since the monitoring server 10 may update the importance according to the change amount when a minute change is given to each amount of input data or the change amount when a minute change is given to the importance, subjective importance setting or the like may be suppressed and the importance of relationship data may be appropriately set. Since the monitoring server 10 may determine the importance based on all the input data used for learning, it is possible to omit the correspondence of executing the verification by the fixed importance by the number of patterns of the combination of the importance. As a result, the processing speed for verifying the importance may be shortened, and the processing time of the entire learning processing may be shortened.

Example 3

Although Examples of the embodiments have been described so far, the embodiments may be implemented in various different forms other than the above Examples.

Input Data

In the above-described Example, an example using two relationship data has been described. However, the Example is not limited to this, and two or more of a plurality of pieces of relationship data may also be used. In that case, a collation pattern is prepared for each relationship data, and the same processing as in the Examples 1 and 2 is executed under the restriction that the conversion contents of the common variable common to the relationship data are the same.

Numerical Values

The numerical values, teacher label setting contents, minute change values, or the like used in the above-described Examples are merely examples, and may be optionally changed. The number of variables of input data and the number of the common variable are merely examples, and may be optionally changed.

Although the example using a communication log and a command history has been described as an example, the relationship data is not limited to this. For example, by using a transfer history having a transfer source, a transfer destination, a transfer number of times, or the like and account information having an account name, a received money amount, a received number of times, or the like, the above-described Examples may be applied to the construction of a learning model for determining the account of the transfer fraud by using the transfer destination and the account name as a common variable.

System

Processing procedures, control procedures, specific names, information including various kinds of data and parameters represented in the documents or drawings may be optionally changed unless otherwise specified.

Each component of each illustrated device is functional-conceptual, and is not necessarily physically configured as illustrated. In other words, the specific form of distribution or integration of each device is not limited to those illustrated in the drawings. That is, all or a part of them may be configured to be functionally or physically distributed or integrated into optional units according to various loads, usage conditions, or the like. For example, the learning section 22 and the prediction section 26 may be realized by separate devices.

All or a part of each processing function performed in each device may be realized by a CPU and a program that is analyzed and executed by the CPU, or may be realized as hardware by wired logic.

Hardware

Figure 38:
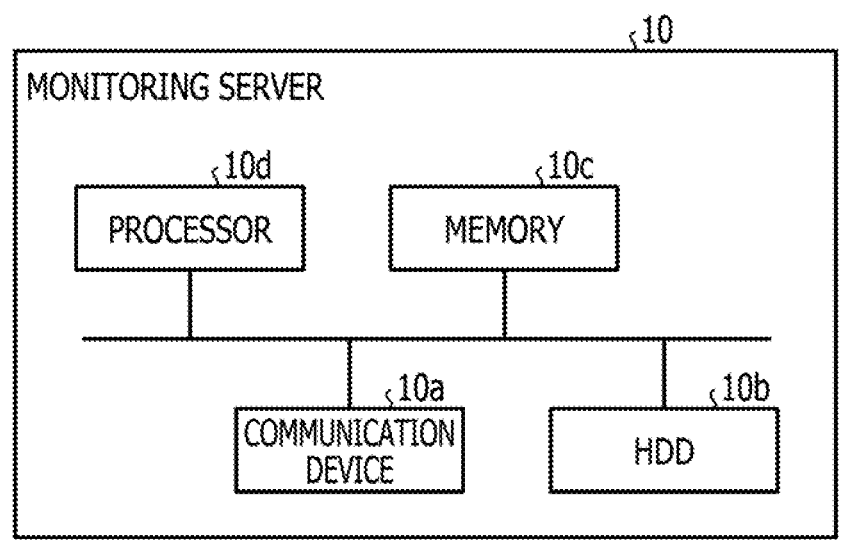
FIG. 38 is a diagram for explaining an example of a hardware configuration.

FIG. 38 is a diagram for explaining an example of a hardware configuration. As illustrated in FIG. 38, the monitoring server 10 includes a communication device 10a, a hard disk drive (HDD) 10b, a memory 10c, and a processor 10d. Respective parts illustrated in FIG. 38 are mutually coupled to each other by a bus or the like.

The communication device 10a is a network interface card or the like, and performs communication with other servers. The HDD 10b stores a program or a DB for operating a function illustrated in FIG. 6.

The processor 10d is a hardware circuit for operating a process of executing each function described in FIG. 2 or the like by reading a program for executing the same processing as each processing unit illustrated in FIG. 6 from the HDD 10b or the like to develop it in the memory 10c. In this process, the same function as each processing unit included in the monitoring server 10 is executed. Specifically, the processor 10d reads out a program having the same functions as those of the data acquisition section 21, the learning section 22, the prediction section 26, or the like from the HDD 10b and the like. The processor 10d executes processing of executing the same processing as those of the data acquisition section 21, the learning section 22, the prediction section 26, or the like.

In this way, the monitoring server 10 operates as an information processing apparatus that executes the learning method by reading out and executing the program. The monitoring server 10 may also realize a same function as the above-described Examples by reading the program from the recording medium by the medium reading device and executing the read program. The program in the other Examples is not limited to being executed by the monitoring server 10. For example, the present embodiment may be similarly applied to a case where another computer or server executes the program, or a case where these cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a learning program causing a computer to execute processing, the processing comprising:
   acquiring input data and correct answer information added to the input data, the input data including a set of a plurality of pieces of relationship data in which relationships between variables are recorded respectively;
   determining each conversion rule corresponding to each of the plurality of pieces of relationship data such that correspondence relationships before and after a conversion of a common variable commonly included in the plurality of pieces of relationship data are the same, when converting a variable value included in each of the plurality of pieces of relationship data into converted data rearranging the variable values in an order of input, according to each collation pattern in which a reference for ordering the variable value which is input to a neural network and which corresponds to each of the plurality of pieces of relationship data, is defined by an array of a plurality of reference values;
   converting each of the plurality of pieces of relationship data into a plurality of pieces of the converted data according to each corresponding conversion rule; and
   inputting a set of the plurality of pieces of converted data to the neural network as the input data, thereby causing the neural network to learn a learning model based on the correct answer information.

2. The non-transitory computer-readable recording medium according to claim 1,
   wherein the determining includes determining each conversion rule such that a total sum of each of similarities between each of the plurality of pieces of converted data generated from each of the plurality of pieces of relationship data and corresponding collation patterns is maximized, while satisfying a condition that the correspondence relationships before and after the conversion of the common variable are the same.

3. The non-transitory computer-readable recording medium according to claim 2,
   wherein the determining includes calculating a similarity between each of the plurality of pieces of converted data generated from each of the plurality of pieces of relationship data and the corresponding collation patterns, multiplying each calculated similarity by each importance set for each of the plurality of pieces of relationship data, and determining each conversion rule such that a total sum of each multiplied value is maximized.

4. The non-transitory computer-readable recording medium according to claim 3,
   wherein the executing learning includes
   calculating an error between an output value, obtained by inputting variable values included in the input data to the neural network in which a plurality of input layers are provided for each relationship in an order of input, and the correct answer information, and
   updating a parameter corresponding to each of the plurality of input layers by using a multiplication result of each of the plurality of pieces of converted data and the error.

5. The non-transitory computer-readable recording medium according to claim 4,
   wherein the executing learning includes
   acquiring a plurality of pieces of error information corresponding to each of the plurality of input layers by executing error back propagation based on the error,
   determining each conversion rule such that a total sum of each of the similarities is maximized while satisfying the condition when each of the plurality of reference values included in each collation pattern is minutely changed,
   generating the plurality of pieces of converted data according to each conversion rule,
   calculating a change amount of each collation pattern based on a variation between the plurality of pieces of converted data before the minute change and the plurality of pieces of converted data after the minute change, and the plurality of pieces of error information, and
   updating each collation pattern by using the change amount of each collation pattern.

6. The non-transitory computer-readable recording medium according to claim 5,
   wherein the executing learning includes
   determining each conversion rule such that, when each importance is minutely changed, the total sum of each of the similarities is maximized while satisfying the condition,
   generating the plurality of pieces of converted data according to each conversion rule,
   calculating a change amount of each importance based on the variation between the plurality of pieces of converted data before the minute change and the plurality of pieces of converted data after the minute change, and the plurality of pieces of error information, and
   updating each importance by using the change amount of each importance.

7. A learning method executed by a computer, the method comprising:
   acquiring input data and correct answer information added to the input data, the input data including a set of a plurality of pieces of relationship data in which relationships between variables are recorded respectively;
   determining each conversion rule corresponding to each of the plurality of pieces of relationship data such that correspondence relationships before and after a conversion of a common variable commonly included in the plurality of pieces of relationship data are the same, when converting a variable value included in each of the plurality of pieces of relationship data into converted data rearranging the variable values in an order of input, according to each collation pattern in which a reference for ordering the variable value which is input to a neural network and which corresponds to each of the plurality of pieces of relationship data, is defined by an array of a plurality of reference values;
   converting each of the plurality of pieces of relationship data into a plurality of pieces of the converted data according to each corresponding conversion rule; and
   inputting a set of the plurality of pieces of converted data to the neural network as the input data, thereby causing the neural network to learn a learning model based on the correct answer information.

8. A learning apparatus comprising:
   a memory;
   a processor coupled to the memory, the processor being configured to
   execute an acquisition processing that includes acquiring input data and correct answer information added to the input data, the input data including a set of a plurality of pieces of relationship data in which relationships between variables are recorded respectively;

execute a determining processing that includes determining each conversion rule corresponding to each of the plurality of pieces of relationship data such that correspondence relationships before and after a conversion of a common variable commonly included in the plurality of pieces of relationship data are the same, when converting a variable value included in each of the plurality of pieces of relationship data into converted data rearranging the variable values in an order of input, according to each collation pattern in which a reference for ordering the variable value which is input to a neural network and which corresponds to each of the plurality of pieces of relationship data, is defined by an array of a plurality of reference values;

execute a conversion processing that includes converting each of the plurality of pieces of relationship data into a plurality of pieces of the converted data according to each corresponding conversion rule; and execute a learning processing that includes inputting a set of the plurality of pieces of converted data to the neural network as the input data, thereby causing the neural network to learn a learning model based on the correct answer information.

* * * * *